(12) United States Patent
Gerber et al.

(10) Patent No.: US 7,669,177 B2
(45) Date of Patent: *Feb. 23, 2010

(54) SYSTEM AND METHOD FOR PREFERENCE APPLICATION INSTALLATION AND EXECUTION

(75) Inventors: Robert H. Gerber, Bellevue, WA (US); Holly Knight, Woodinville, WA (US); Murali R. Krishnan, Redmond, WA (US); Niranjan Nilakantan, Redmond, WA (US); Shahaf Abileah, Seattle, WA (US); Shyamalan Pather, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

This patent is subject to a terminal disclaimer.

(21) Appl. No.: 10/693,735

(22) Filed: Oct. 24, 2003

(65) Prior Publication Data

US 2005/0091269 A1 Apr. 28, 2005

(51) Int. Cl.
*G06F 9/44* (2006.01)
*G06F 17/00* (2006.01)
*G06F 3/00* (2006.01)

(52) U.S. Cl. .................. 717/100; 707/101; 707/102; 715/745; 715/747

(58) Field of Classification Search ............. 715/744, 715/747, 745; 717/104, 100; 707/101–102
See application file for complete search history.

(56) References Cited

U.S. PATENT DOCUMENTS

| | | | |
|---|---|---|---|
| 4,774,658 A | 9/1988 | Lewin | |
| 5,301,326 A | 4/1994 | Linnett et al. | |
| 5,367,633 A | 11/1994 | Matheny | |
| 5,416,725 A | 5/1995 | Pacheco | |
| 5,481,700 A * | 1/1996 | Thuraisingham | ............... 707/9 |
| 5,555,346 A | 9/1996 | Gross | |
| 5,760,768 A * | 6/1998 | Gram | ............... 715/747 |
| 5,813,007 A | 9/1998 | Nielsen | |
| 5,835,768 A | 11/1998 | Miller et al. | |

(Continued)

FOREIGN PATENT DOCUMENTS

| | | |
|---|---|---|
| EP | 0 474 340 A2 | 3/1992 |
| EP | 0 474 340 A3 | 3/1992 |

OTHER PUBLICATIONS

Bailey et al., "An Event-Condition-Action Language for XML", WWW2002, May 7-11, 2001. http://www2002.org/CDROM/refereed/323/.*

(Continued)

*Primary Examiner*—Wei Y Zhen
*Assistant Examiner*—Chih-Ching Chow
(74) *Attorney, Agent, or Firm*—Workman Nydegger

(57) ABSTRACT

The present systems and methods disclose a system for personalizing computer functionality. End-users are provided with tools to easily write rich and complex preferences, for example, by using a plurality simple IF-THEN propositional logic. The preferences are then transformed into queries and executed efficiently on structured data. Preferences that are satisfied then execute actions such as providing notification or storing data in a particular folder. Furthermore, according to an aspect of the invention, data, logic, events, inter alia, are all schematized, thereby enabling sharing of data between application components and across applications.

16 Claims, 43 Drawing Sheets

U.S. PATENT DOCUMENTS

| | | | |
|---|---|---|---|
| 5,852,812 | A | 12/1998 | Reeder |
| 5,870,746 | A * | 2/1999 | Knutson et al. ............. 707/101 |
| 5,893,091 | A | 4/1999 | Hunt |
| 5,973,612 | A | 10/1999 | Deo |
| 5,974,406 | A | 10/1999 | Bisdikian |
| 5,999,978 | A | 12/1999 | Angal |
| 6,016,394 | A | 1/2000 | Walker |
| 6,021,403 | A | 2/2000 | Horvitz |
| 6,026,235 | A | 2/2000 | Shaughnessy |
| 6,055,505 | A | 4/2000 | Elston |
| 6,055,570 | A | 4/2000 | Nielsen |
| 6,108,712 | A | 8/2000 | Hayes, Jr. |
| 6,112,192 | A | 8/2000 | Capek |
| 6,122,633 | A | 9/2000 | Leymann |
| 6,138,158 | A | 10/2000 | Boyle |
| 6,151,643 | A | 11/2000 | Cheng |
| 6,167,448 | A | 12/2000 | Hemphill |
| 6,173,284 | B1 | 1/2001 | Brown |
| 6,185,613 | B1 | 2/2001 | Lawson |
| 6,208,996 | B1 | 3/2001 | Ben-Shachar |
| 6,209,011 | B1 | 3/2001 | Vong |
| 6,219,782 | B1 | 4/2001 | Khan |
| 6,256,664 | B1 | 7/2001 | Donoho |
| 6,260,148 | B1 | 7/2001 | Aggarwal |
| 6,275,957 | B1 | 8/2001 | Novik |
| 6,292,825 | B1 | 9/2001 | Chang |
| 6,314,533 | B1 | 11/2001 | Novik |
| 6,327,705 | B1 | 12/2001 | Larsson et al. |
| 6,330,566 | B1 | 12/2001 | Durham |
| 6,343,376 | B1 * | 1/2002 | Saxe et al. ................. 717/154 |
| 6,353,926 | B1 | 3/2002 | Parthesarathy |
| 6,400,810 | B1 | 6/2002 | Skladman |
| 6,405,191 | B1 | 6/2002 | Bhatt |
| 6,424,966 | B1 | 7/2002 | Meyerzon |
| 6,438,618 | B1 | 8/2002 | Lortz |
| 6,446,092 | B1 * | 9/2002 | Sutter .......................... 707/203 |
| 6,466,949 | B2 | 10/2002 | Yang |
| 6,480,885 | B1 | 11/2002 | Olivier |
| 6,484,149 | B1 * | 11/2002 | Jammes et al. ................ 705/26 |
| 6,487,548 | B1 | 11/2002 | Leymann |
| 6,490,633 | B1 | 12/2002 | Linnett et al. |
| 6,490,718 | B1 * | 12/2002 | Watters ...................... 717/100 |
| 6,510,429 | B1 | 1/2003 | Todd |
| 6,513,026 | B1 | 1/2003 | Horvitz |
| 6,532,471 | B1 * | 3/2003 | Ku et al. ...................... 707/102 |
| 6,564,251 | B2 | 5/2003 | Katariya et al. |
| 6,574,552 | B2 | 6/2003 | Yano |
| 6,601,012 | B1 | 7/2003 | Horvitz |
| 6,606,618 | B2 * | 8/2003 | Delo ............................. 707/2 |
| 6,629,138 | B1 | 9/2003 | Lambert |
| 6,643,682 | B1 | 11/2003 | Todd |
| 6,662,195 | B1 | 12/2003 | Langseth |
| 6,704,803 | B2 | 3/2004 | Wilson |
| 6,745,180 | B2 * | 6/2004 | Yamanoue ...................... 707/3 |
| 6,745,193 | B1 | 6/2004 | Horvitz et al. |
| 6,748,318 | B1 | 6/2004 | Jones |
| 6,751,657 | B1 | 6/2004 | Zothner |
| 6,757,710 | B2 | 6/2004 | Reed |
| 6,766,329 | B1 | 7/2004 | Nicholson |
| 6,807,482 | B2 | 10/2004 | Utsumi |
| 6,826,541 | B1 * | 11/2004 | Johnston et al. ........... 705/36 R |
| 6,826,560 | B1 | 11/2004 | Leymann |
| 6,829,478 | B1 | 12/2004 | Layton |
| 6,829,639 | B1 | 12/2004 | Lawson |
| 6,829,770 | B1 | 12/2004 | Hinson |
| 6,839,730 | B1 | 1/2005 | Ramabhadran |
| 6,847,889 | B2 | 1/2005 | Park |
| 6,850,893 | B2 | 2/2005 | Lipkin et al. |
| 6,904,383 | B2 | 6/2005 | Tanaka |
| 6,910,033 | B2 | 6/2005 | Rosenblum |
| 6,910,070 | B1 | 6/2005 | Mishra |
| 6,920,616 | B1 * | 7/2005 | Abbott et al. ............... 715/744 |
| 6,938,240 | B2 | 8/2005 | Charisius |
| 6,981,250 | B1 | 12/2005 | Wiltamuth |
| 6,988,262 | B1 | 1/2006 | Mallory |
| 7,032,115 | B2 | 4/2006 | Kashani |
| 7,137,099 | B2 * | 11/2006 | Knight et al. ............... 717/100 |
| 7,177,859 | B2 | 2/2007 | Pather |
| 7,209,916 | B1 * | 4/2007 | Seshadri et al. ................. 707/3 |
| 7,266,595 | B1 * | 9/2007 | Black et al. ................. 709/223 |
| 7,275,235 | B2 | 9/2007 | Molinari |
| 7,360,202 | B1 * | 4/2008 | Seshadri et al. ............. 717/106 |
| 7,509,304 | B1 | 3/2009 | Pather |
| 2001/0009016 | A1 | 7/2001 | Hofmann |
| 2002/0010804 | A1 | 1/2002 | Sanghvi |
| 2002/0032597 | A1 | 3/2002 | Chanos |
| 2002/0032602 | A1 | 3/2002 | Lanzillo |
| 2002/0032771 | A1 | 3/2002 | Gledje |
| 2002/0035482 | A1 | 3/2002 | Coble |
| 2002/0069244 | A1 | 6/2002 | Blair |
| 2002/0075293 | A1 | 6/2002 | Charisius |
| 2002/0077842 | A1 | 6/2002 | Charisius |
| 2002/0077910 | A1 | 6/2002 | Shioda |
| 2002/0080938 | A1 | 6/2002 | Alexander |
| 2002/0082919 | A1 | 6/2002 | Landau |
| 2002/0087388 | A1 * | 7/2002 | Keil et al. ...................... 705/10 |
| 2002/0087740 | A1 | 7/2002 | Castanho |
| 2002/0095399 | A1 | 7/2002 | Devine |
| 2002/0115423 | A1 | 8/2002 | Hatae |
| 2002/0120711 | A1 | 8/2002 | Bantz |
| 2002/0135614 | A1 * | 9/2002 | Bennett ...................... 345/745 |
| 2002/0136173 | A1 | 9/2002 | Monroe |
| 2002/0154010 | A1 | 10/2002 | Tu |
| 2002/0165729 | A1 | 11/2002 | Kuebert |
| 2002/0167488 | A1 | 11/2002 | Hinckley |
| 2002/0194305 | A1 | 12/2002 | Sadeghi |
| 2003/0023435 | A1 * | 1/2003 | Josephson ................... 704/235 |
| 2003/0025599 | A1 | 2/2003 | Monroe |
| 2003/0046539 | A1 | 3/2003 | Negawa |
| 2003/0050046 | A1 | 3/2003 | Conneelly |
| 2003/0069002 | A1 | 4/2003 | Hunter |
| 2003/0083952 | A1 | 5/2003 | Simpson |
| 2003/0101322 | A1 | 5/2003 | Gardner |
| 2003/0105732 | A1 * | 6/2003 | Kagalwala et al. ............. 707/1 |
| 2003/0126136 | A1 * | 7/2003 | Omoigui ...................... 707/10 |
| 2003/0131143 | A1 | 7/2003 | Myers |
| 2003/0154193 | A1 | 8/2003 | Rosenblum |
| 2003/0172368 | A1 * | 9/2003 | Alumbaugh et al. ........ 717/106 |
| 2003/0177402 | A1 | 9/2003 | Piazza |
| 2004/0002958 | A1 | 1/2004 | Seshadri |
| 2004/0002988 | A1 | 1/2004 | Seshadri |
| 2004/0031058 | A1 | 2/2004 | Reisman |
| 2004/0068481 | A1 | 4/2004 | Seshadri |
| 2004/0083463 | A1 | 4/2004 | Hawley |
| 2004/0128359 | A1 | 7/2004 | Horvitz |
| 2004/0155901 | A1 | 8/2004 | McKee et al. |
| 2005/0084082 | A1 * | 4/2005 | Horvitz et al. ......... 379/114.06 |
| 2005/0091184 | A1 | 4/2005 | Seshadri et al. |

OTHER PUBLICATIONS

Fernando Bellas, et al., A Flexible Framework for Engineering "My" Portals, WWW 2004, May 17-22, 2004, pp. 234-243, ACM, New York, NY.

Gustavo Rossi, et al., Designing Personalized Web Applications, WWW01, May 2001, pp. 275-284, ACM, Hong Kong.

Peter Haddawy, et al., Preference Elicitation via Theory Refinement, Journal of Machine Learning Research, Jul. 2003, pp. 317-337, vol. 4.

Lisa Purvis, et al., Creating Personalized Documents: An Optimization Approach, DocEng '03, Nov. 20-22, 2003, pp. 68-77, ACM, Grenoble, France.

Woojin Paik, et al., Applying Natural Language Processing (NLP) Based Metadata Extraction to Automatically Acquire User Preferences, K-CAP '01, Oct. 2001, pp. 116-122, ACM, Victoria, British Columbia, Canada.

Vincent Trans. International Search Report. ISA/US, Alexandria, Virginia, US. Nov. 18, 2004. 3 pgs.

IBM ADA/6000, Synopsis. www.calply.edu/~ias/userguides/CentralUNIX/world/AIX40105.doc. Sep. 2, 1998. 13 pgs.

E.W. Giering. Compile Time Scheduling of an Ada Subset. Washington Ada Symposium Proceedings. Jun. 1990. pp. 143-155.

International Search Report dated Jun. 22, 2005 for PCT Application Serial No. US04/24049, 5 pages.

Bailey, James. "An Event-Condition-Action Language for XML" 2002.

U.S. Appl. No. 10/693,717, filed Oct. 24, 2003, Knight et al.

U.S. Appl. No. 10/692,885, filed Oct. 24, 2003, Seshadri et al.

Microsoft Press Computer Dictionary. Third Edition, 1997.

IBM Ada/6000 Synopsis, 1998, Sep. 2002, www.calpoly.edu/~las/userguides/EnteralUNIX/world/AIX40105.doc.

Guering III, et al, "Compile Time Scheduling of an Ada Subset", Washington Ada Symposium Proceedings, Jun. 1990.

"Algorithmic Solutions Software GmbH", Oct. 16, 2002, http://www.algorithmic-solutions.com/leda-manual/introduction.html.

Weidong, et al. Design of Events and Rules in an Active Object Oriented Database Management System. Computer Research and Development, vol. 35, No. 5, May 1998, 4 pages.

Zhengfang Xu, et al. "A Web Services Oriented Framework for Dynamic e-Learning Systems". CCECE 2003, Canadian Conference on Electrical and Computer Engineering, Montreal, Canada, May 4-7, 2003. IEEE, vol. 2, May 4, 2003, pp. 943-946, XP010654226.

Pluggable Approval Process for UDDI, IBM, Research Disclosure, Mason Publications, Hampshire, GB, vol. 466, No. 128, Feb. 1, 2003, XP007132292, 1 Page.

UDDI Technical White Paper. Internet Citation, XP002230398. http://www.uddi.org/pubs/Iru_UDDI_Technical_White_Paper.pdf. Last accessed Mar. 13, 2009, 13 pages.

U.S. Appl. No. 10/375,628, filed Feb. 26, 2003, Pather.

Sasu Tarkoma, "Scalable Internet Event Notification Architecture (Siena)" Spring 2002, Helsinki.

Ellen Muraskin, "Notification Engines and Apps", Oct. 5, 2001, www.convergence.com.

"Event Broker/Monitor (Bea Tuxedo System)", 1999, http://edocs.bea.com/wie/wie42/admin/events.http.

BEA Systems, "Event Subscription and Notifications", 2000, 4 Pages printed Jul. 25, 2005 from http://e-docs.bea.com/tuxedo/tux71/html/dvlibra7.htm.

Hanson et al., "A Flexible and Recoverable Client/Server Database Event Notification System", 1998, VLDB Journal, vol. 7, pp. 12-24.

Berndtsson, et al., "Cooperative Problem Solving: A New Direction for Active Databases", 1996, 4 Pages, 2 Pages of Citation.

Vassili Bykov, "TOPlink for SmallTalk 5.0: What's New, What's Old?", SmallTalk Chronicles, vol. 1, No. 2, 1999, Printed Mar. 19, 2003, 9 Pages.

"Configurable Interface for Processing Notifications", Aug. 19, 1999, www.sba.weidner.edu/sahelp, Printed Mar. 6, 2003, 3 Pages.

IEEE, "The Authorative Dictionary of IEEE Standards Terms", 2000, 7th Edition, p. 701.

"Interactive Notification Server", www.brience.com, Copyright 2000, Printed Mar. 10, 2003, 5 Pages.

Steve Trythall, "JMS and COBRA Notification Interworking", Dec. 12, 2001, www.oreilly.com, Printed Mar. 25, 2003, 9 Pages.

Microsoft Corporation, "Global XML Web Services Architecture", White Paper, Oct. 2001, 11 Pages.

Microsoft Corporation, "An Introduction to Microsoft Transaction Server", Jan. 8, 1998, Printed Oct. 21, 2005 from http://msdn.microsoft.com/archive/ens/dnarmts/html/mddn_mtsintro.asp. 5 Pages.

Rosenblum et al., "A Design Framework for Internet-Scale Event Observation and Notification", 1998, 17 Pages.

Microsoft Corporation, "Microsoft SQL Server Notification Services Technical Overview", Apr. 2002, White Paper, 23 Pages.

Rob Taylor, "Transact-SQL", Dec. 20, 2000, SQLTeam.com, 2 Pages Printed on Jan. 26, 2005 from http://sqlteam.com/item.asp?itemID=1650.

Michael Kantor and David Redmiles, Creating an Infrastructure for Ubiquitious Awareness, Information and Computer Science, University of California, Irvine 92697, 2001.

Bowman et al., "The Practical SQL Handbook: Using SQL Variants", 2001 Pearson Technology Group, 4th Edition.

Antonio Carzaniga, Design of a Scalable Event Notification Service: Interface and Architecture, Aug. 1998, University of Colorado.

Eric Schmidt, "Reliable XML Web Services", Dec. 11, 2001 Microsoft MSDN, 10 Pages, Last Printed on Apr. 7, 2006.

Bernheim Brush et al., "Notification for Shared Annotation of Digital Documents", Apr. 2002, ACM Press, vol. 4, Issue No. 1, pp. 89-96.

Chou et al., "Versions and Change Notification in an Object -Oriented Database System", Jun. 1988, IEEE Computer Society Press, Paper 20.4 275-281.

Gruber et al., "High-Level Constructs in the READY Event Notification System", Sep. 1998, ACM Press, p. 195-202.

Stelovsky et al., Software Architecture for Unified Architecture for Unified Management of Event Notification and Stream I/O and its Use for Recording and Analysis of User Events, Jan. 7-10, 2002, IEEE, 1862-1867.

Cabrera et al., Herald: Archiving a Global Event Notification Service, May 20-22, 2001, IEEE, 87-92.

* cited by examiner

SYSTEM AND METHOD FOR PREFERENCE APPLICATION INSTALLATION AND EXECUTION

TECHNICAL FIELD

The present invention relates generally to computer systems, and more particularly to a system and method of personalizing computer systems.

BACKGROUND

Users of computers and computing related technology have typically been divided into two distinct categories namely highly skilled and knowledgeable individuals and everyone else. Skilled and knowledgeable individuals know how to use computers in rich ways and bend them to their will to shape programs and facilitate rich and valuable behaviors. The rest of the world of computer users are at the mercy of the skilled and knowledgeable individuals as they are denied easy or cheap access to knowledge, information, or the ability to make computers serve their needs.

Major breakthroughs in computing have occurred when technology has broken down some of these barriers to access. In the world of mainframes, computers were too expensive for all but the largest businesses to afford. The advent of mini-computers and then personal computers (PCs) broke down the cost barrier and made computers available to small businesses and individuals. In the 1980's, programmers struggled to build graphical user interface (GUI) applications. Without rich and consistent GUIs programmers were unable to build valuable applications for PC users. The Visual Basic revolution as well as the use of controls and event-based GUIs construction enabled application developers to easily build rich applications. Subsequently, a virtuous cycle was established wherein many more end-users were able to exploit these applications. In the 1990's, end users struggled to overcome a lack of access to information. The growth of the Internet transformed this space, making almost all-valuable information accessible to anyone with a browser. However, there are still enormous barriers that need to be overcome.

Conventional computing is not personal. There is very little about a so-called personal computer that is truly "personal." It is true that data stored on a local disk is personal. However, the behavior of the machine, namely the action(s) it performs on behalf of the user, is close to identical across millions of users. Despite owning an amazingly powerful general purpose computer, the average user treats it as a static tool, useful as a communication end-point, useful as a search entry-point, useful to execute some canned mass-market applications, but otherwise incapable of any "personal computing" in the true sense of the word. The personalization capabilities available in current applications just scratch the surface of what is possible and desirable.

Furthermore, conventional computing is not automated but rather manual, requiring users to make decisions and act upon them at an appropriate time. Consider the daily routine of most typical computer end-users. Among other things, end-users gather information, react to communications, initiate or respond to communications, and organize information. Computers have improved communication between people and have improved access to information. However, computers have done little to relieve end-users from the responsibility of making decisions and acting upon them at the right time.

Still further yet, traditional computing is not contextual. Computer software typically provides option settings that are rather static and unrelated to the actual context of the user.

What is needed is a truly personalized computer system—a system that is aware of the needs and preferences of end-users and which acts in a manner guided by those needs as well as by user context. Further, computer systems and software should provide every end-user with a personal assistant for gathering and sifting of information of interest to one or more end-users and automatically reacting to that information in a manner specified by a user.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

An information agent system, application, and methodologies are disclosed herein. An information agent system provides the platform for executing information agent applications (sometimes referred to herein as IA applications). IA applications can then be programmed by end-users and employed as end-user executive assistants or agents. Agents can then act to greatly enhance end-user personal productivity, integrate desktop applications and all personal communication mediums (e.g., mobile phone, pager, PDA . . . ).

Central to the information application system is schematization of data. Schematization is the structuring of data in well-known and well-defined patterns, which enables multiple applications to recognize and interact with each other. Information properties, information events, and decision logic can all be schematized. Schematized information properties refer to data that is the basis of end user applications (e.g., email, people, groups, locations . . . ). Information properties can be schematized to allow consistent interpretation of data a multitude of different applications. Information events provide hooks to attach program logic. These events are of a high-level and are tied to information flows to facilitate comprehension by inexperienced end-users. Events can also be schematized. Furthermore, decision logic can be schematized. Since end-users are not trained developers it is not reasonable to expect a program written in a traditional programming language. Rather, schematized logic building blocks (e.g., IF-THEN propositions) can be provided to end-users so that they can program by stitching them together in simple yet rich combinations. Schematization of data, information hooks (events) and end-user programming capabilities allows end-users a great value with a rich eco-system of applications coupled and collaborating via end-user logic, which then allows novice end-users to become system integrators.

Furthermore, according to an aspect of the present invention the information application system includes a flexible execution engine that can compile and execute both heavyweight and lightweight information applications. Heavyweight applications include those that are often run on high-end servers and require high-throughput and scalability, among other things. Lightweight applications are those that are often executed on smaller systems such as personal computers and require low-latency, a small database footprint, and small working set. In smaller applications the trade off between latency and throughput is reversed with respect to larger server applications. Accordingly, the execution engine of the subject invention is flexible in that it can compile and execute applications on a plurality of different application platforms by making tradeoffs to emphasize particular system requirements (e.g., low-latency, small database footprint . . . ).

In accordance with another aspect of the present invention, end-user preferences or rules are developed in a one-at-a-time fashion but executed in sets. A one-at-a-time programming model is a model that is most natural to developers, which allows developers to specify one event against one preference. However, according to an aspect of the invention, the system retrieves one-at-a-time program declarations and crafts condition class queries that execute in a set oriented manner thereby exploiting techniques like indexing and duplicate elimination. This is beneficial in that preferences are evaluated in an very efficient manner while developers and end-users are left to conceptualize and write programs in a one-at-a-time manner.

According to another aspect of the subject invention a new application installation system and method are provided. In conventional systems, application installation involves a proliferation of database objects, tables, and stored procedures. In some instances applications create whole new databases. The subject invention simplifies and expedites application installation by providing a set of base tables. To install an application, the system simply updates the base tables. This can be accomplished by storing program actions, conditions, events, and procedures as data. For example, with respect to procedures, they can be created as a roll of text, which is stored in a data store. To run such procedures the program text can simply be pulled out of data store and executed.

According to yet another aspect of the subject invention, a system can support accessor constants to allow conditions/actions to relate information across different domains of information. Accessors constants facilitate information exchange or sharing of data across different domains. For example, an accessor constant MyFamily can be defined such that an accessor function is able to determine the members of MyFamily by querying data stored by an email application or calendar application. The combination of schematized logic and accessors is beneficial at least because it enables non-programmers to write efficient cross-domain queries. Further, a relatively small number of condition classes combined with a relatively small number of accessor constraints enables a large number of interesting conditions to be employed that otherwise might not have been provided by an application developer.

In accordance with yet another aspect of the present invention, user defined preferences can be extended to enable relationships between applications. To a large extent, the measure of an IA application is determined by the capabilities that are presented to users. Therefore, the degree to which an IA application is extensible can be determined by the extent to which new conditions and actions are made available to users defining new preferences within the context of an existing application. Application extensibility is primarily aimed at enabling new conditions and actions to be added to an application subsequent to the time at which the application is installed, without further intervention by the author(s) of the original application. Therefore, end-users, without developer input, can create preferences that make use of conditions and actions provided by different applications and thereby enable rich relationships between applications.

Further yet, the system of the present invention supports information agent applications. According to an aspect of the present invention, one such application can relate to personalizing folders, data containers, or other data organizational system provided by a data store and associated file system (e.g., hierarchical system, files related through arbitrary or explicit relationships). Personalized folders are defined and controlled by end-user specified logic or preferences. Accordingly end-users can define conditions and action that control the content of folders upon the happening of an event. In one aspect of the invention, events correspond to changes in folder data (e.g., document added, deleted, or modified). Preferences (e.g., conditions, actions) can, for purposes of this summary, be boiled down into three categories, preferences that take action on a users behalf (e.g., move emails concerning expense reports to a folder of a similar name), preferences that control the content of folders (e.g., save all Jazz songs that were listened to in the last two weeks into a current Jazz folder), and a combination of the first two (e.g., store all expense reports less than a certain dollar amount in an approved folder and send an email to an end-user to apprise him of this action).

Workflow-like activities can be employed using active folders according to yet another aspect of the subject invention. Here an end-user utilizing preferences can specify a multi-step task or piece of work to be represented via items in folders. Actions can subsequently be taken on the folder items to complete the task or piece of work.

Chronicles folders can also be utilized in accordance with an aspect of the present invention. Chronicles represent history and context information relevant to a user or users of a system. According to an aspect of the subject invention chronicles can be stored in a data store and made freely accessible to end-users. Thus, an end-user can maintain control over historical data and write preferences based on it. For instance, a user can allow everyone in their workgroup to see the historical information about a certain stock price, but may wish to restrict context information such as whether they are at their desk or in a meeting.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system 10, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Information Agent Platform

Figure 1:
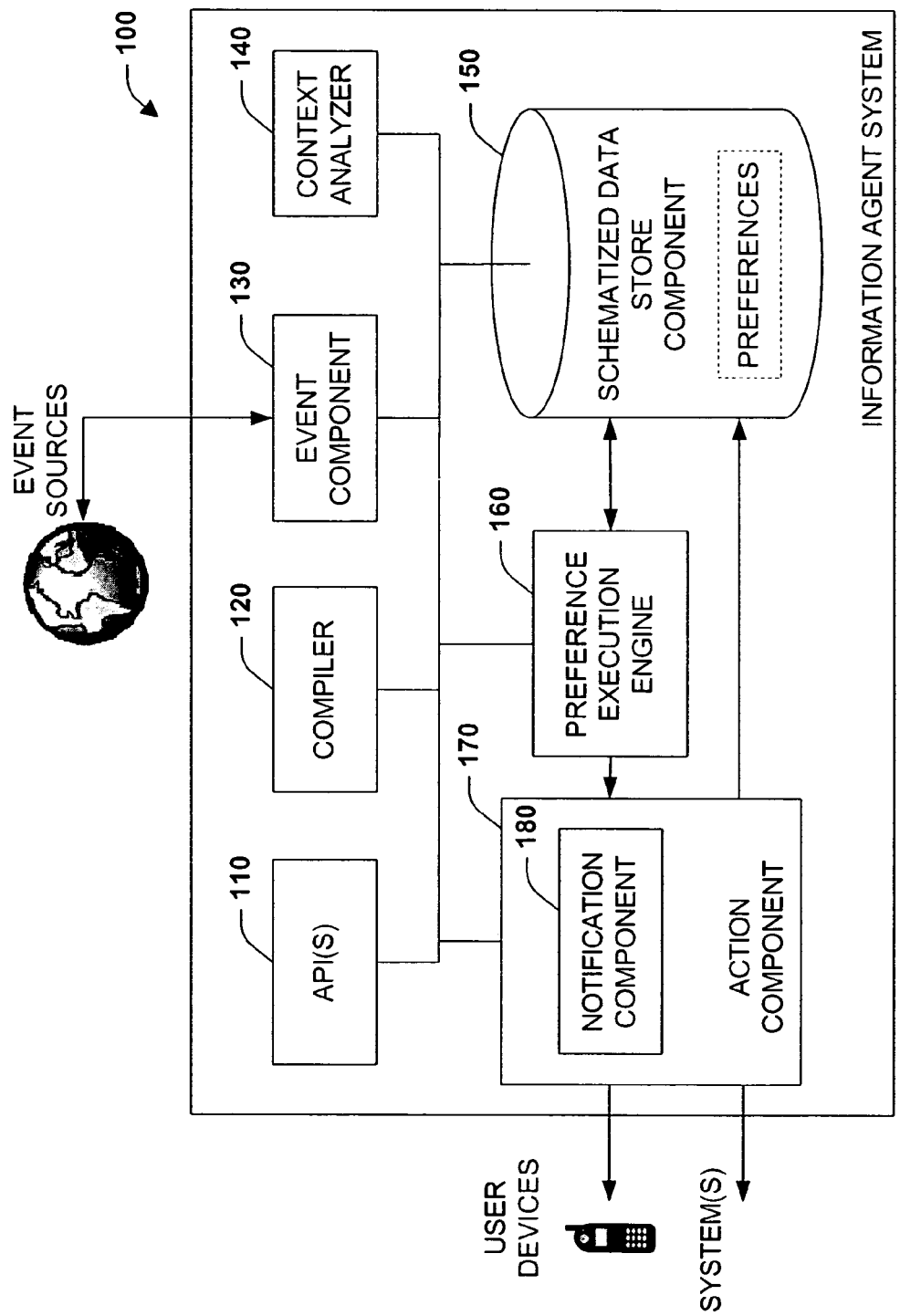
FIG. 1 is a block diagram of an information agent system in accordance with an aspect of the present invention.

Turning initially to FIG. 1, an information agent system 100 is illustrated in accordance with an aspect of the present invention. Information agent system 100 comprises application programming interface(s) (APIs) 110, compiler 120, event component 130, context analyzer 140, schematized data store 150, preference execution engine 160, action component 170 and notification component 180. System 100 provides a platform to facilitate execution of various information agent applications. System 100 can be an autonomous system or a component part of a larger system. System 100 can according to an aspect of the subject invention, be employed in connection with a computer operating system, wherein the operating system can be employed on a multitude of different computing devices including but not limited to personal computers and mobile devices such as phones, and personal digital assistants (PDAs). System 100 can also be employed on servers (e.g. SQLServer, WinFS server) and in conjunction with subscription services. Accordingly, system 100 can be utilized to provide synergy between various products and services providing information agent capabilities in clients, servers, and client-server-cloud services (e.g., Outlook, Exchange, and Hotmail).

APIs 110 are included in system 110 to facilitate interaction with system 100. APIs 110 can be utilized by a developer to set-up the various components in information agent system 110. Furthermore, APIs 110 can be used to construct a plurality of events from one or more event sources and/or the current user context available to information agent applications running on the system 100. Still further yet, an API 110 can be used to reflect on a logic schema stored in data store 150 and write preferences to the data store 150. It should be appreciated that many other uses of APIs 110, which are intended to fall within the scope of the subject will become apparent to those of skill in the art upon reading this specification.

Data store 150 is a rich structured store for schematized data. Schematization of data, the structuring of data into well-known and defined patterns, is particularly important to subject invention as it enables multiple application interaction. As will be described in further detail below, data store 150 can be used by information agent applications to store, inter alia, data associated with the applications such as tables of events and preferences for example. Furthermore, although the data store 150 is illustrated as being included in the information agent system 100, it should be appreciated that data store 150 could interact with components external from the system.

Compiler 120 is also included in system 100. Compiler 120 acts to compiler information agent applications. In particular, compiler 120 compiles developer schemas and end-user preferences. According to one aspect of the present invention, facilitates translating schemas and end-user preferences to data for storage in table, for example, in data store 150.

System 100 also comprises an event component 130. Events are triggers that initiate and provide information to preference evaluation. Events originate from event sources, which can be either internal state changes as per an application or data and/or external changes in the world. Event component 130 can capture events submitted via an API from applications and commence preference evaluation. For example, events can be raised by an Simple Mail Transport Protocol (SMTP) provider that receives a new SMTP message, data changes in the data store 150, operating system actions, explicit user action, and/or actions of other preferences. Event component 130 can also gather events or receive events from third party providers and from a plurality of different types of sources including but not limited to communications, such as Internet and network-based communications, and telephony communications, as well as software services, XML files, applications, and databases. Furthermore, the event component 130 can monitor and gather data through various methods. Exemplary methods of gathering data include but are not limited to, monitoring directories for file additions, checking system and application log files for certain types of entries, trapping alerts from applications, monitoring web pages, tracking changes in database tables, and reviewing data provided by a web service(s).

There are also a variety of different models that can be employed by the event component 130 to collect data. These models can influence how often and under what circumstances the event component 130 will collect events from various event sources.

Event component 130 can be notified or provided with data in at least one of two manners. The event component 130 may wait for information to be "pushed" or sent to it, or it can "pull" information from a source by polling the source and gathering any new or updated data. For example, if a user desires to be notified each time a headline story on a favorite news page changes, the event component 130 can be implemented so that it monitors that page and searches for changes to the headline text, for example. When the text changes, the event component 130 can extract the new headline data and provide it to system 100 for instance by storing it in an event table in data store 150. In the above example, the event component is responsible for gathering needed data, because the data is not provided to the event component 130 from the event source as would be the case with employment of a push methodology.

Additionally or alternatively, event component 130 can obtain event data for the system 100 based on either a schedule or on the occurrence of an event that meets pre-defined criteria. A scheduled event component 130 can run periodically, based on settings implemented by an application developer. The scheduled event component 130 can start running, retrieve and submit new event data and then hibernate until a next scheduled trigger time. An event-driven event component 130 can also monitor an event source by running continuously. Thereafter, when data that meets a particular criteria for collection, the event component can collect or indicated the occurrence of an event. Alternatively, an event-driven event component 130 could only run in response to a callback function or some other external stimulus. This external function would then determine whether there is valid event data to collect, and use the event component 130 as the means of collecting such data. Once the event component 130 collects data from an external event source, it can write the data to an event table and save the event table to the database 150.

No matter what method(s) or system(s) are utilized to gather and/or collect events, it should be appreciated that the events can be written and processed in batches for the purposes of efficiency. A batch, as generally defined herein, can be a set of data (e.g., events, preferences . . . ) processed as a group. The size of the group or batch can be determined and designated by a developer during system set-up and/or specified by a user via a control panel, for example.

Information collected by the context analyzer 140, according to one aspect of the present invention is inclusive of contextual information determined by the analyzer. The contextual information is determined by analyzer 140 by discerning the user's location and attentional status based on one or more contextual information sources (not shown), as is described in more detail in a later section of the description.

The context analyzer 3122, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can then be employed as an event or a condition for a user-defined preference.

Preference execution engine 160 can also be involved with action processing. Although preference logic really just produces a set of results, this is alternatively referred to herein as actions because that is a common effect of such results. Employing preference execution engine 160 to execute actions is just one manner in which actions can be executed. Actions can also be executed by applications that simply retrieve preference results from the system 100 and act upon them. Execution of actions by the execution engine as a part of system 100 has more of the flavor of an active agent, whereas execution of actions by applications has more of the flavor of passive decision logic. Accordingly, system 100 can provide a hosting service for application action handlers that can retrieve and execute actions similar to the manner in which the system 100 provides a hosting service for event retrieval and processing with respect to event component 130. Furthermore, it should be appreciated that according to one aspect of the present invention, actions that are close to data (e.g., moving an email to a particular folder) can be executed within system 100 by execution engine 160 synchronously with preference evaluation as well as a part of the same transaction.

Preference execution engine 160 of system 100, inter alia, processes or evaluates preferences. Preferences are end-user defined rule that are triggered by the occurrence of events. There are two activation models that can be supported by system 100, synchronous and asynchronous. In synchronous activation mode there is an insignificant delay between event submission and preference evaluation. That is, preference evaluation can complete before a response to an event submission is returned. In contrast, in asynchronous activation mode there is a significant delay between the completion of event submission and that of preference evaluation. For example, according to one method of implementing asynchronous activation submitted events are queued until they can be acted upon. System 100 can support one or both models activation. Furthermore, according to an aspect of the present invention, synchronous or asynchronous behavior can be chosen dynamically during batch submission according to a multitude of considerations including but not limited to batch size and time available for processing. Another aspect of preference processing involves isolation and transaction boundaries. For instance, processing preferences associated with a single event batch can be transactional. Alternatively, many event batches can be processed together as one transactional unit. System 100 can support one or both of the above model scenarios. Additionally, preference execution engine 160 deals with the transaction scope of event submission and preference processing. System 100 can support one or both of the following two models. First, event submission and preference processing can share the same transaction and thereby be executed together. Otherwise, event submission and preference processing can occur in different transactions.

According to an aspect of the present invention execution engine 160 and system 100 can support both lightweight and/or heavyweight information agent or preference applications. Lightweight applications are those that require low latency, a small database footprint, and small working set. High throughput and scalability are not first order requirements for lightweight applications. Heavyweight applications are those that require high-throughput, scalability, high reliability, strict correctness guarantees, predictable crash recovery, and easy manageability. Low-latency and resource consumption are not top priorities for heavyweight applications. High performance servers typically execute heavyweight applications, while lightweight applications are usually employed on lower performance systems including but not limited as personal computers and mobile devices. Accordingly, the execution engine 160 must be able to distinguish heavyweight applications from lightweight applications and make changes so as to execute in a manner most responsive to a specific application type (e.g., high throughput versus low latency). In general the execution engine will be most concerned with database footprint, latencies in component activation, processing, memory footprint and perpetual processes. Execution of a heavyweight application may require (1) allocation of a large database footprint so as to support, inter alia, multiple databases, tables, views, stored procedures, and user defined functions; (2) small polling intervals for event collection, notification generation, and notification distribution; and (3) batch processing of information. Execution of lightweight applications will be different in that they can (1) be employed with a minimum memory and database footprint; (2) utilized larger polling intervals for event collection, notification generation, and notification distribution (if enabled); and (3) process information such as events in small batches or individually. Furthermore, according to an aspect of the invention, hosted event providers and certain notification distributions may not be supported in lightweight applications as they would require continuously running processes which would interfere with system response time. However, it should be appreciated that execution engine 160 is flexible in that it can support incremental variations of application "lightness" depending on available resources and the state of technologies.

It should be noted that system 100 also includes an action component 170. Upon successful evaluation of preferences, preference execution engine 160 can invoke action component 170 to perform some action in accordance with one or more valid preference. Actions can affect the data store 150 (e.g., insert, delete or modify data) and/or other components and systems within or outside system 100. One specific type of action is user notification. Accordingly, action component is illustrated with notification component 180.

Figure 2:
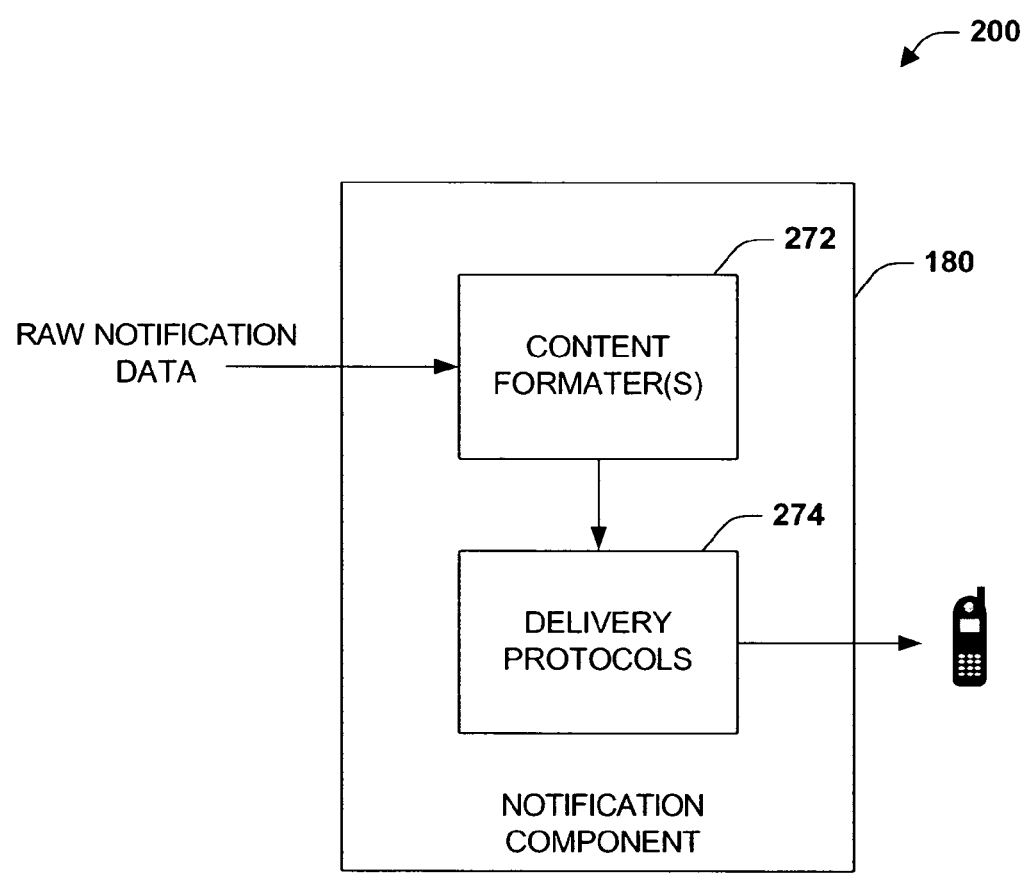
FIG. 2 is a block diagram of a notification component in accordance with an aspect of the present invention.

Referring to FIG. 2, notification component 180 is illustrated in further detail. Notification component 180 comprises formatter 272 and delivery protocols 274. The notification component 180 receives raw notification data as input and outputs formatted notifications that ultimately arrive at a user device (e.g., computer, PDA, mobile phone . . . ). After raw notification data is received by the notification component 180 notifications are transformed into a readable notification that is formatted for the destination device, and possibly for a user's preferred language and then sent to the device via the delivery protocols(s) 274. Content formatting is a task handled by one or more content formatter components 272. Content formatter(s) 272 take notification data, packaged into an array, as input. For standard delivery, there should be only one element in the array, which contains the information for a single notification record. For digest delivery, where multiple notifications are sought to be sent to a subscriber in a single message, there can be multiple elements in the array, each of which contains the data from one notification. The content formatter 272 then formats the data for display, utilizing recipient information included in the notification data, for example, to determine the appropriate formatting. Furthermore, if digest delivery is employed, the content formatter 272 is also responsible for appropriately aggregating notification information. Internally, the content formatter 272 can use any suitable scheme to format the notifications. For example, such scheme can be as simple as employing basic string manipulation, or it can be more complex, such as using Extensible Stylesheet Language (XSL) transforms or ASP-.NET rendering. When the content formatter is completed with its task, it outputs a string containing the formatted data. The string along with some notification header information that can be generated is passed to a to a delivery protocol component 274.

Notification delivery is accomplished via the delivery protocols 274. When a batch of notifications becomes available, the notification component 180 reads the subscriber data in notification(s) to determine proper formatting. The notification component 180 can then send notification(s) by way of a delivery protocol 274 to a delivery service, such as a .NET Alerts or SMTP server, for example. More specifically, when the application is running, the notification component 172 can read each notification to obtain the subscriber delivery device and locale. The distributor then matches the combination of device and locale to a specific formatter object to generate the final notification. The notification itself can contain a combination of the raw notification data, data that is computed at formatting time as well as text specified by the content formatter 272. These options allow for professional and user-friendly notification text and the inclusion of Web links and branding information.

Although the system 100 may handle internal notifications (e.g., pop-up notification) the system 100 does not have to deal with final delivery of notifications to external third party devices. Instead, the system can use delivery channels (not shown), which can be thought of as pipes to delivery services such as e-mail gateways or .NET Alerts servers. Specifically, a delivery channel can consist of a protocol and an end point address. The system 100 can configure a delivery protocol 274 to provide a pipeline from the notification component 180 to an external delivery system that transmits the notification to the recipient. The notification component can then package notifications into a protocol packet utilizing delivery protocol component 274 and send the notifications to one or more delivery channels. The delivery channels subsequently present the packets to an external delivery service, which can ultimately send the notification(s) to the intended recipient.

Information Agent Application(s)

Figure 3:
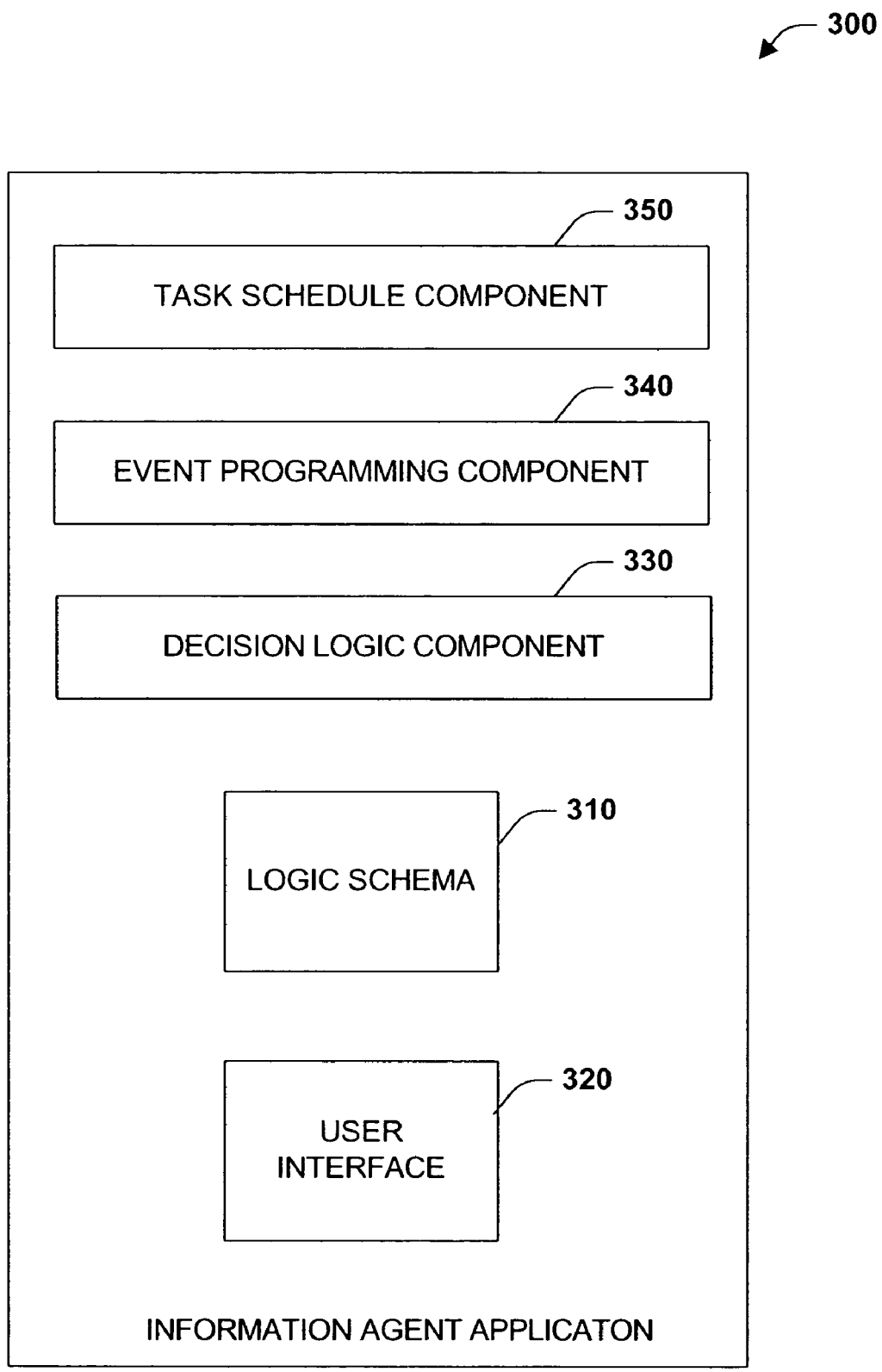
FIG. 3 is a block diagram of an information agent application in accordance with an aspect of the present invention.

Referring to FIG. 3, an information agent application 300 is depicted in accordance with an aspect of the subject invention. Application 300 is the unit of deployment on system 100 and comprises a logic schema 310, user interface 320, decision logic component 330, event programming component 340, and task schedule component 350. Logic schema 310 defines the schematized logic building blocks or templates that can be put together by an end-user. A schema developer is responsible for constructing logic schema 310, as well as default behaviors, and behaviors when exceptions should occur. In effect, the logic schema 310 constrains the actual expressive power of end-user logic, thereby making it practical and feasible for untrained end-users to actually "program" an application. The logic building blocks can include a preference class, a set of condition class definitions, and a set of potential results or actions. Conditions and actions can be related to the functionality of the associated application 300 and/or user context. Furthermore, it should be appreciated that in accordance with an aspect of the subject invention, the logic schema 310 can be defined using XML (eXtensible Markup Language).

According to an aspect of the invention there are two kinds of building blocks for which schema logic 310 can define: a condition class defining a templatized Boolean function and an action class defining a templatized procedure. A preference class is a unit of information agent schema development. A preference includes a set of allowed condition classes (e.g., IsFrom(X), IsTo(Y)) and action classes (e.g., MoveToFolder (Z), Delete( )). Furthermore, every preference is associated with a specific event class or trigger to initiate an action (e.g., EmailEvent). After a schema logic 310 is specified, the schema 310 can be compiled by compiler 120 and persisted in normalized system meta-tables in data store 150. Further, stored procedures can be created during the compilation period that can evaluate preferences. Both the schema logic 310 and the procedures can be stored in schematized data store 150 for later access and execution. Thereafter, when a user seeks to specify a preference can be compared to the logic schema 122 to verify its formal compliance and then stored in data store 150, for example in a one or more tables of preferences. When an appropriate event occurs the system 100 can then ensure that the appropriate preferences are evaluated by executing the stored procedures created during compilation time. According to an aspect of the subject invention the stored procedures can efficiently evaluate a plurality of preferences together in a set-oriented way, exploiting techniques like indexing and duplicate elimination (described infra).

User interface 320 presents a preference authoring or programming interface to end-users. End-user's are not trained developers, therefore standard procedural programming or scripting is not a viable option for users to specify logic. Accordingly the logic can be represented and presented visually to end-users in a click and drag or copy and past manner, of instance, via user interface 320. It should be noted that a user interface 320 could be a toolbar within an application 300 or a wholly independent graphical user interface (GUI). Furthermore, it should be appreciated that although application(s) 300 is illustrated containing a user interface 320 it is not necessary for application(s) 300 have their own user interfaces for defining preferences. Application(s) could be designed to utilize an operating system or an application specific user interface for purposes of logic creation.

Application(s) 300 also contains three components that can be employed by end-users to produce preference or programs of varying functionality—decision logic component 330, event programming component 340, and task schedule component 430. Decision logic component 330 enables end-users to define decision logic (a/k/a end-user logic). An application can then allow various decisions to be controlled by the defined end-user logic. For example, end-users could specify if, when, and how alerts can pop-up on a screen and interrupt the user. An application can also expose events for which end-users can attach decision logic. For instance, an electronic mail application can raise an event whenever a new email arrives in a folder. Event programming component 340 allows end-users to attach preferences or rules that specify behavior that can occur depending on the content of the message and the context of a user, for example. The conditions in the rules can access data from other applications (e.g., an active directory to check if the sender is from the same workgroup) and the actions could according to one aspect of the subject invention effect other applications 450 or raise another event. Task schedule component 430 enables end-users to attach ad-hoc or predefined tasks to an event occurrence. For example, when a new customer complaint arises, the end-user can choose to commence a pre-defined workflow to handle the complaint.

Decision logic component 330 allows end-user to write decision logic or end-user logic programs by combining condition and conclusion templates provided by a developer. Decision logic can be specified using "IF (condition) THEN (results)" preferences or rules. This type of logic is particularly appropriate for end-user specification because even end-users with absolutely no programming experience at all can easily understand and create such rules. Consider for example the following: IF (TheDogBarks) OR (TheBeeStings) THEN (IFeelSad). This rule is something that a non-developer and even a child could understand and articulate given the right user interface. This type IF-THEN logic programming is appropriate of end-user specification at least because it matches human notions of reasoning and verbal communication. The semantics of a single rule are declarative and well-understood, namely the results are true if and only if the conditions are true. Furthermore, it is intuitive for end-users to apply preference logic in the active context. The results become actions to take rather than simply statements of truisms. For example, IF (TheDogBarks OR TheBeeStings) THEN (ThinkAboutRaindropsOnRoses). Even within a single IF-THEN rule, there can be varying degrees of richness in the expressive power allowed. The previous example supra roughly corresponds to propositional logic. Propositional logic is based on the notion that simple true/false propositions can be combined to make logic statements. However, richer forms of logic that may be too complex for average end-users to specify, including but not limited to predicate logic, constraint logic, and recursion can also be employed in connection with the subject invention.

Preferences can be specified through a user interface (e.g., control panel, toolbar). A schema developer can provide a set of basic predicates as building blocks of condition logic. End-users can subsequently pick appropriate conditions, assign parameter values where appropriate, and combine them with Boolean operators (e.g., AND, OR, NOT). Similarly, the end-user can pick appropriate results and assign parameter values where appropriate. The richness of end-user specified programs comes from the schematized logic provided by a developer. These conditions and result templates can be rich in their internal logic, accessing a wide variety of information, including structured data of end user applications. Every condition or result template can have a schema describing a parameter list. An end-user can utilized these building blocks by simply providing appropriate parameter values.

What has been described thus far is a passive utilization of information agent system 100, a more active style is described infra. According to a passive use of the system 100, an application is responsible for invoking the decision logic at the appropriate stage and providing the necessary parameters. The application can also be responsible for calling another application to act on the results. Furthermore, it should be noted that the program infrastructure, system 100, may also need an interpreter (not shown) to evaluate preferences, handle conflicts between multiple preferences, and determine the correct set of results.

The event programming component 340 provides at least three functions for an information agent application 300. First, event programming component 420 can provide a set of schematized information events (e.g., defined by schema developer) that can act as hooks for end-user programs. Each event can carry structured data with it. There are a number of mechanisms for event instance capture (e.g., APIs for event submission). There are also some sub-classes of information events. One sub-class of events corresponds to data changing in the schematized data store 150. Accordingly, event programming component 340 can provide mechanisms to access data changes in the store 420 and make them available as schematized change events. Another subclass of events can correspond to recurring timer events, which can be important for scheduled preference activity. Event programming component 340 can also provide the ability to associate end-user "handler" logic to the occurrence of specific events. Additionally, the event programming component 340 can provide services to capture events, apply the appropriate decision logic and to invoke action handlers to execute the decision results.

The event programming component 340 can interact with decision logic component 330 to provide added functionality. For instance, an end-user can set up standing decision logic using decision logic component 330 that is to be repeatedly applied as new events arrive. Accordingly, the system and/or application running thereon can be active in that every triggering event causes the evaluation of the appropriate decision logic. More particularly, triggering events can form the input to decision logic, and results of preference logic evaluation can form actions that the event programming component 340 can execute on behalf of the end-user. Additionally, actions may raise fresh events that subsequently cause further logic to be executed by the programming component 340. Consequently, there is the notion of ad-hoc chained event programming.

Task schedule component 350 manages end-user task schedules or workflow. A schedule as employed herein is an orchestrated set of tasks with particular sequencing or staging between them. The purpose of executing the tasks in their entirety is typically to accomplish some real-world objective, for example, scheduling a meeting with four people. In the meeting example, the tasks in the schedule can include, inter alia, sending out the initial meeting request, and handling positive and negative responses. While workflow is common in the business process automation, the task schedules or workflow, as described with respect to the present invention, are associated with end-user activities (e.g., scheduling meetings, reviewing documents, delegating requests . . . ). While many of these workflows are simple processes, they are customizable and transparent to an end-user.

Task schedule component 350 can interact with and leverage the functionality provided by both the decision logic component 330 and the event programming component 340. The event programming component 340 provides an ideal hook to call a task schedule. For example, the arrival of a new email containing a work request may kick off a task schedule. While some task schedules are rigid with the process flow being clear-cut. Many other task schedules are flexible allowing an end-user to choose between different paths. For example, if a meeting request is rejected by two or more invitees, the meeting can be rescheduled or alternatively the meeting can proceed. This is a good realm for utilizing end-user preferences and decision logic component 330. Furthermore, it should be noted that according to an alternative aspect of the subject invention the task schedule component 350 can be incorporated into the event programming component 340 since scheduling involves reacting to changes and invoking appropriate actions. In sum, while some parts of task schedules can be hard coded by developers, a significant value is added by making the flow dynamic, configured by explicit user decisions which are sometimes automated via end-user programming.

There are at least two central elements to the information agent concept being described herein. First, the ability of end-users to provide decision logic that controls application behavior is significant. This is simply end-user programmability of applications and does not really involve agents acting on behalf of the end-users. This is referred to herein as passive invocation of end-user logic. Second, a significant element in the information agent concept is the ability for end-users to provide decision logic that is active. Decision logic that is active can be repeatedly applied when appropriate information events occur, thereby acting as a software agent on behalf of an end-user. In both cases, the decision logic is typically contextual—dependent on the context of the user and the state of the application. Various kinds of scenarios in these two context categories will be described hereinafter. Furthermore, end-to-end scenarios in the form of different "personas" that an information agent can take on will also be described.

One example of a passive invocation of end-user logic is an operating system utilizing an information agent to control interruptions of a user. Whenever, some application wants to raise a pop-up on a screen with a sound the operating system could utilize an API to call the information agent decision logic component to determine what should happen. There are several possible conclusions that could be revealed by the decision logic component including display, defer, delete, and forward. The operating system could then implement the actual decision once the decision logic component 330 tells it what to do.

The decision logic component 330 could also be employed to customize options of conventional programs. For instance, conventional email programs provide options for reading receipts, applying signatures, and for mail priorities. As per reading receipts, there is often a check box to indicate whether read receipts should be enabled or not. The decision logic component 330 could customize this option enabling receipt reading for only important messages or messages sent to his management. Furthermore, a user can typically apply a signature to outgoing messages, however employing the decision logic component 330 can make the operation more valuable and personalized by attaching a signature to messages depending on the intended recipient. Finally, email priority level is typically determined and set by the sender. By utilizing the decision logic component 330 mail priority could also be determined by the recipient depending for example on the recipient's current context. Furthermore it should be noted that end-user logic can be utilized not only to determine what to do in situations like those above (e.g., append signature), but also what the content of the actions should be (e.g., what signature should actually be appended).

Active invocation of end-user logic via decision logic component 330 can be utilized in a plurality of situations. For example, active logic can be employed to organized data such as categorizing pictures as they are downloaded from a camera, or email as it is received according to organization rules. Active logic can also be utilized to react to changes such as when a new email arrives and the recipient is not at his/her desk forward it to their mobile phone. Active logic can also be used to enhance communication for example by answering a user's phone when they are not available and replying with the next time the user will be available to accept a call, for example. Furthermore, active logic can be used to subscribe to published information such that a user can be notified when bad weather is expected at their travel destination, for instance. Still further yet active logic can be employed to maintain context. For example, as a user enters and leaves meetings in different locations context can be appropriately updated (e.g., remote or local, busy or free, . . . ).

Information agents can play various roles just as an actual human agent does for a user. Accordingly, information agents can have varying personas including but not limited to a secretary to enhance communication, a librarian to organize information, a service agent to ensure a principal/user is aware of opportunities, a chaperone to ensure the principal/user does not get in trouble, and a valet to make a principal/user look and feel good. As a secretary an information agent could perform various functions such as answering phone calls when the principal/user is not available, transferring a caller to an unavailable user's voice mail and instant messaging the user indicating that a call was missed. Functioning as a librarian, an information agent could organize digital photos and emails. As a service agent an information agent could keep a principal informed of opportunities to buy a sell stock or real estate for example. An information agent acting as a chaperone could inform the principle when their bank account balance is below a minimum balance, inform the principle when the are close to their credit card limits, provide notifications to ensure bills are paid on time, and/or alert a principal of a battery or full disk on their computer. As a valet, an information agent could pull up all documents and emails relating to an incoming call from an important customer and/or ensure that embarrassing notifications do not pop up in the middle of a presentation.

Logic Schema

Figure 4:
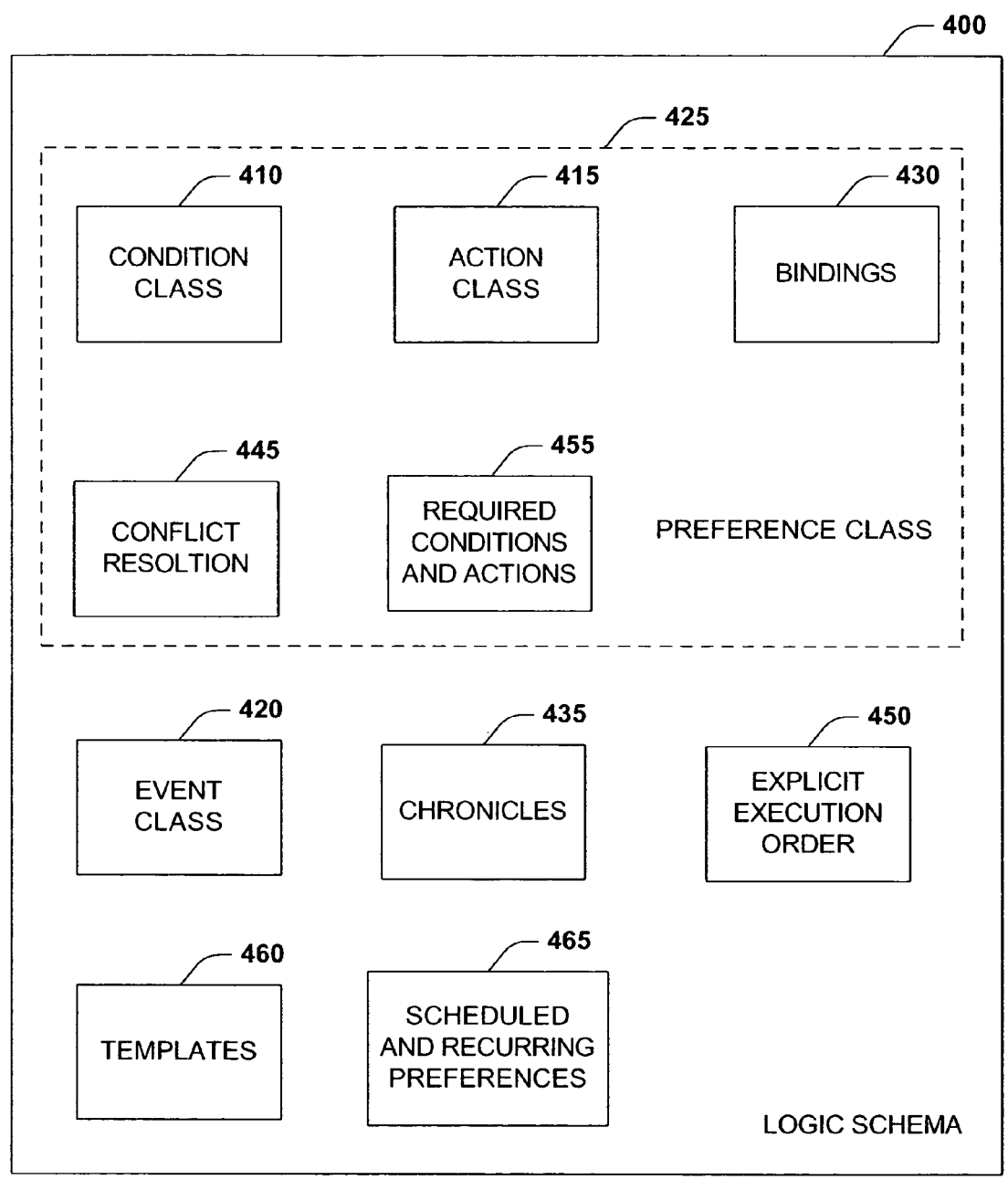
FIG. 4 is a block diagram of an exemplary logic schema in accordance with an aspect of the present invention.

Turning to FIG. 4 an exemplary logic schema 400 is depicted in accordance with an aspect of the present invention. Logic schema 400 comprises condition class 410, action class 415, event class 420, preference class 425, bindings 430, chronicles, 435, conflict resolution 445, explicit execution ordering 450, required conditions and actions 455, templates 460, and scheduled and recurring preferences 465. Exemplary logic schema 400 and the aforesaid schema components are provided for purposes of simplicity of explanation. Therefore, it should be appreciated that a logic schema 400 can contain all of the aforementioned components, a subset thereof, and/or additional schema components not herein described. As previously discussed a schema developer defines the schematized logic building blocks that can be put together by an end-user. Two kinds of building blocks are a condition classes 410 and an action classes 415. The condition classes 410 can define templatized Boolean functions while the action classes 415 can define templatized procedures. A preference class 425 is a unit of information agent schema development. A preference class 425 can include, inter alia, a set of allowed condition classes and action classes, bindings 430, conflict resolution 445, and required conditions 455. Furthermore, every preference class 425 can be associated with a specific event class 420, which defines triggering events for preferences. The following is an example of a preference class for an information agent email application:

InboxPreferenceClass
    ConditionClasses
        IsFrom(X)
        IsTo(Y)
    ActionClasses
        MoveToFolder(Z)
        Delete( )
    TriggeringEventClass
        EmailEventClass
    Source of triggering event
        Changes to an inbox folder
        ApplyNow( )
        ScheduledEvent( )

Preferences are a unit of end-user logic. Preferences can be logical statements of the form "ON (event) IF (condition) THEN (actionset)". Every preference therefore should but is not required to have the following properties. First, the preference should belong to a preference class. Second, the preference should by owned by some user or principal. Third, the condition should be a declarative Boolean expression combining one or more instances of condition classes, wherein every condition instance defines the parameter values for a condition class. Finally, the action set should be a set of action classes. Every action instance defining parameter values for an action class. For example:

UserPreference:
   Instance of InBoxPreferenceClass
     IF (IsFrom(John) OR IsTo("bookclub") THEN MovetoFolder('Book Club')

End-users can then "program" by defining event handlers. Each event handler is defined by a set of preferences of the same preference class and therefore triggered by the same event. For example:
     IF (IsFrom(John) OR IsTo("bookclub") THEN MovetoFolder('Book Club')
     IF (IsTo('SillyStuffDL') THEN Delete( )

Subsequently, when a particular event occurs (e.g., an email arrives) more than one preference may have a valid condition, leading to the possibility of executing multiple actions. Various conflict resolutions mechanisms could then be applied as described infra.

Furthermore, it should be appreciated that every condition is simply a Boolean function along with its invocation parameters. According to one aspect of the subject invention schematic logic is required to span application boundaries. Therefore, conditions need to be able to view data created by a multitude of different applications. For example:
   Presence data: IF (IsFrom('John') AND SenderIsOnline( )) THEN ...
   Location data: IF (IAmFarMeetingLocation( )) THEN ReminderMinutesWindow(30)
   Organizational hierarchy: IF (IsFromMyManagement( )) THEN MarkAsHighPriority( )

All of the above examples, deal with user context. User context can be determined by context analyzer 140 (FIG. 1) and stored in data store 150 (FIG. 1) for use by information agent applications. Thus, a function like "Bool IsOnline(X)" can return true or false based on the identity of the person X passed in and his/her present context as determined by the context analyzer.

Continuing with the above example, a schema developer of a preference class such as InBoxPreferenceClass needs to provide a condition class 410 for use by an end-user. There are several manners in which this can be done. For example, a condition class could be IsOnline( ). In this case an end user could define a preference in the form of "IF (IsOnline(Email.Sender)) THEN . . . " Alternatively, the condition class could be SenderIsOnline( ) and in its declaration the schema developer could bind it to IsOnline(X), and bind X to Email.Sender. Accordingly, an end user could define a preference or rule as: "IF (SenderIsOnline( )) THEN . . . " Although, the present invention supports a multitude of forms of specifying condition classes 410, it should be noted that there is a significant difference in the above described form. The first form is a traditional predicated calculus rule form, where the person authoring the rule (i.e., the end-user) reasons about schemas and variable bindings. The second form is less flexible, but definitely simpler for an end-user to employ.

Accordingly, class conditions 410 is an area where schema developers can restrict the expressive power of end-user logic and thereby making it more practical and feasible for naïve end-users to "program" information agent applications.

In brief, when a schema developer authors a preference class 425, a set of condition class declarations 410 are made. Each condition class declaration identifies an implementation function and some parameters to the function that are bound by developer-defined expressions. The remaining parameters are constants provided for every condition instance by the end-user when setting up preferences. Actions are instances of action classes 415. Each action class 415 is a procedure with parameters. Just as with conditions, the parameters may be bound by the developer or may be assigned as constants by the end-user. Furthermore, event class 420 provides for definition of events. An event class defines the information content of an event, as specified by a developer or assigned by an end-user, which triggers preference evaluation.

As noted throughout this specification and in accordance with an aspect of the subject invention, end-users are not expected to be experienced programmers. Accordingly, preferences are created based on conditions with intuitive names (e.g., EmailIsFrom( )), and the arguments to conditions can be simple user defined constants (e.g., Mary). This enables an end-user to write a preference that is triggered by EmailIsFrom(Mary). However, having arguments based solely on user-provided string constants is too restrictive. Accordingly, bindings 430 can be specified in logic schema 400 as a part of the preference class 425 to both make programming easier for end-users and expand the domain from which information can be retrieved. There are at least three types of parameter bindings that can be specified in schema 400. First, constant bindings which predefine a constant may be specified. Specifying a constant binding is beneficial at least because it frees an end-user from having to chose or specify a constant. Event bound expressions can also be bound to values provided as arguments to conditions and actions. More specifically, an expression can be defined that uses event fields and constants to compute a value. For example:
   Condition Class: SenderIsOnline( )
   Definition Function: IsOnline(X)
   Binding: X→Email.Sender Finally, constant accessors may be defined. Constant accessors are named groups of objects that provide arguments to conditions and actions in place of a user having to manually specify each such object.

Figure 5:
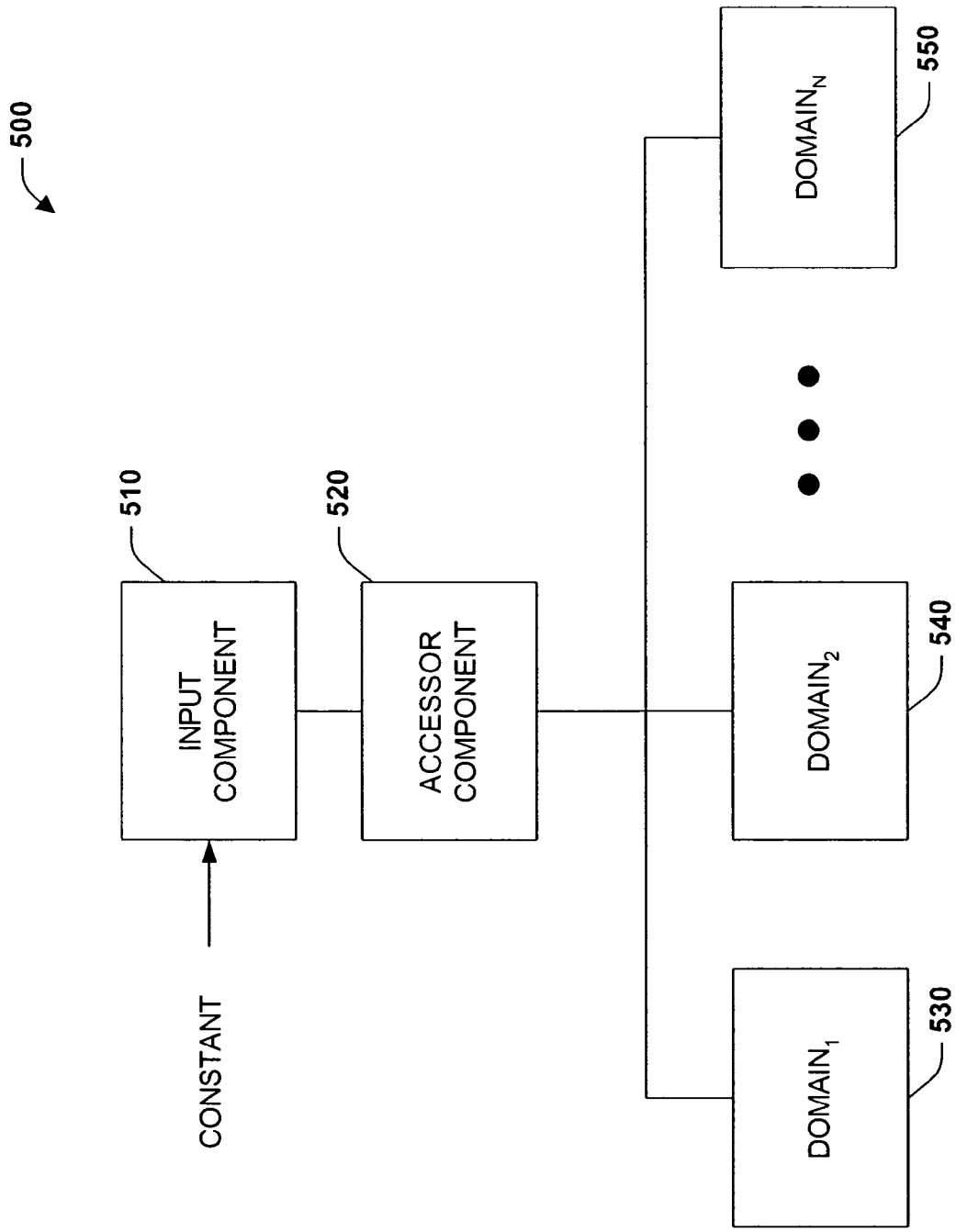
FIG. 5 is a block diagram of a system for evaluating constant accessors in accordance with an aspect of the subject invention.

Constant accessors are very powerful constants that allow preferences and conditions to be written that are capable of navigating and retrieving information from various domains. These constants are simply names veneered over functions that operate to find and materialize the correct information, namely the members of the group associated with the name of the constant. Turning briefly to FIG. 5, a system 500 for retrieving constant values is illustrated in accordance with an aspect of the present invention. System 500 comprises an accessor input component 510, a linking component 520, and a plurality of domains 530, 540, and 550 (DOMAIN$_1$ through DOMAIN$_N$, where an is greater than one). Accessor input component 610 receives as input a constant such as MyFamily, MyCoworkers, or MyFriends, and provides the constant to accessor component 520. Accessor component 520 is operable to search though all accessible domains 520, 530, and 540 to try and resolve or link to the value(s) associated with the members of the group specified by the input constant. According to one aspect of the subject invention, domains 530, 540, and 550 can be applications stored in a schematized data store. For instance, domain 520 could be an email application, domain 530 could be a calendar application, and domain 540 could be a customer account application. Accordingly, accessor component 520 could access an email application or localized data registry in an attempt to determine the value of a constant (e.g., MyFamily). If component 520 cannot resolve the value in that domain or a localized data registry it can keep checking additional accessible domains until in determines the constant value or it has checked all available domains. In one instance accessor component could find data in the email application such as:

```
<MyFamily>
    <Father>Bob Jones</Father>
    <Mother>Barb Jones</Mother>
    <Brothers>
        <Bro1>Michael Jones</Bro1>
        <Bro2>Jason Jones</Bro2>
    </Brothers>
</MyFamily>
```

It should be noted that the XML representation of the members of the group associated with the constant MyFamily is used for illustrative purposes only. The population of a group can be defined and/or materialized by the invention in many ways. Accordingly, accessor component 520 could resolve or link MyFamily to Bob Jones, Barb Jones, Michael Jones, and Jason Jones based on the data retrieved from the email application. Accessor component 540 could, however, continue to check other domains to ensure data completeness and accuracy. For example, it could find <MySister>Jennifer Jones</MySister> in a calendar application and add this value to the string of values relating to the constant MyFamily.

Constants discussed thus far (e.g., MyFamily, MyCoworkers, MyFriends, MyFavorite Musicians) are known as first order constants as they are defined relative to a given user. An accessor component 510 or accessor can then key off of a user's identity or other starting points. It should also be noted that $N^{th}$ order constants can also be composed and saved by a user by using preferences to combine previously defined groups (e.g., named by constants). By way of illustration, consider the combination of constant named groups that provide functionality similar to semantics of prepositional phrases. For instance, a user can compose and save constants representing groups like FriendsOfMyFamily or EmailsFromPreferredCustomersInAppointmentsToday. From another perspective the constant extensions are similar to conditions on fields of items that can also be represented as constant accessors and combined with other constants.

Therefore, constant accessors provide navigation to data across different domains. The combination of schematized logic with navigational accessors enables non-programmers to write cross-domain preferences. Moreover, a relatively small number of condition classes combined with a relatively small number of accessor constraints facilitates designation of a large number of interesting and powerful conditions that would otherwise have to be anticipated by an application developer.

In addition, it should be noted that preferences groups can be also be specified. Decision logic defined by end-users is represented by one or more sets of preferences. Accordingly, preferences groups can be defined as a container for groups of associated preferences. Preferences within a preference group can then (1) belong to the same preference class, (2) be evaluated together, the results being subject to conflict resolution. Furthermore, preferences in preference groups can be collectively enabled and disabled. Collective enablement and disablement of preference can be useful in a myriad of scenarios. For example, an end-user my have one set of preferences when at work and another set of preferences when at home. Thus, preferences groups can be enabled or disabled based on user context.

Logic Schema 400 can also include chronicles 435. Many information agent applications need to maintain state in order to make sensible decisions. As a simple example consider a news publishing information agent application. End-users subscribe to news articles of interest. Event feeds carry a steady stream of news articles. One problem is that the same article may arrive many times with slightly modified content, but with the same title. In this context, a sensible condition would be: IsNewArticle( ). This condition can check that the title has not been seen before. Another example would be to check if a steady stream of updates makes an article a breaking story. In order to enable this type of functionality, a state needs to be maintained as events are processed. This state is referred to herein as a chronicle, because it is a representation of application history.

An information agent schema developer can define chronicles (e.g., as tables in a relational database, or in folders managed by an operating system). More importantly, a schema developer can define logic that could run at critical stages of event processing in order to update an application state. For example, an appropriate time to compute if an event corresponds to a breaking story would be before events are processed. Additionally, the appropriate time to record the fact that a news article was processed so that subsequent events with the same title show up as duplicates would be after the events are processed. Furthermore, it should be noted that chronicles can also be employed to record action history as well as event history.

Developers can specify conflict resolution procedures or logic in a conflict resolution component 545 as a part of the preference class 425 in logic schema 400. When an event occurs multiple actions can arise if multiple preferences match the event. Thus, a system and method for determining the order of execution and/or the final action taken is desired. There are at least three ways to deal with the triggering of multiple actions. First, schema 500 could enable end-users to define action or preference priorities. For example, end-users could assign priorities to every preference. Additionally, end-users could assign a stop processing indicator (e.g., flag) to certain preferences. Accordingly when an event triggers multiple actions, actions could be executed in order of priority. Additionally and alternatively, if multiple preferences match within a preference group the highest priority preference can be executed while the others are discarded. Furthermore, schema 400 could enable end-users to specify conflict resolution procedures such as allowing them to attach a stop processing indicator to certain preferences to deal with a situation wherein a preference containing the indicator is triggered at the same time as other preferences. Another manner in which conflicts can be resolved is by defining action class priorities within the schema 400. Accordingly, a schema developer can specify action class priorities. For instance, the MoveToFolder action class could be designated higher priority than the Delete action class. Other conflict scenarios can arise when multiple actions of the same action class are triggered simultaneously. Schema developers can define a plurality of conflict resolution logic to deal with this type of situation. For example, assume there is an action class that sets the volume of a desired pop-up (e.g., SetVolume( )). Assume further that an event triggers two actions, SetVolume(50) and SetVolume(70). In this case, conflict logic defined in conflict resolution component 545 could be defined such that the action taken corresponds to the minimum, maximum, or average of the two levels.

Preference execution order can also be specified in schema 400 via explicit execution component 450. In some situations, explicit ordering of preferences is necessary, because the actions of one preference can affect the conditions in another. For example, with email preferences, one preference could be used to decide the priority of the incoming message, while another preference could be written to react to the priority of the message and decide how to act upon it. End-user preference writers are typically inexperienced programmers. According to an aspect of the subject invention, end-users are not required to write preferences or rule with side effects and hence ordering requirements. It is preferable for schema developers to hid the ordering dependencies from the end user. This can be accomplished in a plurality of different ways including but not limited to preference class ordering, explicit chaining and preference group ordering. By preference group ordering a schema developer can order one preference class to execute before another. In the aforementioned example, the preference class for establishing message properties (e.g., priorities) should come before the preference class that reacts to the message. According to an aspect of the invention, the user interface presented to an end-user could be divided into panes such that each preference class has its own pane. As per explicit chaining, a schema developer could specify actions that raise fresh events and the ordering thereof. Accordingly preference classes could be implemented with action-event chaining rather than preference class ordering. Further yet, a schema developer could specify execution ordering using preference groups. Utilizing preference group ordering provides the same capability as preference class ordering, but in a more flexible form. For instance, every preference group could have exactly one preference in it, leading to the equivalent of a totally ordered sequential list of preferences.

"Required" conditions and actions can also be specified in schema 400 as a part of preference class 425 utilizing required conditions and actions component 455. Every preference class can include required conditions and actions. Required conditions and actions can be employed to enforce certain common patterns on all preferences. For example, in the familiar email processing example applied on a server, a required condition on Inbox preferences can be that the owner of the preference is also the recipient of the email.

Templates 460 can also be defined in logic schema 400. To facilitate non-experienced end-user authorship of logic, templates can be provided by developers or third parties for end-users to adopt and utilize. Consequently, if templates are available to end-users the system 100 should support the abstraction of a preference template. This can simply correspond to a persisted complete preference (the conditions expressions and actions are chosen) with some of the parameters being unspecified.

Schema 400 can also be defined so as to deal with scheduled and recurring preferences via scheduled and recurring preference component 465. Many information agent applications may desire to utilize preferences that are evaluated on a recurring schedule. One of many examples would include a preference that sends summary status at 5 p.m. every working day. According to one aspect of the invention, scheduled and recurring functionality can be implemented in a schema 400 using two abstractions. First, a system-defined event class (e.g., TimerEvent) can be employed to provide an event hook for scheduled activity. This event class can be configured to various regular granularities. Further, data associated with the event can include current time and previous firing time. Second, every scheduled preference can include a condition such as:

RecurrenceInWindow(RecurrenceSchedule, StartTime, EndTime), where
- RecurrenceSchedule is a constant representing the desired recurrence pattern, as captured from an end-user specification;
- StartTime is bound by a developer to the previous time of the timer event; and
- EndTime is bound by a developer to the current firing time of the timer event.

In sum, a logic schema 400 can contain a number of different components or sections so as to provide logic building blocks for end-user preferences. The schema can take any form, for example an XML file. Once the schema is completed it can be compiled into a database representation and stored, for example in data store 150 (FIG. 1). It should be appreciated that the schema file may be directly authored or constructed using an applications such as Visual Studio. Accordingly, the system compiler should be able to support schema files produced using a multitude of schema editor applications.

Application Execution

Execution of information agent applications can be subdivided into three distinct categories: event processing, preference processing, and action processing. Event processing deals with how events are captured and how they activate preference logic. Preference processing, can be accomplished in a plurality of different manners depending in part on different preference processing modes. Finally, application execution involves determining how to process actions.

Events can be captured by some application explicitly submitting events using system APIs 110 (FIG. 1). Events can be submitted individually or together as a batch. There are a myriad of scenarios for event capture including but not limited to:
- As part of regular application logic, for example, an Exchange SMTP provider may receive new SMTP messages and explicitly raise information agent events.
- From data changes, for instance, events being triggered for IA logic when data changes in data store 150
- From an operating system, for example, an application could listen to an operating system and/or its associated runtime and raise events upon detection of a particular action.
- From information agent preferences, the action of one preference could raise another event leading to chaining across preference evaluation.
- A user could explicitly specify that events be generated. For example, a user could specify that an event be generated corresponding to each file in a folder.

Furthermore, it should be noted that system 100 can provide a hosting service for event capture logic which does not require a larger application to be actively executing. For example, an information agent application may desire that certain operating system events trigger application activity. Consequently, it is possible to host this event provider in a service rather than requiring a separate application to run merely for this functionality.

Preferences are activated by the occurrence of events. Processing thereof can either be synchronous, asynchronous, or a combination of the two. With synchronous processing there is insignificantly small delay between event submission and preference evaluation. Asynchronous processing, on the other hand, has a significant delay between event submission and event processing. The system of the subject invention supports both models of processing and can choose between the models in real-time based on event batch submission.

Moreover, according to one aspect of the subject invention preference processing takes advantage of the power of database queries to efficiently evaluate preferences. Exposed to a developer and ultimately an end-user is a declarative programming model allows condition functions to be specified in accordance with a one-at-a-time model. A one-at-a-time programming model is a model that is most natural to use and which enables developers and users to specify one event against one preference. However, according to an aspect of the invention, the system 100 crafts conditional class queries that execute in a set oriented manner, exploiting techniques like indexing and duplicate elimination. This is beneficial in that preferences are evaluated in an efficient manner while developers and end-users are left to conceptualize and write programs in a one-at-a-time manner, which although easy to understand and write would an inefficient way to execute a multitude of preferences. Furthermore, while multiple preferences can be processed in batches, it should be noted that preferences can be evaluated individually upon an event happening.

Figure 6:
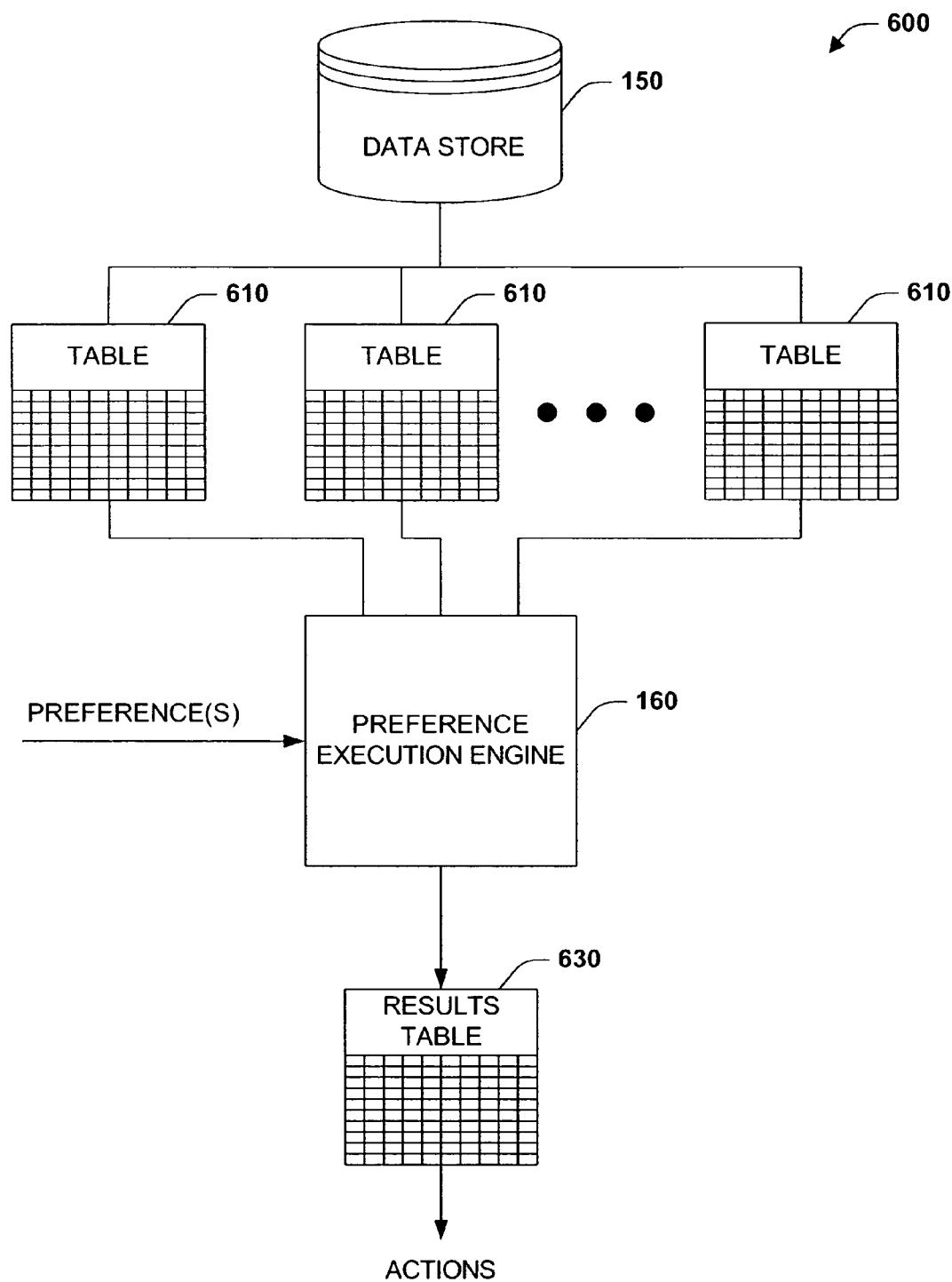
FIG. 6 is a block diagram of a preference evaluation system in accordance with an aspect of the present invention.

Turning to FIG. 6, a system 600 for preference evaluation is illustrated in accordance with an aspect of the subject invention. System 600 comprises a data store 150, a multitude of tables 610, a preference execution engine 160 and a results table 630. Data store 150 houses a multitude of tables 610, which are produced by system 100 from a developer schema as well as end-user preferences. As a result of the occurrence of an event, preference execution engine receives or retrieves preferences, for example from a table stored in data store 150. Execution engine 160 then utilizes the preferences as well as some stored procedures (which can also be stored as data) to query tables 610 and produce a results table 630. Result table 630 can store the preferences whose conditions have been satisfied such that specified actions can be commenced thereon.

The number and complexity of tables 610 can vary depending on the intricacy of the schema written be a developer to support end-user preferences. An example is presented hereafter in order to clarify how system 600 utilizes database tables and queries to processes preferences. In this example, there are two individuals, Jack and Jill who seek to utilized several groups of preferences. As has been discussed, before Jack and Jill can specify end-user preferences a schema must have been produced. A schema has several parts as discussed above however for purposes of ease of understanding a very simple schema will be described herein. One of the essential parts of a schema is the definition of event classes. In this example, two event classes are considered, EmailEvents and Stockevents. Turning to the Appendix attached hereto, pseudo code is shown illustrating a schema definition of the two event classes as well as three preference classes. The two preference classes are based on EmailEvents while the third class is based on StockEvents. The information system 100 can then utilize this schema to produce a preference class table and a condition class, which can be stored in data store 150. For example:

PreferenceClasses Table

| App. Id, | Pref. Class Id, | Pref. Class Name, | Event Class Id |
|---|---|---|---|
| 1 | 1 | EmailPreferences1 | 1 |
| 1 | 2 | EmailPreferences2 | 1 |
| 1 | 3 | StockPreferences | 2 |

ConditionClasses Table

| Pref. Class Id, | Cond. Class Id, | Cond. Class Name |
|---|---|---|
| 1 | 1 | MailIsFrom |
| 1 | 2 | MailContains |
| 2 | 3 | MailPriority |
| 2 | 4 | MailIsFrom |
| 3 | 5 | StockSymbol |
| 3 | 6 | TargetPrice |

Jack and Jill can then define their preferences. For purposes of this example assume that Jack defines three preference groups PG(Jack, 1), PG(Jack, 2), and PG(Jack, 3). Furthermore Jack defines five preferences distributed amongst the groups as follows:

PG (Jack, 1)

P1: On EmailEvents if MailIsFrom (Mary) AND MailContains ("California")

then PopAToast

P2: On EmailEvents if MailIsFrom (Bob) OR MailContains ("InfoAgent")

then PopAToast

P3: On EmailEvents if MailIsFrom (Home) OR MailIsFrom (MyWife) OR MailIsFrom (MySon)

then PopAToast

PG (Jack, 2)

P3: On EmailEvents if MailIsFrom (Home) OR MailIsFrom (MyWife) OR MailIsFrom (MySon)

then PopAToast

PG (Jack, 3)

P4: On EmailEvents if MailIsFrom (Home) AND MailPriority (10)

then MoveToFolder ("URGENT")

P5: On EmailEvents if MailPriority (15)

then MoveToFolder ("VERY URGENT")

Assume for purposes of this example that Jill defines two preference groups (Jill, 1) and (Jill, 2). Furthermore, assume that Jill specifies five preferences distributed amongst the groups as follows:

PG (Jill, 1)

P6: On EmailEvents if MailIsFrom (Home) OR MailContains ("Vacation")

then PopAToast

P7: On EmailEvents if MailIsFrom (Bob) AND !MailContains ("Work")

then PopAToast

P8: On EmailEvents if MailContains ("Bonus")

then PopAToast

PG (Jill, 2)

P9: On StockEvents if StockSymbol=('EBAY') AND TargetPrice>120 then SendCellPhoneMessage ('Me')

P10: On StockEvents if StockSymbol=('AMZN') AND TargetPrice>50
   then SendCellPhoneMessage ('Me')

Information agent system 100 can then utilized these preferences to produce additional relational database tables describing the preferences and conditions associated therewith. Consider the following exemplary tables one at a time and how they are employed to evaluate preferences.

The Preference Groups table shown below contains five rows, one for each of Jack and Jill's defined preference groups. Further note that a column is designated to indicate whether a preference group is enabled. As described supra, this is useful, for instance, if a user wants to specify one group of preferences that are enabled when they are at home and another group of preferences that are enabled when they are at work. Here all preference groups are shown as enabled.

PreferenceGroups Table

| Pref. Group Id, | Pref. Group Name, | Subscriber Id, | Enabled |
|---|---|---|---|
| 1 | Jack_1 | Jack | True |
| 2 | Jack_2 | Jack | True |
| 3 | Jack_3 | Jack | True |
| 4 | Jill_1 | Jill | True |
| 5 | Jill_2 | Jill | True |

A PreferenceGroupMemberShip table can also be defined to summarize the which preferences are members of which preference groups. This table illustrated below contains eleven rows, one for each preference.

PreferenceGroupMemberShip Table

| Pref. Group Id, | Pref. Id, |
|---|---|
| 1 | 1 |
| 1 | 2 |
| 1 | 3 |
| 2 | 3 |
| 3 | 4 |
| 3 | 5 |
| 4 | 6 |
| 4 | 7 |
| 4 | 8 |
| 5 | 9 |
| 5 | 10 |

The preference table below can be stored in data store 150 to summarize data relating to the preferences defined by the users. This table will contain ten rows corresponding to each of the ten preferences. Please note that this table as been concatenated to show only important columns and names.

Preference Table

| Pref. Class Id, | Pref. Id, | Orig. Cond. Expr., | ANDGroupCount |
|---|---|---|---|
| 1 | 1 | From (Mary) AND Contains (CA) | 1 |
| 1 | 2 | From (Bob) OR Contains (IA) | 2 |
| 1 | 3 | From (Home) OR From (MyWife) OR From (MySon) | 3 |
| 2 | 4 | From (Home) AND Priority (10) | 1 |
| 2 | 5 | Priority (15) | 1 |
| 1 | 6 | From (Home) OR Contains (Vacation) | 2 |

-continued

Preference Table

| Pref. Class Id, | Pref. Id, | Orig. Cond. Expr., | ANDGroupCount |
|---|---|---|---|
| 1 | 7 | From (Bob) AND !Contains (Work) | 1 |
| 1 | 8 | Contains (Bonus) | 1 |
| 3 | 9 | Symbol (EBAY) AND Price (120) | 1 |
| 3 | 10 | Symbol (AMZN) AND Price (50) | 1 |

Note:
sum = 14

One should also notice that there are a total of 14 AND Groups in the above preference table. Additionally, there are a total 19 conditions above. Information about these AND Groups and conditions can be captured in additional tables as follows:

ANDGroups Table

| Pref. Id, | ANDGroupId, | Condition-Count | |
|---|---|---|---|
| 1 | 1 | 2 | From (Mary) AND Contains (CA) |
| 2 | 2 | 1 | From (Bob) |
| 2 | 3 | 1 | Contains (IA) |
| 3 | 4 | 1 | From (Home) |
| 3 | 5 | 1 | From (MyWife) |
| 3 | 6 | 1 | From (MySon) |
| 4 | 7 | 2 | From (Home) AND Priority (10) |
| 5 | 8 | 1 | Priority (15) |
| 6 | 9 | 1 | From (Home) |
| 6 | 10 | 1 | Contains (Vacation) |
| 7 | 11 | 1 | From (Bob) AND !Contains (Work) |
| 8 | 12 | 1 | Contains (Bonus) |
| 9 | 13 | 2 | Symbol (EBAY) AND Price (120) |
| 10 | 14 | 2 | Symbol (AMZN) AND Price (50) |

AND Group ids are numbered sequentially from the previous table. ConditionCount records the number of conditions connect by an AND. The only surprising row entry in the above table is the one shown below.

| 7 | 11 | 1 | From (Bob) AND !Contains (Work) |
|---|---|---|---|

Notice that the ConditionCount is 1 rather than 2 as would be expected. In order to account for the presence of NOTs in query evaluation, the condition count is defined to be the sum of only those conditions in an AND Group that do not have a Not (!) in front of them. The conditions with a NOT in front of them can be summarized in a separate table as shown infra.

ANDGroups can further be defined in a table a terms of ANDGroupMembership as the following concatenated table illustrates:

ANDGroupMembership Table

| ANDGroupId, | Cond. Class Id, | Cond. Id | |
|---|---|---|---|
| 1 | 1 | 1 | From (Mary) |
| 1 | 2 | 2 | Contains (CA) |

-continued

ANDGroupMembership Table

| ANDGroupId, | Cond. Class Id, | Cond. Id | |
|---|---|---|---|
| 2 | 1 | 3 | From (Bob) |
| 3 | 2 | 4 | Contains (IA) |
| 4 | 1 | 5 | From (Home) |
| . | . | . | . |
| . | . | . | . |
| . | . | . | . |
| 14 | 6 | 19 | Price (50) |

As noted above, conditions with NOTs can be thought of as a special case and summarized in their own table as follows:

Not Table

| Cond. Class Id, | Cond. Id | |
|---|---|---|
| 2 | 14 | !Contains (Work) |

A conditions value table can also be created to store the value of conditions specified in preferences. It should be noted that this table only allows for two parameter values associated with each conditions. For purposes of this example, that is sufficient in part because all the conditions only have one parameter value, however if conditions are allowed to contain more than two values associated therewith then the table can be extended or alternatively another table may be instantiated to how the extra condition values.

ConditionValues Table

| Pref. Id, | Cond. Class Id, | Cond. Id, | ParamVal1, | ParamVal2 |
|---|---|---|---|---|
| 1 | 1 | 1 | Mary | NULL |
| 1 | 2 | 2 | CA | NULL |
| 2 | 1 | 3 | Bob | NULL |
| 2 | 2 | 4 | IA | NULL |
| 3 | 1 | 5 | Home | NULL |
| . | . | . | . | . |
| . | . | . | . | . |
| . | . | . | . | . |
| 10 | 6 | 19 | 50 | NULL |

A ConditionsResults table can also be provided. A ConditionsResults table can be utilized as a precursor to the final results table 730. ConditionsResults table is populated as condition queries are executed. As condition queries have not yet run, there are no rows in the table yet. Exemplary procedures for evaluating conditions and populating the table are disclosed below.

ConditionResults Table

| Bool, | Cond. Id, | Pref. Id, | Event Id |
|---|---|---|---|

As mentioned previously, one of the aspects of the present invention is to present a declarative programming system that allows exposure of a one-at-a-time model to developers of condition functions but which ultimately crafts conditional class queries that execute in a set oriented manner to take advantage of database query efficiencies. Accordingly, one-to-one condition class declarations can be transformed into queries. For instance, in EmailEvents an end-user preference can make an action dependant on the sender of an email (e.g., Jack's P1). Thus, an end-user via a user interface could write MailIsFrom(Mary). When executing preferences, however, system 700 would execute database query representative of a users condition statement. For example, the system could execute the following SQL query statement in lieu of the user declaration where CV.ParamValue1='Mary':

SELECT 1

FROM EmailEvents E, ConditionValues CV

WHERE E.Sender=CV.ParamValue1;

Accordingly, a developer should define query code for each condition and store them in a table. Although possible, a new table does not need to be created for this express purpose. The ConditionClasses table defined previously can simply be modified to include query text as shown in pseudo code below.

| Pref. Class Id, | Cond. Class Id, | Class Name, | Query_Text |
|---|---|---|---|
| 1 | 1 | MailFrom | select 1, Cond. Id, Pref. Id, Event Id from EmailEvents E, ConditionValues CV where E.Sender = CV.ParamValue1 AND CV.Cond.ClassId = 1 AND required conditions |
| 1 | 2 | MailContains | select 1, Cond. Id, Pref. Id, Event Id from EmailEvents E, ConditionValues CV where E.MessageText like '%' + CV.ParamValue1 + '%' AND CV.Cond.ClassId = 2 AND required conditions |
| . | . | . | . |
| . | . | . | . |
| . | . | . | . |
| 3 | 6 | TargetPrice | select 1, Cond. Id, Pref. Id, Event Id from StockEvents S, ConditionValues CV where S.Price > CV.ParamValue1 AND CV.Cond.ClassId = 6 AND required conditions |

Once all of the tables 710 have been defined, preferences can be evaluated against such data so as to populate a results table 730 and thereafter execute actions associated therewith. Preferences can be executed by evaluating queries. Queries can be evaluated a processed by employing one or more procedures, which can be stored as data in data store 150 and constructed upon demand in accordance with an aspect of the present invention. Several procedures can be dedicated to evaluating conditions and preferences and then populating the results table, for instance with preferences and indicia indicating whether the preference evaluates to true such that execution of associated actions can be commenced. For example, the following procedure can be employed to evaluate or query conditions and store results in a ConditionResults table, which can subsequently be evaluated to populate results table 730.

```
create proc NSStoreResultsIntoResultsTable
@conditionClassId int
AS
declare @query varchar (255)—this number could be much larger
select @query=Query_Text
from ConditionClasses
where conditionClassId=@conditionClassId
insert ConditionResults exec (@query)
return (0)
```

Furthermore, it should be appreciated that the above procedure could be employed with a loop such that all condition queries are executed. However, it may be preferable to invoke the above procedure once for each condition so as to allow incremental condition evaluation. Once all the conditions are evaluated another procedure can be utilized to evaluate preferences, which are often conditions with Boolean operators there between.

As with all the herein described procedures, there are a multitude of different ways in which procedures can be written depending on, inter alia, programmer style, efficiency, and the nature of the constructed tables. For purposes of understanding the procedure below is provided as an example of a query that can be utilized in accordance with an aspect of the present invention to evaluate preferences. It should be noted that a more efficient query procedure could be used which evaluates different ANDGroups of a preference incrementally rather than in a single execution.

select distinct (eventId, prefId)

from ConditionResults C, AndGroupMemberShip A where C.condId=A.condId group by C.eventId, C.prefId, A.AndGroupId having sum (C.Bool)=(select ConditionCount
   from AndGroups A2
   where C.PrefId=A2.PrefId
   and A.AndGroupId=A2.AndGroupId)

To clarify how the above procedure works to produce rows for the final result table 730 a few examples are provided below.

Example 1

Assume that the ConditionResults Table has the following two rows in it.

| Bool, | Cond. Id, | Pref. Id, | Event Id | |
|---|---|---|---|---|
| 1 | 1 | 1 | 100 | From (Mary) |
| 1 | 2 | 1 | 100 | Contains (CA) |

There is an AND between these two conditions in Preference 1. Consequently, this preference will evaluate to true only if both the above conditions are true. Both these conditions belong to the $1^{st}$ ANDGroup whose condition count is 2. Therefore, when the above table is joined with the AndGroupMembership table, the following table results:

| Bool, | Cond. Id, | Pref. Id, | Event Id, | AndGroupId |
|---|---|---|---|---|
| 1 | 1 | 1 | 100 | 1 |
| 1 | 2 | 1 | 100 | 1 | sum = 2

After the group by is performed, we get the following row

| sum (Bool), | Pref. Id, | Event Id, | AndGroupId |
|---|---|---|---|
| 2 | 1 | 100 | 1 |

Now (Pref. Id, ANDGroupId) form a key for the ANDGroups Table.

The look up there provides a condition count of 2, which is equal to sum (Bool). Therefore the preference is true and it can be added to the result table 730.

Example 2

Assume that the ConditionResults Table has the following two rows:

| Bool, | Cond. Id, | Pref. Id, | Event Id | |
|---|---|---|---|---|
| 1 | 3 | 2 | 101 | From (Bob) |
| 1 | 4 | 2 | 101 | Contains (IA) |

There is an OR between these two conditions in Preference 2. Thus, this preference will evaluate to true only if either of the two conditions are true. These conditions belong to the $2^{nd}$ and $3^{rd}$ ANDGroups respectively and whose condition counts are both 1. Therefore, when the above table is joined with the AndGroupMembership table, the following table results:

| Bool, | Cond. Id, | Pref. Id, | Event Id, | AndGroupId |
|---|---|---|---|---|
| 1 | 3 | 2 | 101 | 2 |
| 1 | 4 | 2 | 101 | 3 |

After the above table is grouped we get,

| sum (Bool), | Pref. Id, | Event Id, | AndGroupId |
|---|---|---|---|
| 1 | 2 | 101 | 2 |
| 1 | 2 | 101 | 3 |

Both the above rows will satisfy the having clause and hence after the distinct is applied we find that the preference (Pref. Id=2, Event Id=101) will be copied into result table 703.

Example 3

For this final example, assume that the ConditionResults Table has the following two rows:

| Bool, | Cond. Id, | Pref. Id, | Event Id | |
|---|---|---|---|---|
| 1 | 13 | 7 | 102 | From (Bob) |
| 1 | 14 | 7 | 102 | Contains (Work) |

Recall that the condition on preference 7 really was
   From (Bob) and !Contains (Work).

In the presence of NOTs, the 1 in the second row above is changed to a −1 in accordance with an aspect of the present invention. The following is an exemplary query that provides such functionality:

update ConditionResults set Bool=−1 where cond.Id IN (select cond Id from Not)

Furthermore, it should be noted that if a smart query optimizer is employed and notices that the NOT table is empty, the query should return in a flash. Therefore, the above table becomes:

| Bool, | Cond. Id, | Pref. Id, | Event Id | |
|---|---|---|---|---|
| 1 | 13 | 7 | 102 | From (Bob) |
| −1 | 14 | 7 | 102 | !Contains (Work) | sum = 0

Both these conditions belong to the $11^{th}$ ANDGroup. From the ANDGroup table it can be determined that the condition count of this preference (preference, ANDGroup) is 1. Since 0?1, no rows will result from the preference evaluation query. Notice, however, that if the second row was not in the conditionResults table, we would have a sum of 1 (=1) and preference 7 would have evaluated to true.

After the result table 730 is populated preference actions can be executed. Actions can be executed by the information agent system 100 or by an information agent application(s) by retrieving the preference results from system 100 and acting upon them. If actions are executed by applications and not the information agent system 100 actions can be retrieved from system 100 utilizing an event submission application or some other application. As per system 100, a hosting service can be provided by the system 100 for application action handlers that can retrieve and execute actions.

Priority Actions and Context Analysis

The following discussion relates to a system and methodology to enable a plurality of information associated with generated actions such as notifications or messages, for example, to be automatically prioritized by a priorities system for transmittal to a user or system. Furthermore, while this discussion for purposes of simplicity of explanation focuses on the priority of notifications and context analysis, it should be appreciated that any action(s) can utilize priority and context analysis in a similar manner. The priorities system can utilize classifiers that can be explicitly and/or implicitly trained to prioritize one or more received messages according to a learned importance to the user. As an example, notifications can be classified as high, medium, low or other degrees of importance via a training set of examples or types of notifications having similar degrees of importance. A background monitor can be provided to monitor a user's activities regarding message processing to further refine or tune the classifier according to the user's personal decisions relating to message importance. Other priorities classifications can involve determinations relating to a loss associated with a time for delayed review or processing of the message.

After messages or other notifications have been automatically prioritized, users can review more important messages without having to sort through a plurality of lesser important and/or non-relevant messages. Messages can further be collected into one or more folders in terms of importance, wherein users can review messages of similar categorized importance at a desired time. Other systems such as an information agent system 100 (e.g., via notification component 180) can direct the messages to one or more notification sinks (e.g., mobile phone, hand held computer) based upon the determined priority. For example, if an e-mail message were determined to be of high importance, the information agent system 100 can determine if the user is presently at their desk to receive the message. If not, the notification platform can re-direct the message to a most likely communications device currently at the disposal of the user such as a cell phone or home laptop computer, wherein the user can be notified of the important or urgent message.

Figure 7:
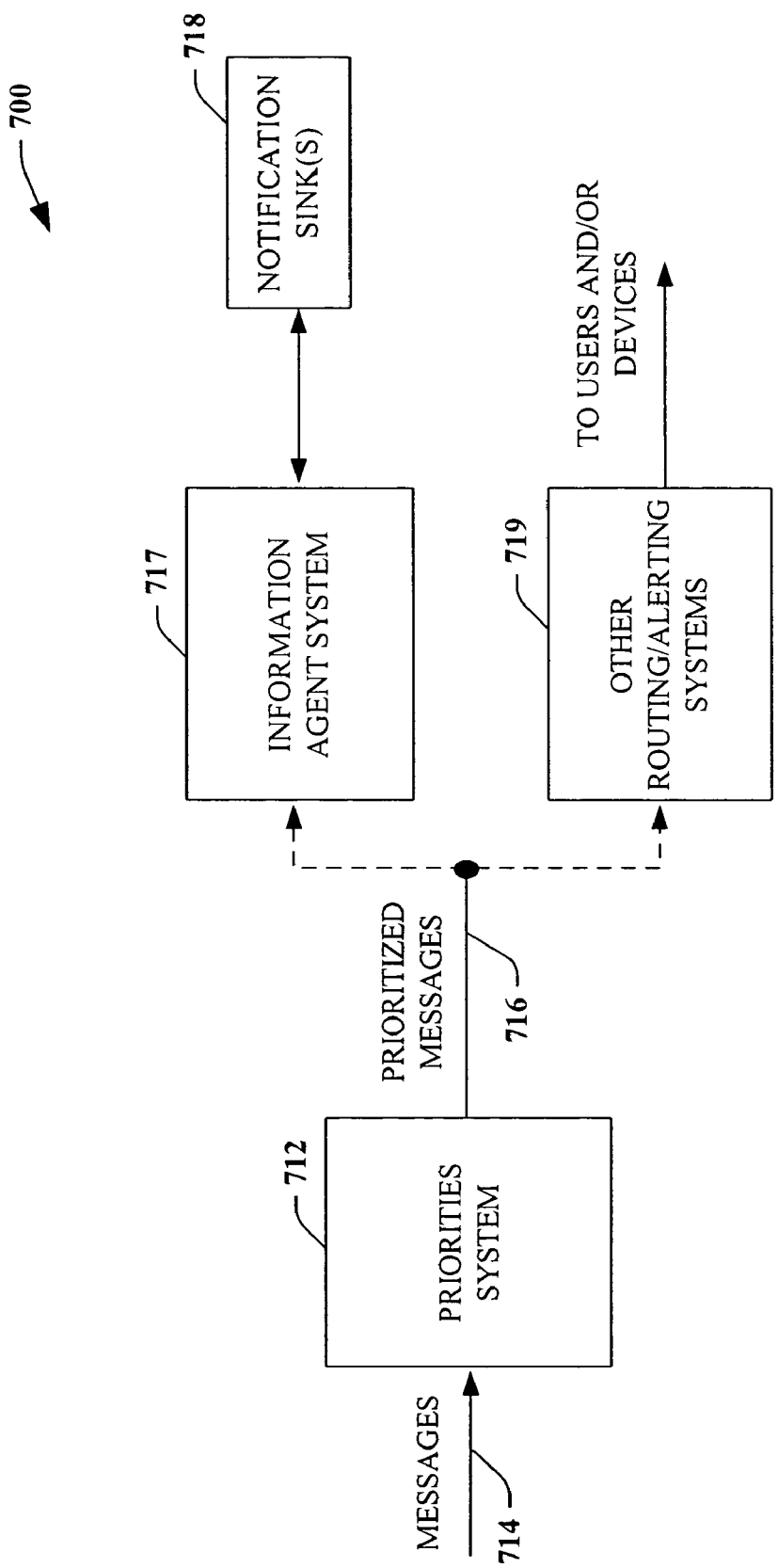
FIG. 7 is a schematic block diagram of a priorities system in accordance with an aspect of the present invention.

Referring to FIG. 7, a system 700 illustrates a priorities system 712 and notification action architecture in accordance with an aspect of the present invention. The priorities system 712 receives one or more messages or notifications 714, generates a priority or measure of importance (e.g., probability value that the message is of a high or low importance) for the associated message, and provides the one or more messages with an associated priority value at an output 716. As will be described in more detail below, classifiers can be constructed and trained to automatically assign measures of priorities to the messages 714. For example, the output 716 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a information agent system 717 (100 in FIG. 1) can be employed in conjunction with the priorities system 712 to direct prioritized messages to one or more notification sinks accessible to users. As will be described in more detail below, the IA system 717 can be adapted to receive the prioritized messages 716 and make decisions regarding when, where, and how to notify the user, for example. As an example, the IA system 717 can determine a communications modality (e.g., current notification sink 718 of the user such as a cell phone, or Personal Digital Assistant (PDA)) and likely location and/or likely focus of attention of the user. If a high-importance e-mail were received, for example, the IA system 717 can determine the users location/focus and direct/reformat the message to the notification sink 718 associated with the user. If a lower priority message 716 were received, the IA system 717 can be configured to leave the e-mail in the user's in-box for later review as desired, for example. As will be described in more detail below, other routing and/or alerting systems 719 may be utilized to direct prioritized messages 716 to users and/or other systems.

In the following section of the description, the generation of a priority for text files such as an email is described via an automatic classification system and process. The generation of priorities for texts as described can then be employed in other systems, such as a notification platform that are described in more detail below. The description in this section is provided in conjunction with FIG. 8 and FIG. 9, the former which is a diagram illustrating explicit and implicit training of a text classifier, and the latter which is a diagram depicting how a priority for a text is generated by input to the text classifier. The description is also provided in conjunction with FIGS. 10 and 11, which are diagrams of different schema according to which the priority of a text can be classified, and in conjunction with FIGS. 8 and 11, which are graphs illustrating cost functions that may be applicable depending on text type.

Figure 8:
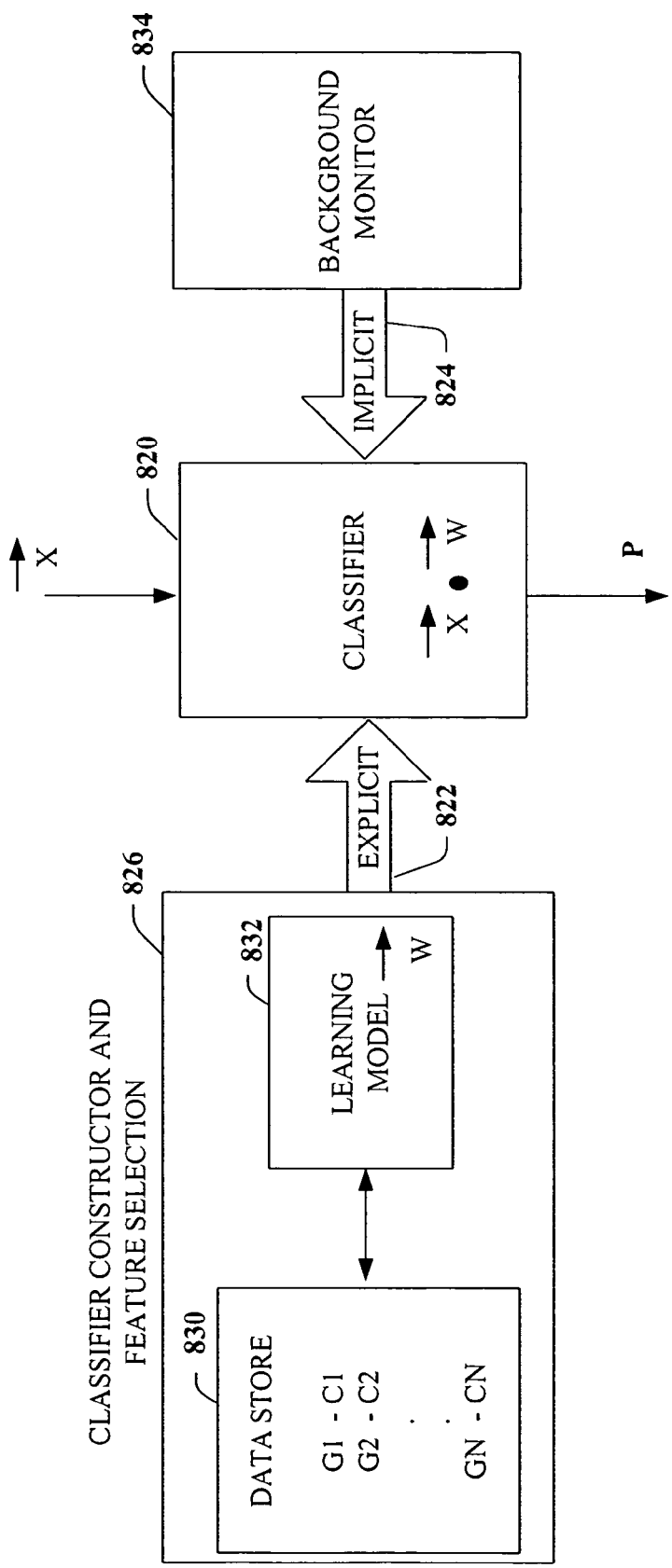
FIG. 8 is a block diagram illustrating a classifier in accordance with an aspect of the present invention.

Referring now to FIG. 8, a text/data classifier 820 can be trained explicitly, as represented by the arrow 822, and implicitly, as represented by the arrow 824 to perform classification in terms of priority. Explicit training represented by the arrow 822 is generally conducted at the initial phases of constructing the classifier 820, while the implicit training represented by the arrow 824 is typically conducted after the classifier 820 has been constructed—to fine tune the classifier 820, for example, via a background monitor 834. Specific description is made herein with reference to an SVM classifier, for exemplary purposes of illustrating a classification training and implementation approach. Other text classification approaches include Bayesian networks, decision trees, and probabilistic classification models providing different patterns of independence may be employed. Text classification as used herein also is inclusive of statistical regression that is utilized to develop models of priority.

According to one aspect of the invention Support Vector Machines (SVM) which are well understood are employed as the classifier 820. It is to be appreciated that other classifier models may also be utilized such as Naive Bayes, Bayes Net, decision tree and other learning models. SVM's are configured via a learning or training phase within a classifier constructor and feature selection module 826. A classifier is a function that maps an input attribute vector, $x=(x1, x2, x3, x4, xn)$, to a confidence that the input belongs to a class—that is, $f(x)=confidence(class)$. In the case of text classification, attributes are words or phrases or other domain-specific attributes derived from the words (e.g., parts of speech, presence of key terms), and the classes are categories or areas of interest (e.g., levels of priorities).

An aspect of SVMs and other inductive-learning approaches is to employ a training set of labeled instances to learn a classification function automatically. The training set is depicted within a data store 830 associated with the classifier constructor 826. As illustrated, the training set may include a subset of groupings G1 through GN that indicate potential and/or actual elements or element combinations (e.g., words or phrases) that are associated with a particular category. The data store 830 also includes a plurality of categories 1 through M, wherein the groupings can be associated with one or more categories. During learning, a function that maps input features to a confidence of class is learned. Thus, after learning a model, categories are represented as a weighted vector of input features.

For category classification, binary feature values (e.g., a word occurs or does not occur in a category), or real-valued features (e.g., a word occurs with an importance weight r) are often employed. Since category collections may contain a large number of unique terms, a feature selection is generally employed when applying machine-learning techniques to categorization. To reduce the number of features, features may be removed based on overall frequency counts, and then selected according to a smaller number of features based on a fit to the categories. The fit to the category may be determined via mutual information, information gain, chi-square and/or substantially any other statistical selection technique. These smaller descriptions then serve as an input to the SVM. It is noted that linear SVMs provide suitable generalization accuracy and provide suitably fast learning. Other classes of non-linear SVMs include polynomial classifiers and radial basis functions and may also be utilized in accordance with the present invention.

The classifier constructor 826 employs a learning model 832 in order to analyze the groupings and associated categories in the data store 830 to "learn" a function mapping input vectors to confidence of class. For many learning models, including the SVM, the model for the categories can be represented as a vector of feature weights, w, wherein there can be a learned vector of weights for each category. When the weights w are learned, new texts are classified by computing the dot product of x and w, wherein w is the vector of learned weights, and x is the vector representing a new text. A sigmoid function may also be provided to transform the output of the SVM to probabilities P. Probabilities provide comparable scores across categories or classes from which priorities can be determined.

Figure 9:
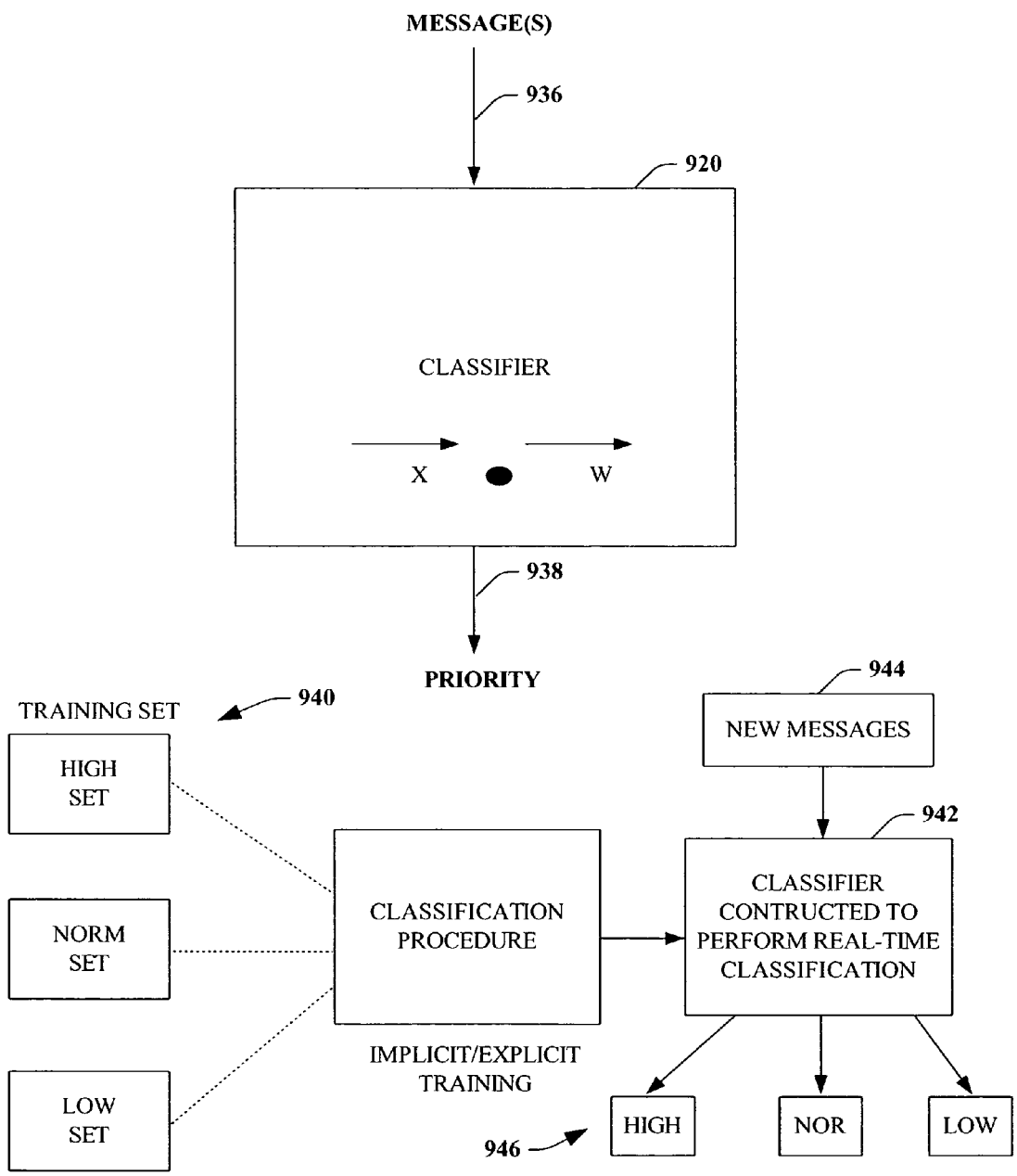
FIG. 9 is a schematic block diagram illustrating message classification in accordance with an aspect of the present invention.

The SVM is a parameterized function whose functional form is defined before training. Training an SVM generally requires a labeled training set, since the SVM will fit the function from a set of examples. The training set can consist of a set of N examples. Each example consists of an input vector, $xi$, and a category label, $yj$, which describes whether the input vector is in a category. For each category there can be N free parameters in an SVM trained with N examples. To find these parameters, a quadratic programming (QP) problem is solved as is well understood. There is a plurality of well-known techniques for solving the QP problem. These techniques may include a Sequential Minimal Optimization technique as well as other techniques. As depicted in FIG. 9, a text input 936 that has been transformed into an input vector x is applied to the classifier 920 for each category. The classifier 920 utilizes the learned weight vectors w determined by classifier constructor 926 (e.g., one weight vector for each category) and forms a dot product to provide a priority output 938, wherein probabilities P may be assigned to the input text 936 indicating one or more associated priorities (e.g., high, medium, low).

Referring back to FIG. 8, training of the text classifier 820 as represented by the arrow 822 includes constructing the classifier in 826, including utilizing feature selection. In the explicit training phase, the classifier 820 can be presented with both time-critical and non-time-critical texts, so that the classifier may be able to discriminate between the two, for example. This training set may be provided by the user, or a standard or default training set may be utilized. Given a training corpus, the classifier 820 first applies feature-selection procedures that attempt to find the most discriminatory features. This process employs a mutual-information analysis. Feature selection can operate on one or more words or higher-level distinctions made available, such as phrases and parts of speech tagged with natural language processing. That is, the text classifier 820 can be seeded with specially tagged text to discriminate features of a text that are considered important.

Feature selection for text classification typically performs a search over single words. Beyond the reliance on single words, domain-specific phrases and high-level patterns of features are also made available. Special tokens can also enhance classification. The quality of the learned classifiers for e-mail criticality, for example, can be enhanced by inputting to the feature selection procedures handcrafted features that are identified as being useful for distinguishing among e-mail of different time criticality. Thus, during feature selection, one or more words as well as phrases and symbols that are useful for discriminating among messages of different levels of time criticality are considered.

As the following examples illustrate, tokens and/or patterns of value in identifying the criticality of messages include such distinctions as, and including Boolean combinations of the following:

Information in a Message Header

For Example:

To: Field (Recipient Information)

Addressed just to user,

Addressed to a few people including user,

Addressed to an alias with a small number of people,

Addressed to several aliases with a small number of people,

Cc: 'd to user,

Bcc: 'd to user.

From: Field (Sender Information)

Names on pre-determined list of important people, potentially segmented into a variety of classes of individuals, (e.g., Family members, Friends)

Senders identified as internal to the user's company/organization,

Information about the structure of organizational relationships relative to the user drawn from an online organization chart such as:
    Managers user reports to,
    Managers of the managers of users,
    People who report to the user, External business people.

Past Tense Information

These include descriptions about events that have already occurred such as:

We met, meeting went, happened, got together, took care of, meeting yesterday.

Future Tense Information

Tomorrow,

This week,

Are you going to,

When can we,

Looking forward to,

Will this,

Will be.

Meeting and Coordination Information

Get together,

Can you meet,

Will get together,

Coordinate with,

Need to get together,

See you,

Arrange a meeting,

Like to invite,

Be around.

Resolved Dates

Future vs. past dates and times indicated from patterns of text to state dates and times explicitly or typical abbreviations such as:

On 5/2,

At 12:00.

Questions

Words, phrases adjacent to questions marks (?)

Indications of personal requests:

Can you,

Are you,

Will you, you please,

Can you do,

Favor to ask,

From you.

Indications of Need:

I need,

He needs,

She needs,

I'd like,

It would be great,

I want,

He wants,

She wants,

Take care of.

Time Criticality happening soon, right away, deadline will be, deadline is, as soon as possible, needs this soon, to be done soon, done right away, this soon, by [date], by [time].

Importance is important, is critical,

Word, phrase +!,

Explicit priority flag status (low, none, high).

Length of Message

Number of bytes in component of new message.

Signs of Commercial and Adult-Content Junk E-Mail

Free!!,

Word +!!!,

Under 18,

Adult's only,

Percent of capitalized words,

Percent non-alphanumeric characters.

It is noted that the word or phrase groupings depicted above illustrate exemplary words, groupings, or phrases that may be utilized from which to conduct classifier training. It is to be appreciated that other similar words, groups, or phrases may be similarly employed and thus the present invention is not limited to the illustrated examples.

Furthermore, still referring to FIG. 8, implicit training of the classifier 820, as represented by the arrow 824, can be conducted by monitoring the user work or usage patterns via the background monitor 834 that can reside on the user's desktop or mobile computer, for example. For example, as users work, and lists of mail are reviewed, it can be assumed that time-critical messages are read first, and lower-priority messages are reviewed later, and/or deleted. That is, when presented with a new e-mail, the user is monitored to determine whether he or she immediately opens the e-mail, and in what order, deletes the email without opening, and/or replies to the e-mail relatively in a short amount of time. Thus, the classifier 820 is adapted such that a user is monitored while working or operating a system, the classifier is periodically refined by training in the background and updated for enhancing real-time decision-making. Background techniques for building classifiers can extend from those that update the classifier 820 with new training messages.

Alternatively, larger quantities of messages can be gathered, wherein new filters are created in a batch process, either per a daily schedule, per the number of new quantities of messages admitted to the training set, and/or combinations. For each message inputted into the classifier, for example, a new case for the classifier can be created. The cases are stored as negative and positive examples of texts that are either high or low priority, for example. As an example, one or more low, medium, and high urgency classes can be recognized such that the probabilities of membership in each of these classes are utilized to build an expected criticality. Larger numbers of criticality classes can be utilized to seek higher resolution. For example, as illustrated in FIG. 9, a training set of messages 940 (e.g., very high, high, medium, normal, low, very low, etc.) can be initially employed to train a classifier 942, such that real-time classification is achieved, as indicated at 944, wherein new messages are classified according to the number of examples resolved by the training set 940. In FIG. 9, three such categories are illustrated for exemplary purposes, however, it is to be appreciated that a plurality of such categories may be trained according to varying degrees of desired importance. As illustrated, the new messages 944 may be labeled, tagged and/or sorted into one or more folders 946, for example, according to the priorities assigned by the classifier 942. As will be described in more detail below, the assigned priorities may further be utilized by subsequent systems to make message format, delivery and modality determinations to/for the user.

According to another aspect of the invention, an estimation of a number or value can be achieved by monitoring a user interact with e-mail, for example, rather than labeling the case or message as one of a set of folders. Thus, a classifier can be continued to be updated but have a moving window, wherein cases of messages or documents that are newer than some age are considered, as specified by the user.

For example, a constant rate of loss associated with the delayed review of messages is referred to as the expected criticality (EC) of the message, wherein, $$EC = \sum_i C^d(H_i) p(H_i \mid E^d)$$

wherein C is a cost function, d is a delay, E is an event, H is the criticality class of the e-mail, and EC is expressed as the sum over the likelihood of the class(es) weighted by the rate of loss described by the cost function C for the potential class(es).

As an example, still referring to FIG. 9, the text, such as an e-mail message, 936 is input into the classifier 920, which based thereon generates the priority 938 for the text 936. That is, the classifier 920 generates the priority 938, measured as a percentage from 0 to 100%, for example. This percentage can be a measure of the likelihood that the text 936 is of high or some other priority, based on the previous training of the classifier 920.

It is noted that the present invention as has been described above, the classifier 920 and the priority 938 can be based on a scheme wherein the e-mails in the training phase are construed as either high priority or low priority, for example. This scheme is illustrated in reference to FIG. 10, wherein the text classifier 1020 is trained by a group of texts 1047 that are predetermined to be high priority and a group of texts 1048 that are predetermined to be low priority. The text to be analyzed is input into the classifier 820, which outputs a scalar number 1049, for example, measuring the likelihood that the text being analyzed is of high or low priority.

Figure 10:
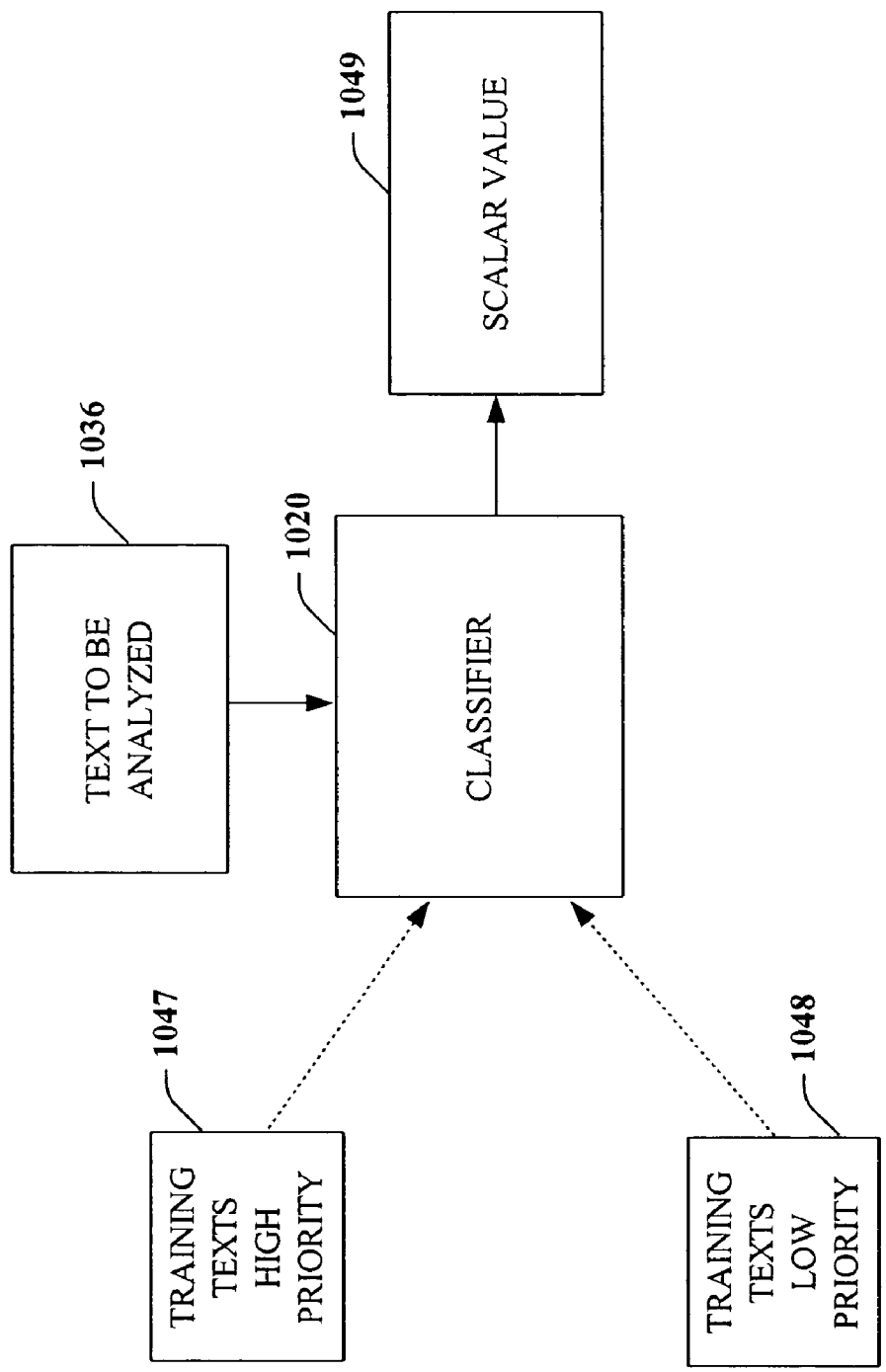
FIG. 10 is a schematic block diagram illustrating a scalar classifier output in accordance with an aspect of the present invention.
Figure 11:
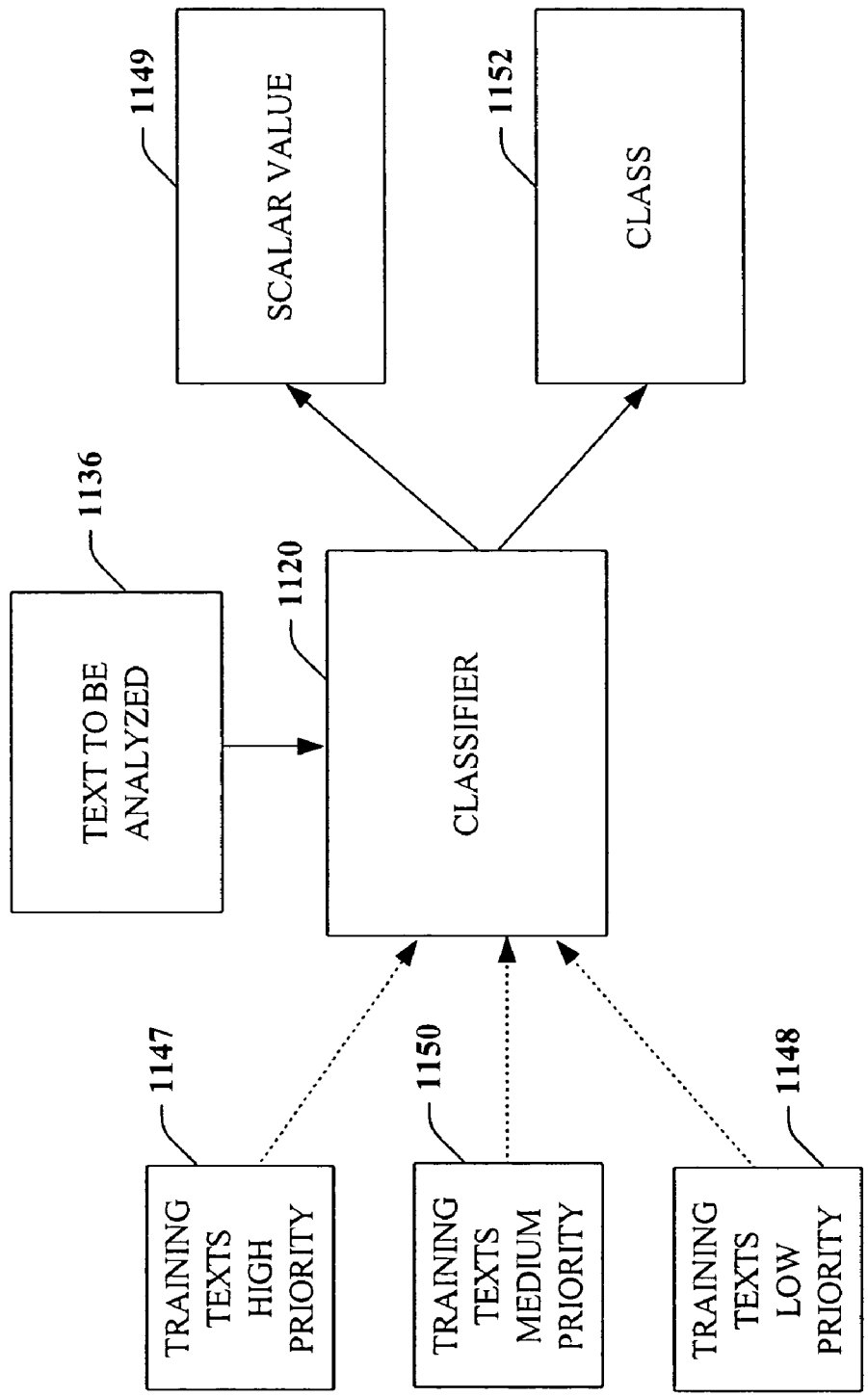
FIG. 11 is a schematic block diagram illustrating texts classified according to a class and scalar output in accordance with an aspect of the present invention.

For example, referring to FIGS. 10 and 11, the diagrams illustrate a scheme wherein texts 1036, 1136 are categorized into low, medium, and high priority. As described above, a plurality of other training sets may be employed to provide greater or higher resolution distinctions of priorities. The text classifier 1020, 1120 is trained by a group of texts 1047, 1147 that are high priority and a group of texts 1048, 1148 that are low priority, and by a group of texts 1150 that are medium priority. Thus, the text 1036, 1136 to be analyzed is input into the classifier 1020, 1120, which outputs a scalar number 1049, 1149, that can measure the likelihood that the text being analyzed is of high priority, if so desired, or medium priority or low priority, for example. The classifier 1020, 1120 is also able to output a class 1152, which indicates the class of low, medium, or high priority that the text 1136 most likely falls into. Further classes can also be added if desired.

The present invention is not limited to the definition of priority as this term is employed by the classifier 1020, 1120 to assign such priority to a text such as an e-mail message. Priority can be defined in terms of a loss function, for example. More specifically, priority can be defined in terms of the expected cost in lost opportunities per time delayed in reviewing the text after it has be received. That is, the expected lost or cost that will result for delayed processing of the text. The loss function can further vary according to the type of text received.

Figure 12:
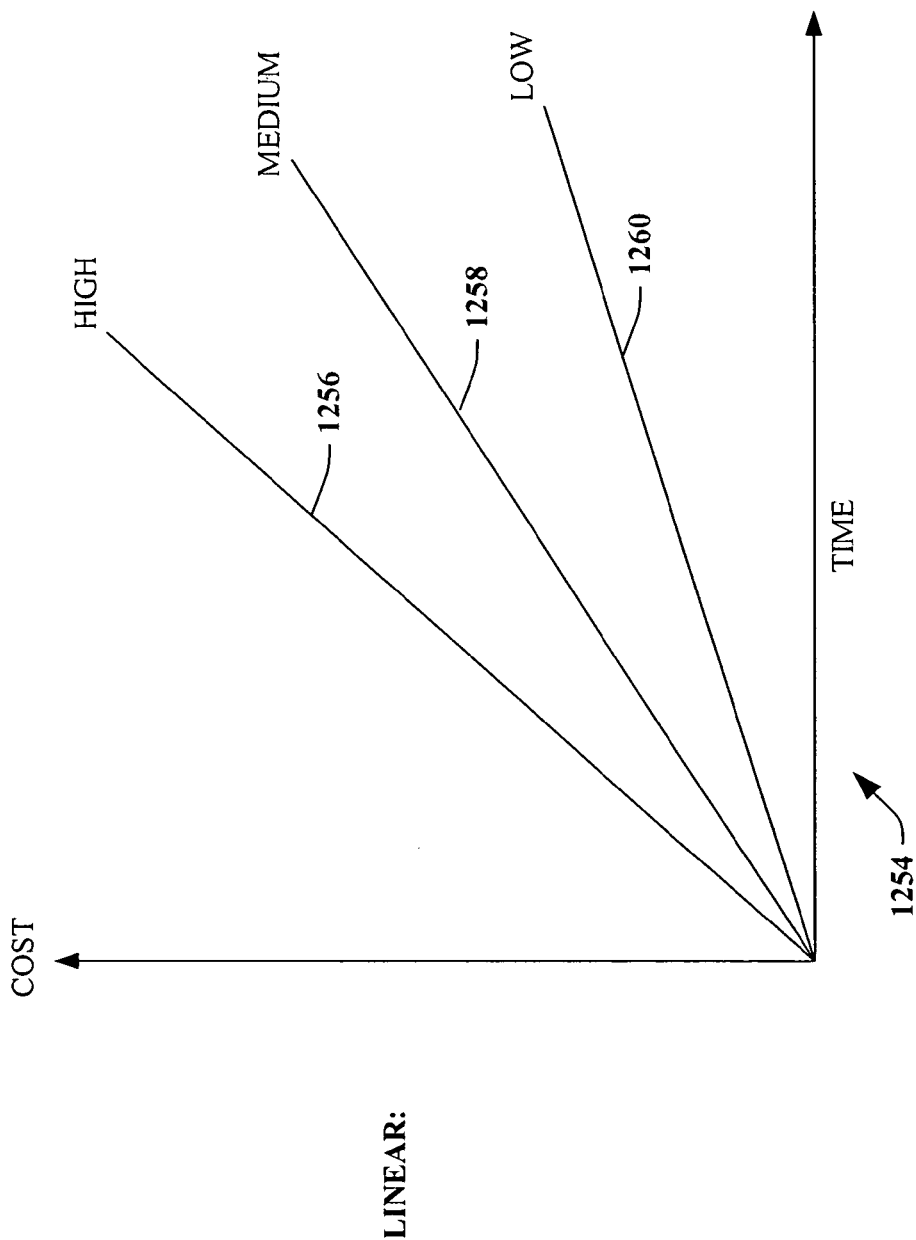
FIG. 12 is a diagram illustrating linear priorities models in accordance with an aspect of the present invention.

For example, a general case is illustrated in FIG. 12, which is a graph 1254 of linear cost functions dependent on the priority of a text. In the graph 1254, as time increases, the cost of not having reviewed a text also increases. However, the cost increases more for a high priority message, as indicated by the line 1256, as compared to a medium priority message, as indicated by the line 1258, or a low priority message, as indicated by the line 1260. For example, the high priority line 1256 may have a slope of 100, the medium priority line 1258 may have a slope of 10, and the low priority line 1260 may have a slope of one. These slope values can then be utilized by the classifier 1020, 1120 in assigning a priority to a given text, for example, by regression analysis.

Figure 13:
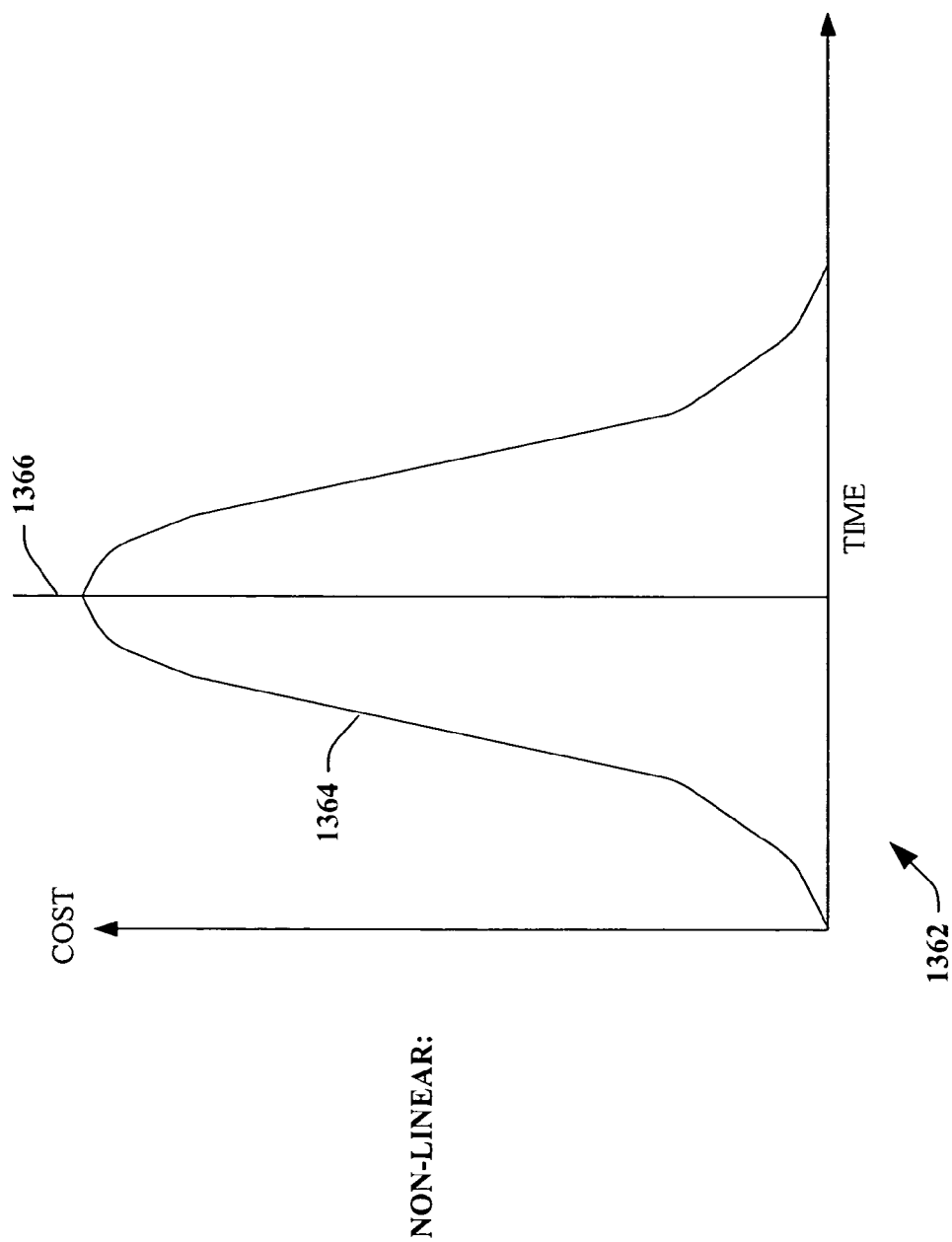
FIG. 13 is a diagram illustrating a non-linear priorities model in accordance with an aspect of the present invention.

Some messages, however, do not have their priorities well approximated by the use of a linear cost function. For example, a message relating to a meeting will have its cost function increase as the time of the meeting nears, and thereafter, the cost function rapidly decreases. That is, after the meeting is missed, there is not much generally a user can do about it. This situation is better approximated by a non-linear cost function, as depicted in FIG. 13. In a graph 1362, a cost function 1364 rapidly increases until it reaches the time of the meeting demarcated by the line 1366, after which it rapidly decreases. Depending on a message's type, the cost function can be approximated by one of many different representative cost functions, both linear and non-linear.

Thus, as has been described, the priority of a text can be just the likelihood that it is of one of a plurality of priorities based on the output of a classifier, or the most likely priority class the text applies to, also based on the output of the classifier. Alternatively, an expected time criticality of the text, such as an e-mail message, can determined. This can be written as:

$$EL = \sum_{i}^{n} p(critical_i) C(critical_i)$$

wherein EL is the expected loss, $p(critical_i)$ is the probability that a text has the criticality i, $C(critical_i)$ is the cost function for text having the criticality i, and n is the total number of criticality classes minus one. The cost functions may be linear or non-linear, as has been described. In the case where the function is linear, the cost function defines a constant rate of loss with time. For non-linear functions, the rate of loss changes with delayed review or processing of the text and can increase or decrease, depending on the amount of delay.

In the case where n=1, specifying that there are only two priority classes low and high, the expected loss can be reformulated as:

$$EC = p(critical_{high}) C(critical_{high}) + [1 - p(critical_{low})] C(critical_{low})$$

wherein EC is the expected criticality of a text. Furthermore, if the cost function of low criticality messages is set to zero, this becomes:

$$EC = p(critical_{high}) C(critical_{high})$$

The total loss until the time of review of a text can be expressed as the integration of the expressed criticality, or, $$EL = \int_0^t p(critical_{high}) C(critical_{high}, t) dt$$

wherein t is the time delay before reviewing the document.

Other measures that accord a value metric for ranking documents, such as e-mail messages, by importance. While the discussion above focused on priority as time criticality, other notions of "importance" can also be trained. For example, this can be accomplished by labeling a set of training folders: "High Importance" all the way down to "Low Importance" wherein a measure of "expected importance" can be determined. Another metric can be based on a semantic label, "messages that I would wish to hear about within I day while traveling" and to determine a measure for prioritizing messages for forwarding to a traveling user. Furthermore, one utilized metric is urgency or time-criticality, as it has clear semantics for decision-making, triage, and routing. In this case, the classes are labeled according to different levels of urgency and computed as an expected urgency for each message from the probabilities inferred that the message is in each class.

Extensions to criticality classification, as described in the previous section, can also be provided in accordance with the present invention. For instance, classification can include an automatic search for combinations of high-payoff features within or between classes of features. As an example, combinations of special distinctions, structures, and so forth, with words that have been found to be particularly useful for certain users can be searched for and utilized in the classification process. A combination of two features is referred as a doublet, whereas a combination of three features is referred to as a triplet, and so forth. The combination of features can enable improved classification.

Classification can also be improved with the use of incremental indexing that employs a moving window in the classifier. This enables the classifier to be routinely refreshed, as old data is timed out, and new data is brought in.

Classification can also be based on the determination of the date and time of an event specified in a message. This determination can assign features to the message that can be utilized by the classifier. For example, the features assigned may include: today within four hours, today within eight hours, tomorrow, this week, this month, and next month and beyond. This enables the classifier to have improved accuracy with respect to the messages that are classified. In general, classification can be based on the time of the referenced event, considering whether the event is in the future or has past. With respect to future events, classification thus considers the sender's reference to a time in the future when the event is to occur.

Other new features can also be integrated into the classification process. For example, an organization chart can be utilized to determine how important a message is by the sender's location within the chart. Linguistic features may be integrated into the classifier. To accommodate different languages, the features may be modified depending on the origin of the sender, and/or the language in which the message is written. Classification may vary depending on different folders in which messages are stored, as well as other scaling and control rules. In addition to e-mail and other sources, classification can be performed on instant messages, and other sources of information, such as stock tickers, and so forth.

In general, a sender-recipient structural relationship may be considered in the classification process. If the user is substantially the only recipient of a message, for example, then this message may be considered as more important than a message sent to a small number of people. In turn, a message sent to a small number of people may be more important than a message on which the user is blind-copied (bcc'ed) or carbon-copied (cc'ed). With respect to the sender, criticality may be assigned based on whether the sender's name is recognized. Criticality may also be assigned depending on whether the sender is internal or external to the organization of which the user is associated.

Other distinctions that may be considered in classification include the length of the message, whether questions have been detected, and whether the user's name is in the message. Language associated with time criticality may increase the message's importance. For example, phrases such as "happening soon," "right away," "as soon as possible," "ASAP," and "deadline is," may render the message more critical. Usage of past tense as compared to future tense may be considered, as well as coordinative tasks specified by phrases such as "get together," "can we meet," and so on. Evidence of junk mail may lower the priority of a message. Predicates representing combinations, such as a short question from a sender proximate to the user in the organization chart, may also be considered in the classification process.

In the next section of the description, processes are described that provide a determination when to alert the user of a high-priority text, for example, a text that has a likelihood of being high priority greater than a user-set threshold, or greater than a threshold determined by decision-theoretic reasoning. That is, beyond knowing about time-critical messages, it is also important to decide when to alert a user to time-critical messages if the user is not directly viewing incoming e-mail, for example. In general, a cost of distracting the user from the current task being addressed to learn about the time-critical message is determined.

Alternatively, various policies for alerting and notification can be employed. These policies can be implemented within a notification platform architecture, for example, that is described in more detail below. Some of these policies include:

Setting a user-specified upper bound on the total loss. This policy would specify that a system should generate an alert when the total loss associated with the delayed review of a message exceeds some pre-specified "tolerable" loss "x".

Another policy can be a cost-benefit analysis based on more complete decision-theoretic analysis, such as NEVA=EVTA−ECA−TC, wherein NEVA is the net expected value of alerting, EVTA is the expected value of alerting, ECA is the expected cost of alerting, and TC is the transmission cost associated with communicating a message.

In general, a user should be alerted when a cost-benefit analysis suggests that the expected loss the user would incur in not reviewing the message at time t is greater than the expected cost of alerting the user. That is, alerting should be conducted if:

EL−EC>0 wherein EL is the expected loss of non-review of the text at a current time t, and EC is the expected cost of alerting the user of the text at the current time t. The expected loss is as described in the previous section of the description.

However, the above formulation may not be the most accurate, since the user will often review the message on his or her own in the future. Therefore, in actuality, the user should generally be alerted when the expected value of alerting, referred to as EVTA, is positive. The expected value of alerting should thus consider the value of alerting the user of the text now, as opposed to the value of the user reviewing the message later on their own, without alert, minus the cost of alerting. This can be stated as:

$EVA = EL_{alert} - EL_{no-alert} - EC$ wherein $EL_{alert}$ is the expected loss of the user reviewing the message if he or she were to review the message now, upon being alerted, as opposed to $EL_{no-alert}$, which is the expected loss of the user reviewing the message on his or her own at some point, without being alerted, minus EC, the expected cost of alerting based on a consideration of distraction and on the direct cost of the transmitting the information.

Furthermore, information from several messages can be grouped together into a single compound alert. Reviewing information about multiple messages in an alert can be more costly than an alert relaying information about a single message. Such increases in distraction can be represented by making the cost of an alert a function of the its informational complexity. It can be assumed that the EVA of an e-mail message is independent of the EVA of other e-mail messages. $EVA(M_i,t)$, for example, refers to the value of alerting a user about a single message $M_i$ at time t and ECA(n) refers to the expected cost of relaying the content of n messages. Thus, multiple messages can be considered by summing together the expected value of relaying information about a set of n messages, wherein:

$$NEVA = \sum_{i=1} EVA(M_i, t) - ECA(n).$$

It is also noted that in order to determine the expect cost of alerting, it is useful to infer or directly access information about whether the user is present or is not present. Sensors can be employed that indicate when a user is in the office, such as infrared sensors and pressure sensors. However, if such devices are not available, a probability that a user is in the office can be assigned as a function of user activity on the computer, for example, such as the time since last observed mouse or keyboard activity. Furthermore, scheduling information available in a calendar can also be employed to make inferences about the distance and disposition of a user and to consider the costs of forwarding messages to the user by different processes.

Figure 14:
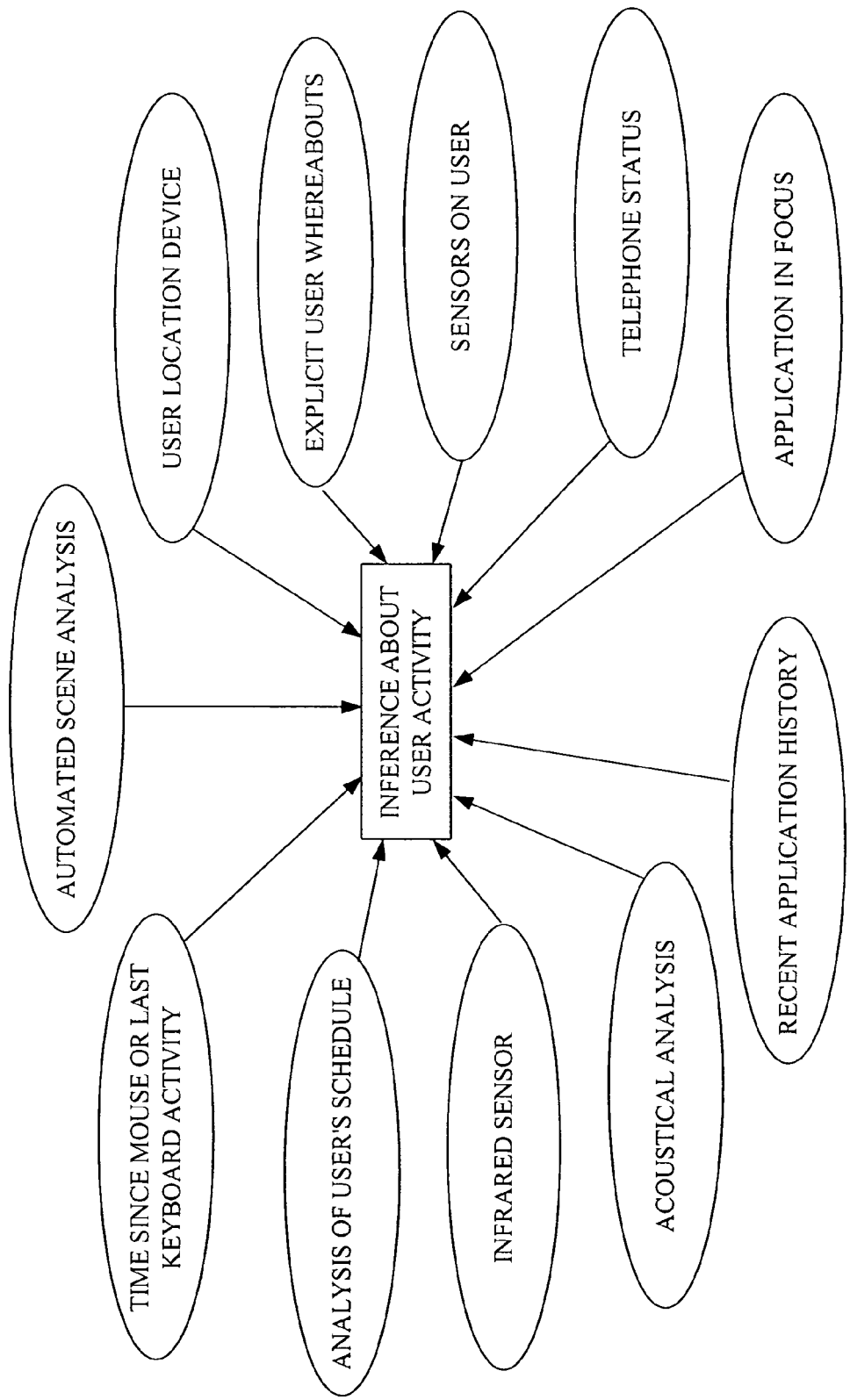
FIG. 14 is a diagram illustrating a model for determining user activity in accordance with an aspect of the present invention.
Figure 15:
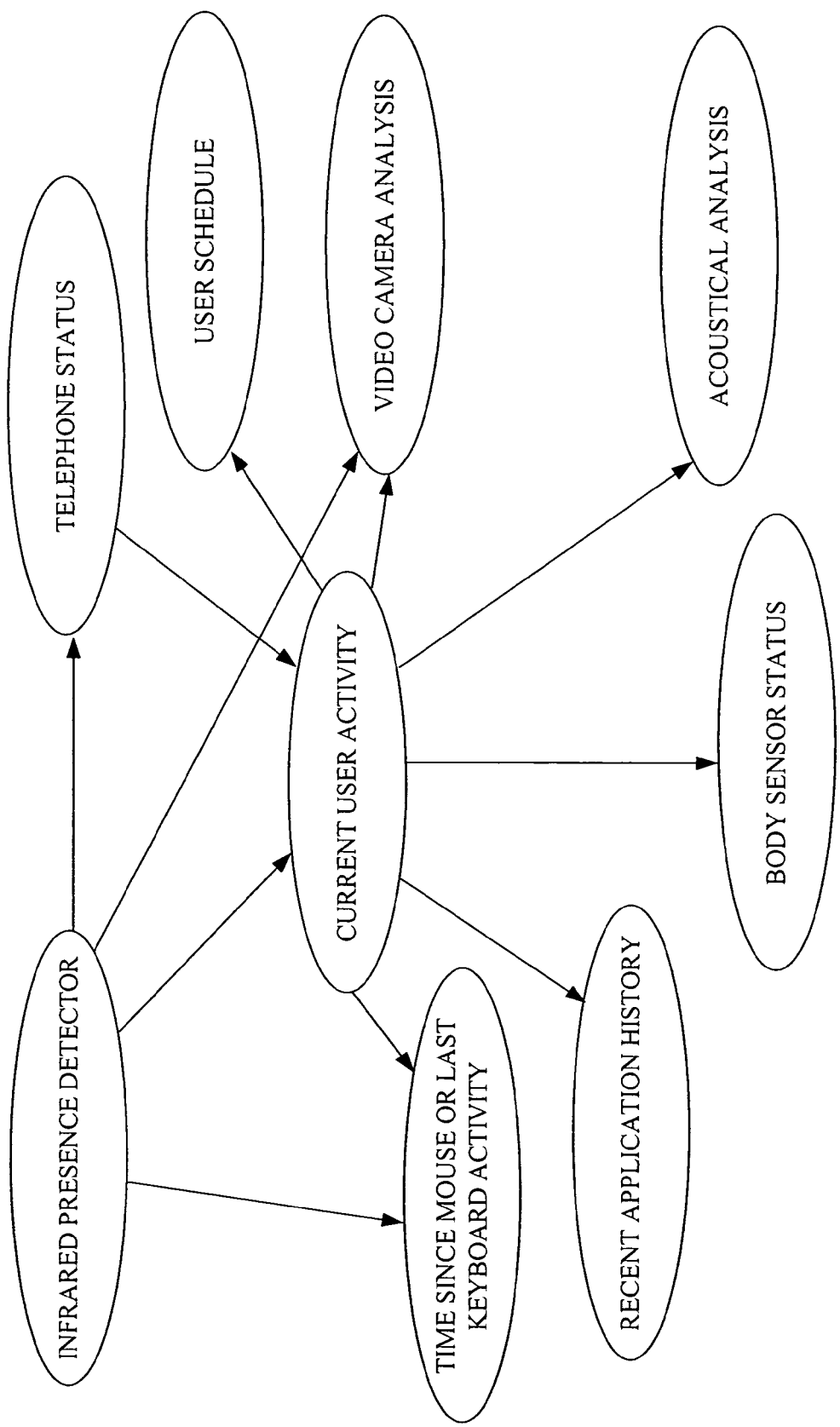
FIG. 15 is a diagram illustrating an inference-based model for determining current user activity in accordance with an aspect of the present invention.

It is also important to know how busy the user is in making decisions about interrupting the user with information about messages with high time criticality. It can be reasoned (e.g., inferential decision-making) about whether and the rate at which a user is working on a computer, or whether the user is on the telephone, speaking with someone, or at a meeting at another location. Several classes of evidence can be employed to assess a user's activity or his or her focus of attention, as illustrated in FIG. 14. A Bayesian network can then be utilized for performing an inference about a user's activity. An example of such a network is depicted in FIG. 15.

Figure 16:
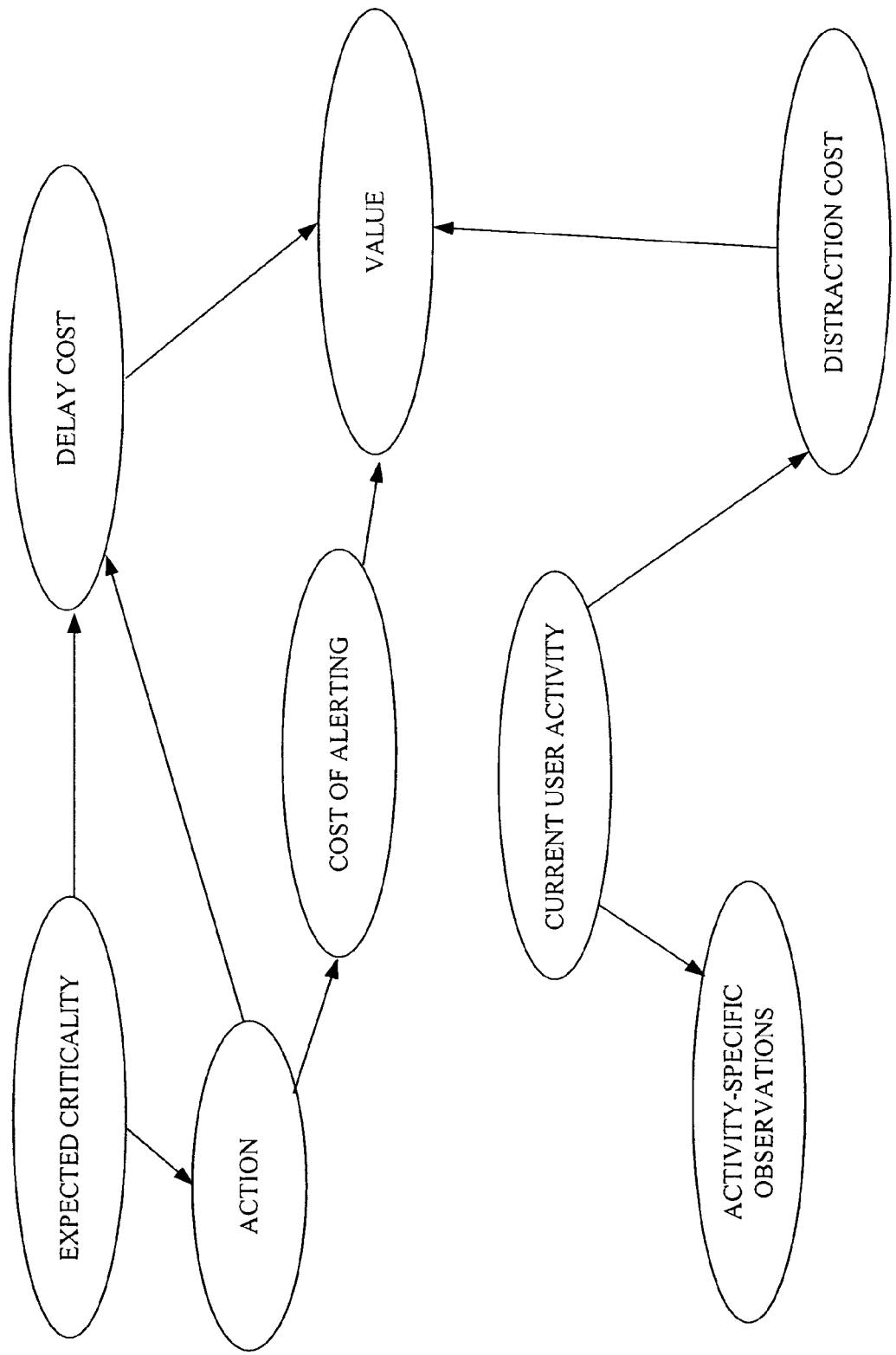
FIG. 16 is a diagram illustrating an inference-based model for determining alerting costs in accordance with an aspect of the present invention.
Figure 17:
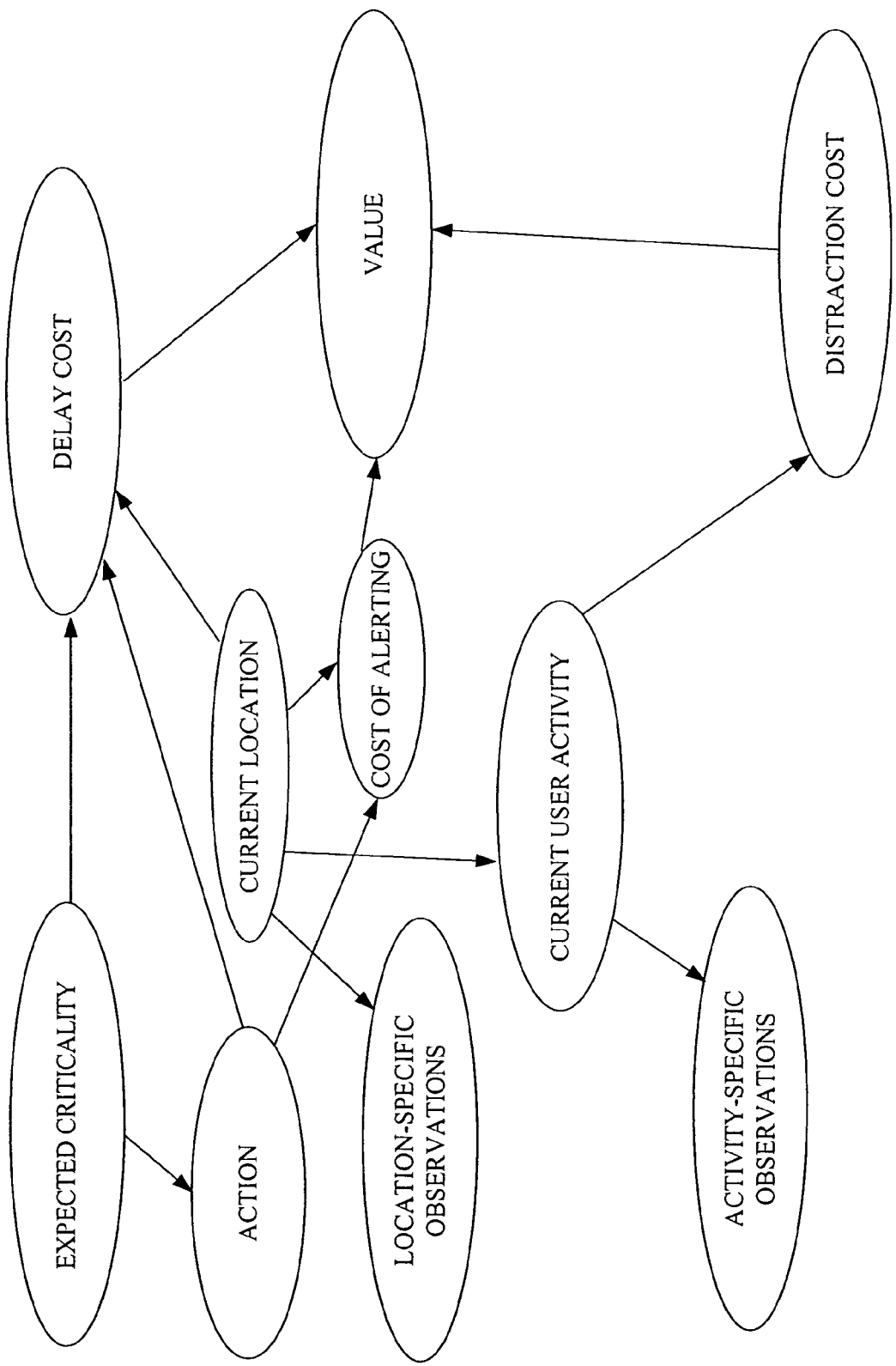
FIG. 17 is a diagram illustrating a more detailed inference-based model for determining alerting costs in accordance with an aspect of the present invention.
Figure 18:
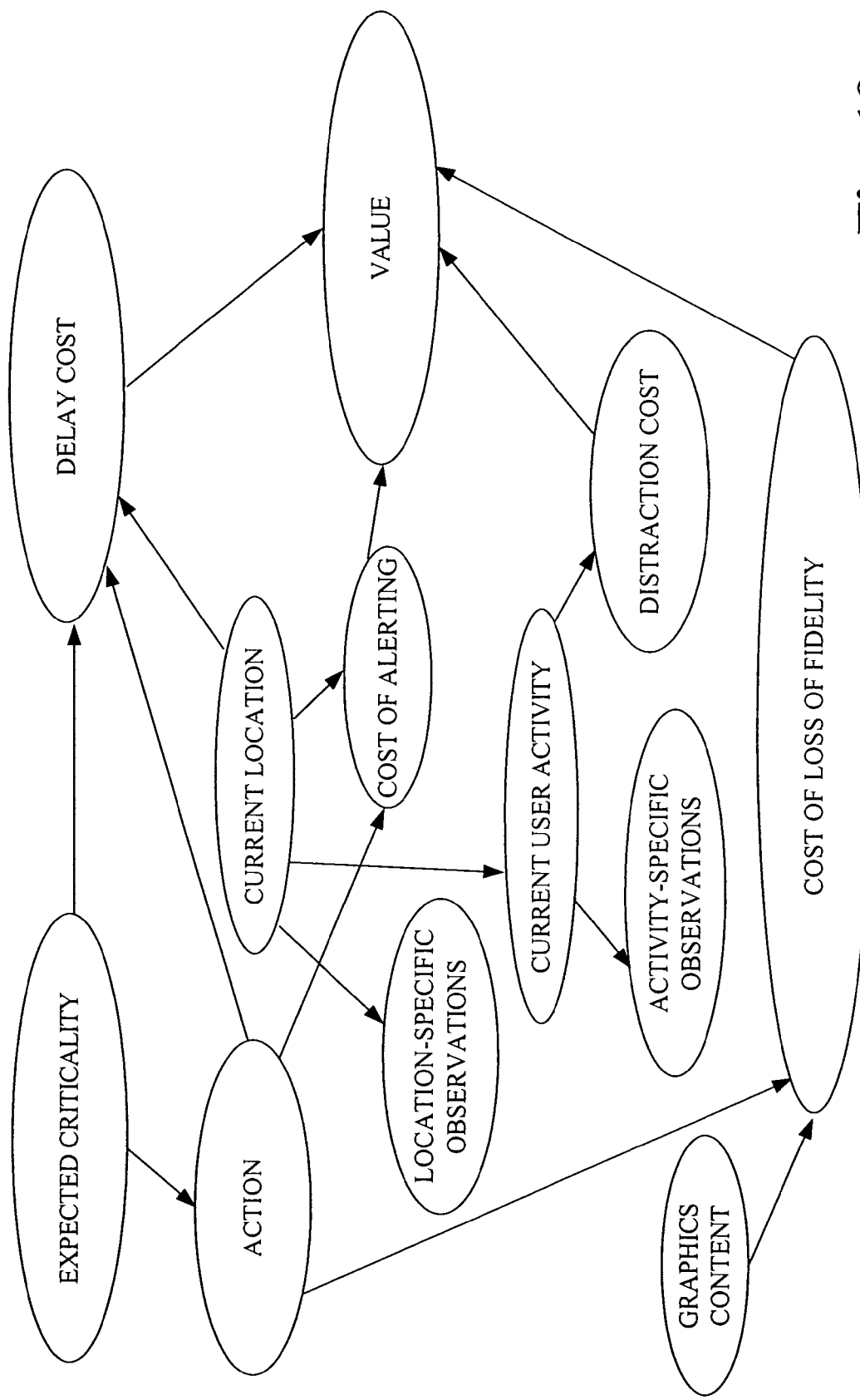
FIG. 18 is a diagram illustrating a more detailed inference-based model for determining alerting costs in view of a fidelity loss in accordance with an aspect of the present invention.

In general, a decision should be made as to when and how to alert users to messages and to provide services based on the inference of expected criticality and user activity. Decisions can be performed by utilizing decision-models, for example. FIGS. 16-18 are influence diagrams illustrating how such decision models can be utilized to make alerting decisions. FIG. 16 displays a decision model for decisions about interrupting a user, considering current activity, expected time criticality of messages, and cost of alerting depending on the communications modality. FIG. 17 also includes variables representing the current location and the influence of that variable on activity and cost of alternate messaging techniques. Furthermore, FIG. 18 is expanded to consider the costs associated with losses in fidelity when a message with significant graphics content is forwarded to a user without the graphical content being present.

Alternatively, decisions as to when and how to alert users can be made by employment of a set of user-specified thresholds and parameters defining policies on alerting. User presence can be inferred based on mouse or keyboard activity, for example. Thus, a user can be enabled to input thresholds on alerting for inferred states of activity and non-activity, for example. Users can also input an amount of idle activity following activity wherein alerting will occur at lower criticalities. If it is determined that the user is not available based on the time that substantially no computer activity is detected, then messages can be stored, and are reported to the user in order of criticality when the user returns to interact with the computer. Furthermore, users can specify routing and paging options as a function of quantities including expected criticality, maximum expected loss, and value of alerting the user.

A notification and/or alerting system may also estimate when the user is expected to return, such that it transmits priorities that are expected to be important before the user is expected to return. This can be achieved by learning user-present and user-away patterns over time. The user can then set suitable policies in terms of when he or she is expected to return to the system to review the priorities without being alerted to them. The expected time to return determination by the system may be automatically conveyed to senders of highly urgent messages, for example. In this manner, message senders receive feedback when the user is expected to return such that he or she can reply to the messages. The sender may also be informed that his or her message has been conveyed to the user's mobile device, and so forth.

Figure 19:
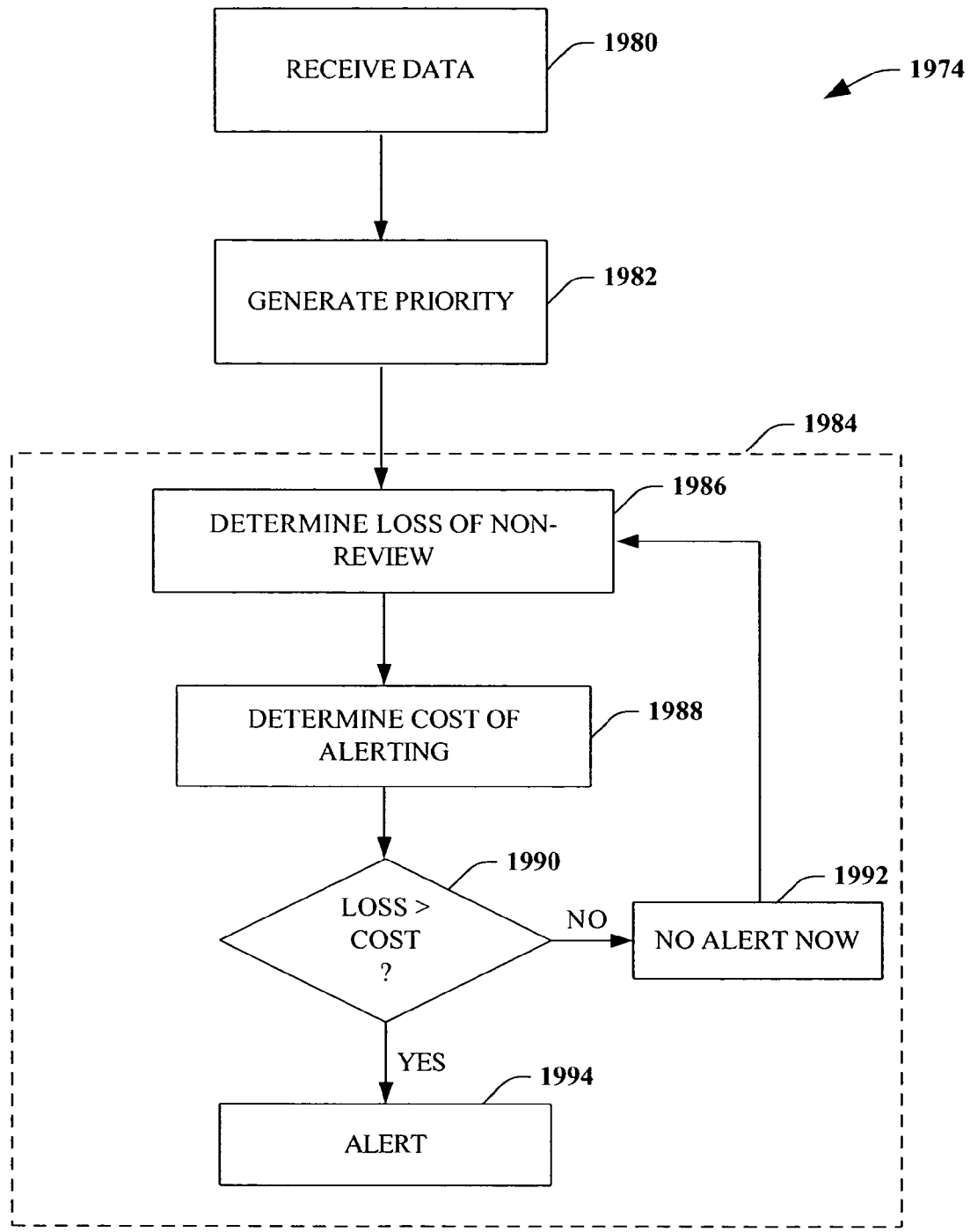
FIG. 19 is a flow chart diagram illustrating a methodology for generating and determining priorities in accordance with an aspect of the present invention.

FIG. 19 illustrates a methodology for generating priorities and performing alerting decisions based on the priorities in accordance the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 19, a flowchart diagram 1974 illustrates a methodology wherein priorities are generated and utilized in accordance with the present invention. At 1980, a data, such as text to have a priority thereof assigned is received. The data can be an e-mail message, or substantially any other type of data or text. At 1982, a priority for the data is generated, based on a classifier, as has been described. Additionally, 1982 can include initial and subsequent training of the classifier, as has been described.

Figure 29:
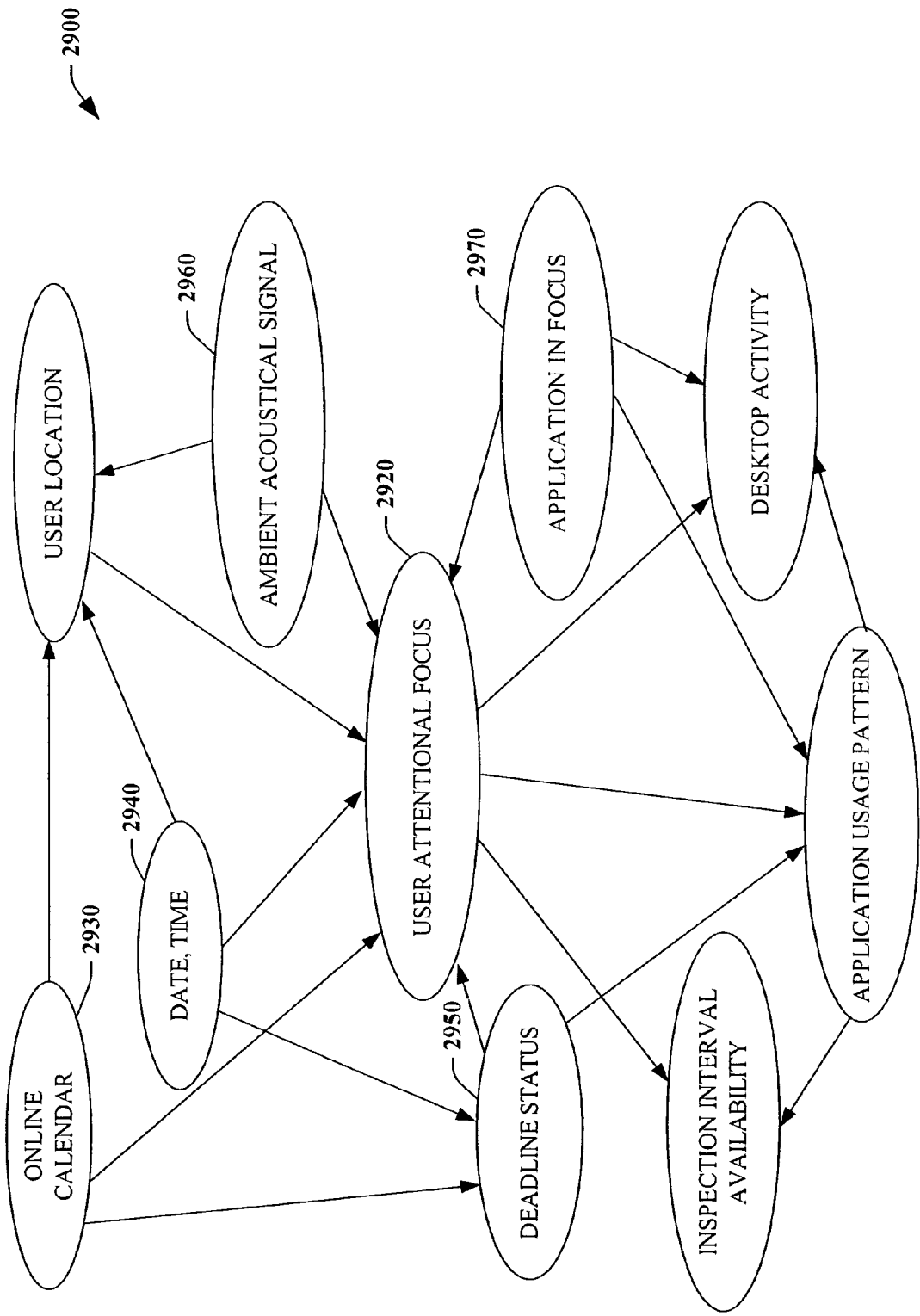
FIG. 29 illustrates an exemplary Bayesian network for inferring a user's focus of attention for a single time period in accordance with an aspect of the present invention.

The priority of the data is then output at 1984. As indicated in FIG. 29, this can include processing at 1986, 1988, 1990, 1992, and 1994. At 1986, an expected loss of non-review of the data at a current time t is determined. This determination considers the expected loss of now-review of the text at a future time, based on an assumption that the user will review the text him or herself, without being alerted, as has been described. At 1988, an expected cost of alerting is determined, as has also been described. If the loss is greater than the cost at 1990, then no alert is made at the time t 1992, and the process proceeds back to 1986, at a new current time t. Proceeding back to 1986 may be performed since as time progresses, the expected loss may at some point outweigh the alert cost, such that the calculus at 1990 can change. Upon the expected loss outweighing the alert cost, then an alert to the user or other system is performed at 1994.

The output of the alert to a user or other system is now described. A user can be alerted on an electronic device based on alert criteria, which indicates when the user should be alerted of a prioritized text. The electronic device on which the user is alerted can be a pager, cellular/digital mobile telephone, or other communications modality as described in more detail below. Alerts to a user on an electronic device, such as a pager or a mobile phone, can be based on alert criteria that can be adapted to be sensitive to information about the location, inferred task, and/or focus of attention of the user, for example. Such information can be inferred under uncertainty or can be accessed from online information sources. The information from an online calendar, for example, can be adapted to control criteria employed to make decisions about relaying information to a device, such as a notification sink which is described in more detail below.

Alerts can be performed by routing the prioritized text or other data based on routing criteria. Routing of the text can include forwarding the text, and/or replying to the sender of the text, in the case where the text is email. For example, a sound can be played to alert the user to a prioritized document. Alternatively, an agent or automated assistant can be opened (e.g., interactive display wizard). That is, the agent can appear on a display screen, to notify the user of the prioritized document. Furthermore, the prioritized document can be opened, such as being displayed on the screen. The document can receive focus. This can also include sizing the document based on its priority, such that the higher the priority of the document, the larger the window in which it is displayed, and/or centrally locating the document on the display based on its priority.

Figure 20:
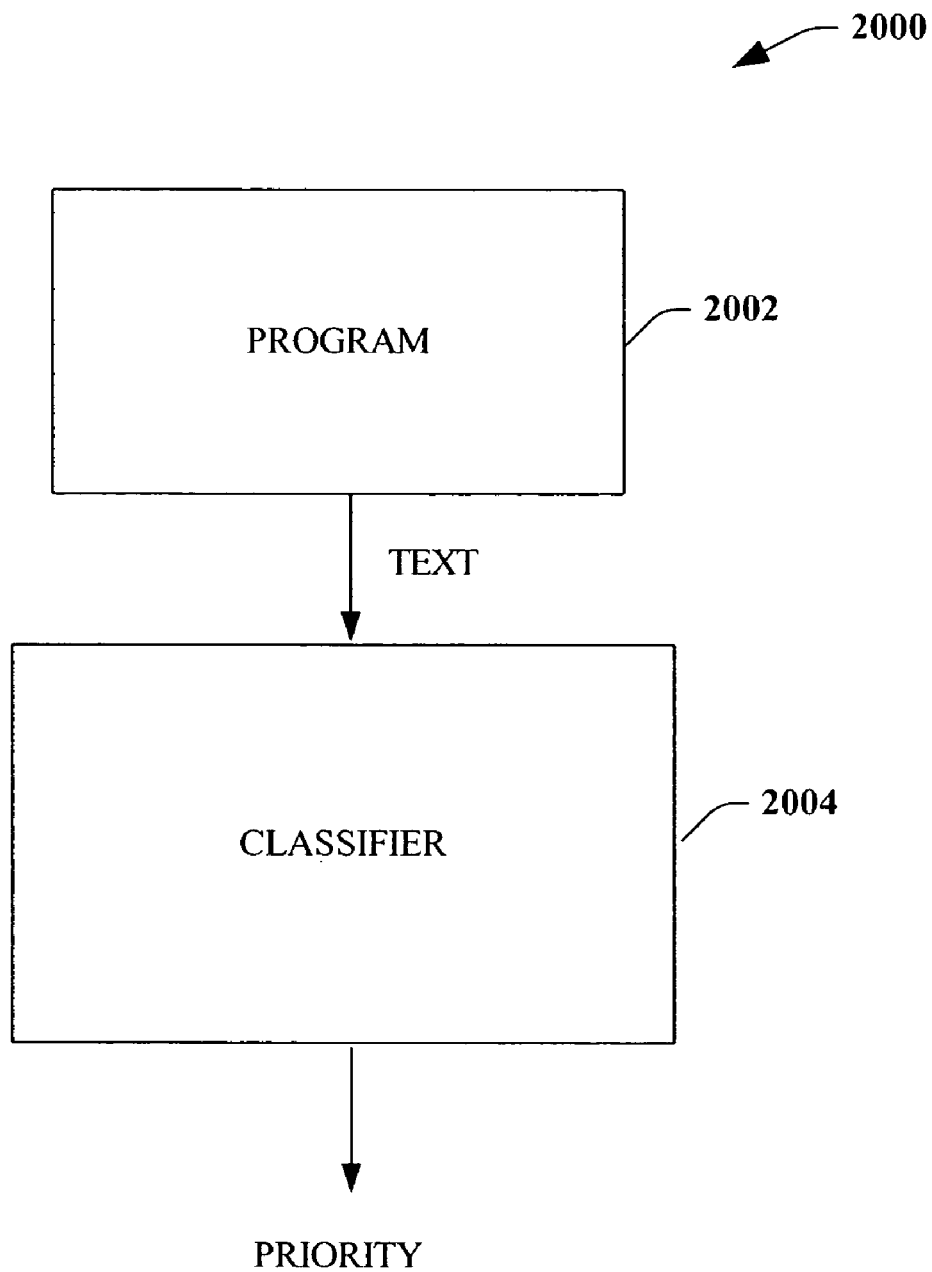
FIG. 20 is a diagram illustrating a text generation program and classifier in accordance with an aspect of the present invention.

Referring now to FIG. 20, a diagram of a text generation and priorities system 2000 in accordance with an aspect of the present invention. The system 2000 includes a program 2002 and a classifier 2004. It is noted that the program 2000 and the classifier 2002 can include a computer program executed by a processor of a computer from a computer-readable medium thereof.

The program 2002 generates a text for input into the classifier 2004. The program includes an electronic mail program that receives e-mail, which then serve as the text. The classifier 2004 generates a priority for the associated message. As described above, the classifier 2004 can be a Bayesian classifier, a Support Vector Machine classifier, or other type of classifier. The priority of the text output by the classifier 2004 can then be utilized in conjunction with a cost-benefit analysis, as has been described, to effectuate further output and/or alerting based thereon.

Figure 21:
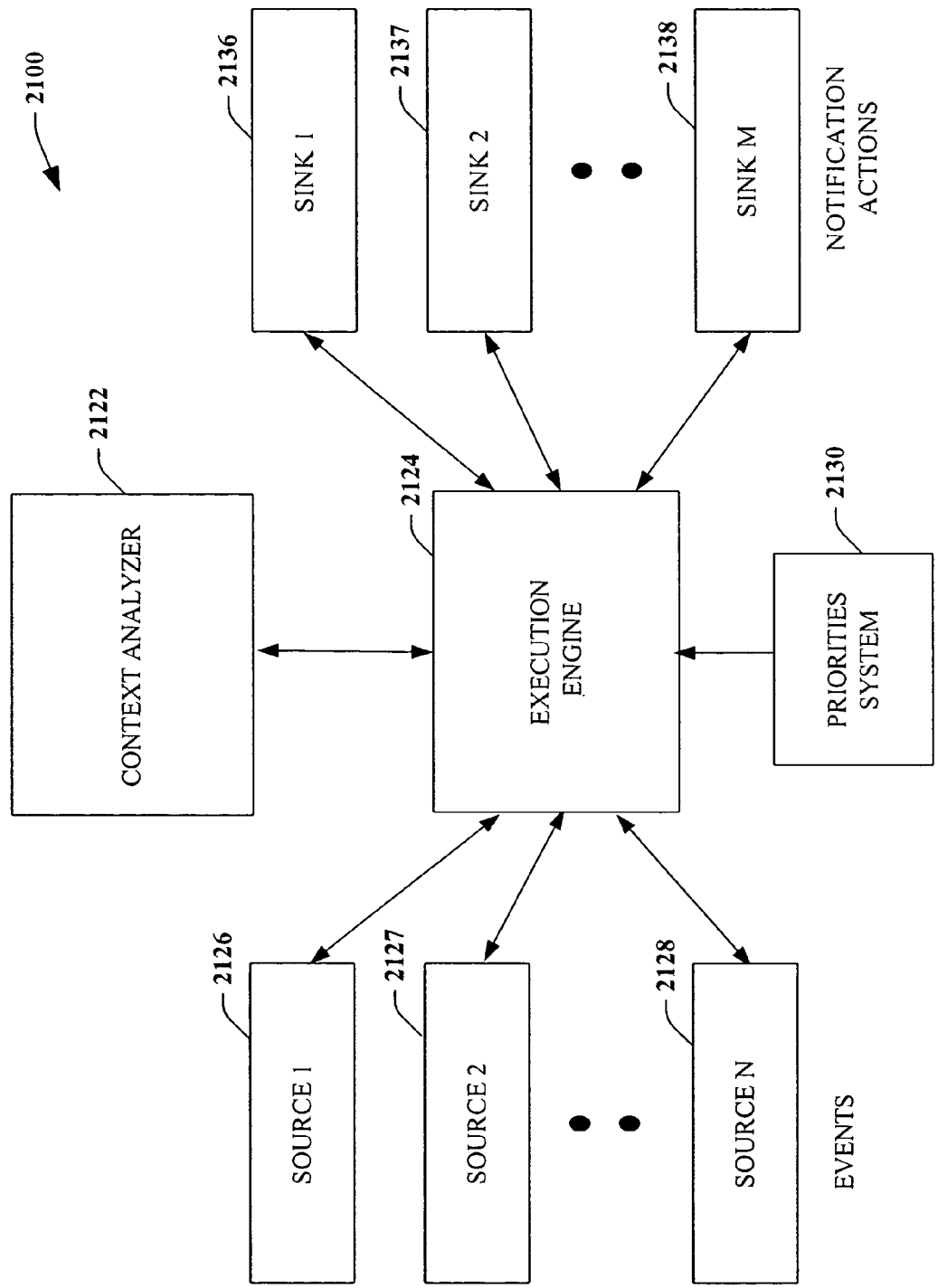
FIG. 21 is a schematic block diagram illustrating systematic cooperation between an execution engine and a context analyzer according to an aspect of the present invention.

Turning now to FIG. 21, a system 2100 illustrates how the preference execution engine and context analyzer function together according to an aspect of the present invention. The system 3100 includes a context analyzer 3122, a preference execution engine 2124, one or more event or notification sources 1 through N, 2126, 2127, 2128, a priorities system 2130, which can operate as a notification source, and one or more action or notification sinks, 1 through M, 2136, 2137, 2138, wherein N an M are integers, respectively. The sources can also be referred to as event publishers, while the sinks can also be referred to as event subscribers, in accordance with an aspect of the present invention. There can be any number of sinks and sources. In general, the execution engine 2124 conveys notifications, which are also referred to as events or alerts, from the sources 2126-2128 to the sinks 2136-2138, based in part on parametric information stored in and/or accessed by the context analyzer 2122.

The context analyzer 2122 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the execution engine 2124, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 2122, according to one aspect of the present invention is inclusive of contextual information determined by the analyzer. The contextual information is determined by the analyzer 2122 by discerning the user's location and attentional status based on one or more contextual information sources (not shown), as is described in more detail in a later section of the description. The context analyzer 2122, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 2126-2128, 2130 generate notifications intended for the user and/or other entity. For example, the sources 2126-2128 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 2130 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification or event sources 2126-2128 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
computer systems (e.g., that may alert the user with messages that information about alerts about system activity or problems);
Internet-related services, appointment information, scheduling queries;
changes in documents or numbers of certain kinds of documents in one or more shared folders;
availability of new documents in response to standing or persistent queries for information; and/or,
information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification action sinks 2136-2138 are able to provide notifications to the user. For example, such notification action sinks 2136-2138 can include computers, such as desktop and/or laptop computers, handheld computers, cell phones, landline phones, pagers, automotive-based computers, as well as other systems/applications as can be appreciated. It is noted that some of the sinks 2136-2138 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The execution engine 2124 accesses the information stored and/or determined by the context analyzer, and determines which of the notifications received from the sources 2126-

2128 to convey to which of the sinks 2136-2138. Furthermore, the engine 2124 can determine how the notification is to be conveyed, depending on which of the sinks 2136-2138 has been selected to send the information to. For example, it may be determined that notifications should be summarized before being provided to a selected sinks 2136-2138.

The invention is not limited to how the engine 2124 makes its decisions as to which of the notifications to convey to which of the notification sinks, and in what manner the notifications are conveyed. In accordance with one aspect, a decision-theoretic analysis can be utilized. For example, the execution engine 2124 can be adapted to infer important uncertainties about variables including a user's location, attention, device availability, and amount of time until the user will access the information if there were no alert. The notification engine 2124 can then make notification decisions about whether to alert a user to a notification, and if so, the nature of the summarization and the suitable device or devices to employ for relaying the notification. In general, the execution engine 2124 determines the net expected value of a notification. In doing so, it can consider the following:

the fidelity and transmission reliability of each available notification sink;
 the attentional cost of disturbing the user;
 the novelty of the information to the user;
 the time until the user will review the information on his or her own;
 the potentially context-sensitive value of the information; and/or,
 the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The execution engine 2124 can make decisions as to one or more of the following:

what the user is currently attending to and doing (based on, for example, contextual information);
 where the user currently is;
 how important the information is;
 what is the cost of deferring the notification;
 how distracting would a notification be;
 what is the likelihood of getting through to the user; and, what is the fidelity loss associated with the use of a specific mode of a given notification sink.

Therefore, the execution engine 2124 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the execution engine 2124 can access information stored in a user profile by the context analyzer 2122 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the execution engine 2124 determines how and whether to notify the user.

According to one aspect of the present invention, the notification platform architecture 2100 can be configured as a layer that resides over an eventing or messaging infrastructure. However, the invention is not limited to any particular eventing infrastructure. Such eventing and messaging systems and protocols can include:

HyperText Transport Protocol (HTTP), or HTTP extensions as known within the art;
 Simple Object Access Protocol (SOAP), as known within the art;
 Windows Management Instrumentation (WMI), as known within the art;
 Jini, as known within the art; and,
 substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture 2100 can utilize an underlying infrastructure as a manner by which sources send notifications, alerts and events, and as a manner by which sinks receive notifications, alerts and events, for example. The present invention is not so limited, however.

Figure 22:
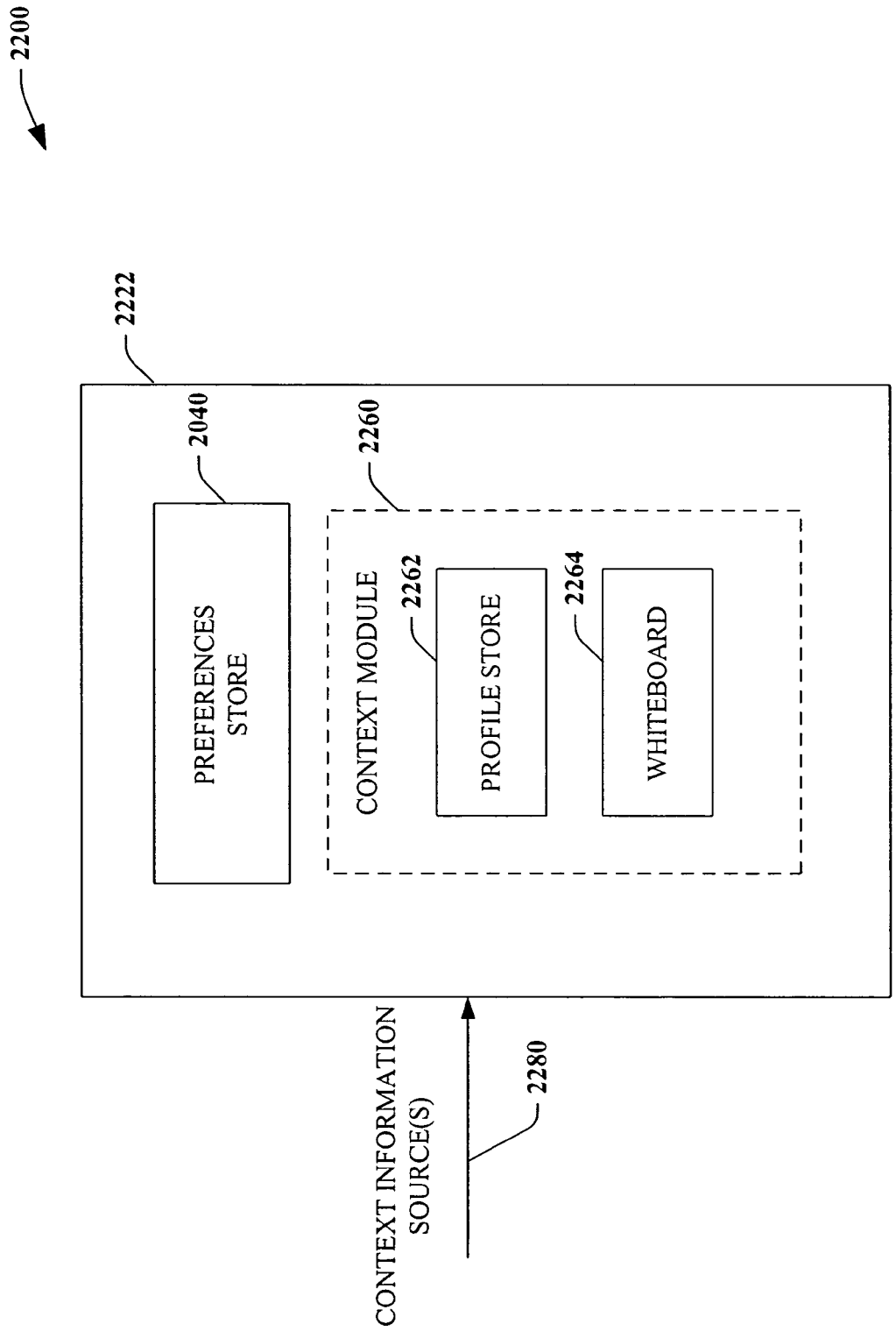
FIG. 22 is a block diagram illustrating a context analyzer in accordance with one aspect of the present invention.

Referring now to FIG. 22, the context analyzer 2122 of the information agent system architecture described in the previous section of the description is depicted in more detail here in system 2200. The context analyzer 2222 as illustrated in FIG. 22 includes a user notification preference store 2240, a user context module 2260 that includes a user context profile store 2262, and a whiteboard 2264. The context analyzer 2222 according to one aspect of the invention can be implemented as one or more computer programs executable by a processor of a computer from a machine-readable medium thereof, including but not limited to a memory.

The preference store 2262 stores notification parameters for a user, such as default notification preferences for the user, for instance a user profile, which can be edited and modified by the user. The preferences store 2262 can be considered as that which stores information on parameters that influence how a user is to be notified. As has been described herein, preferences can be specified by users utilizing schematized logic, of example, in the IF-THEN format. The user context module 2260 determines a user's current context, based on one or more context information sources 2280 as published to the whiteboard 2264, for example. The user context profile store 2262 stores context parameters for a user, such as the default context settings for the user, which can be edited and modified by the user. That is, the user context module 2260 provides a best guess or estimate about a user's current context information by accessing information from the profile store 3262 and/or updating a prior set of beliefs in the store 2262 with live sensing, via the one or more context sources 2280. The profile store 2262 can be considered as that which stores a priori where a user is, and what the user is doing, for example.

The user context profile store 2262 can be a pre-assessed and/or predefined user profile that captures such information as a deterministic or probabilistic profile. The profile can be of typical locations, activities, device availabilities, and costs and values of different classes of notification as a function of such observations as time of day, type of day, and user interactions with one or more devices. The type of day can include weekdays, weekends and holidays, for example. The user context module 2260 can then actively determine or infer aspects of the user's context or state, such as the user's current or future location and attentional state. Furthermore, actual states of context can be accessed directly from the context information sources 2280 via the whiteboard 2264, and/or, can be inferred from a variety of such observations through inferential methods such as Bayesian reasoning as is described in more detail below.

The context information sources 2280 may provide information to the context module 2260 via the whiteboard 2264 regarding the user's attentional state and location, from which the module 2260 can make a determination as to the user's current context (e.g., the user's current attentional state and location). Furthermore, the invention is not limited to a particular number or type of context sources 2280, nor the type of information inferred or accessed by the user context module 2260. However, the context sources 2280 can include multiple desktop information and events, such as mouse information, keyboard information, application information (e.g., which application is currently receiving the focus of the user), ambient sound and utterance information, text information in the windows on the desktop, for example. The whiteboard 2264 can include a common storage area, to which the context information sources 2280 can publish information, and from which multiple components, including sources and the context module 2260 can access this information. An event or action, also referred to as a notification or alert, generally can include information about an observation about one or more states of the world. Such states can include the status of system components, the activity of a user, and/or a measurement about the environment. Furthermore, events can be generated by an active polling of a measuring device and/or source of events, by the receipt of information that is sent on a change, and/or per a constant or varying event heartbeat.

Other types of context sources 2280 include a personal-information manager (PIM) information of the user, which generally can provide scheduling information regarding the schedule of the user, for example. The current time of day, as well as the user's location—for example, determined by a global positioning system (GPS), and/or a user's access of a cell phone, PDA, or a laptop that can be locationally determined—are also types of context sources 2280. Furthermore, real-time mobile device usage is a type of context source 2280. For example, a mobile device such as a cell phone may be able to determine if it is currently being accessed by the user, as well as device orientation and tilt (e.g., indicating information regarding device usage as well), and acceleration and speed (e.g., indicating information as to whether the user is moving or not).

Figure 23:
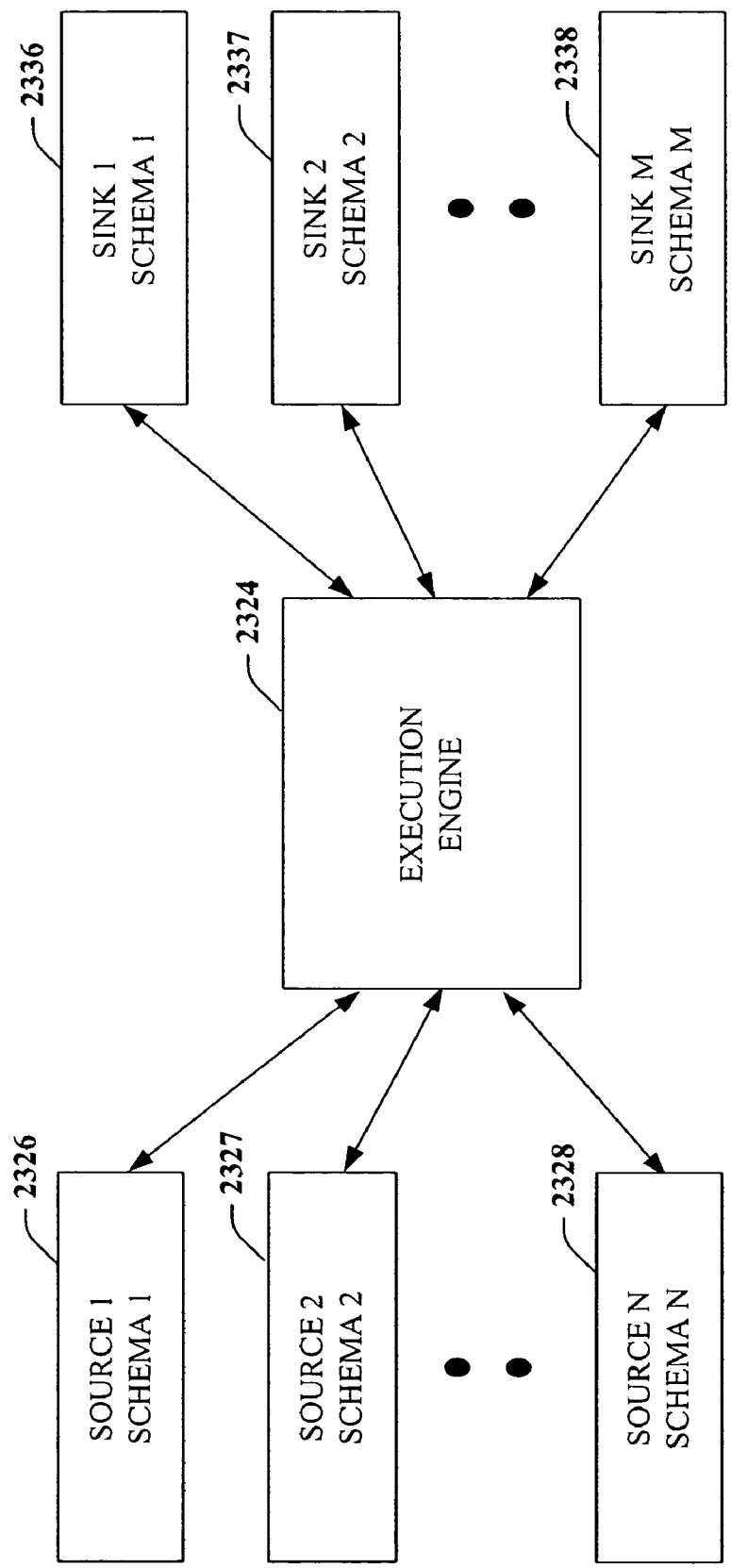
FIG. 23 is a block diagram illustrating sources and sinks in accordance with an aspect of the present invention.

Referring now to FIG. 23, the notification sources described above are illustrated in more detail. The notification sources 2326-2328, generally generate notifications that are conveyed to the notification execution engine 2324, which determines when notifications should occur, and, if so, which of the notifications should be conveyed to which of the notification sinks 2336-2338 and in what order.

According to one aspect of the present invention, notification sources 2326-2328 can have one or more of the following parameters within a standard description of attributes and relationships, referred to herein as a notification source schema or source schema. It is noted that schema can be provided for sources, for sinks, and for context-information sources, described above. Such schemas provide declarative information about different components and can enable the sources 2326-2328, the notification engine 2324, the sinks 2336-2338, and the context analyzer 2322 to share semantic information with one another. Thus, different schemas provide information about the nature, urgency, and device signaling modalities associated with notification. That is, a schema can be defined generally as a collection of classes and relationships among classes that defines the structure of notifications and events, containing information including event or notification class, source, target, event or notification semantics, ontological content information, observational reliability, and substantially any quality-of-service attributes, for example.

Parameters (not shown) for notification source schema can include one or more of: message class; relevance; importance; time criticality; novelty; content attributes; fidelity tradeoffs, and/or source information summary information. The message class for a notification generated by a notification source indicates the type of communication of the notification, such as e-mail, instant message, numerical financial update, and desktop service, for example. The relevance for a notification generated by notification sources indicates a likelihood that the information contained within the notification is relevant, for one or more specified contexts. For example, the relevance can be provided by a logical flag, indicating whether the source is relevant for a given context or not. The novelty of the notification indicates the likelihood that the user already knows the information contained within the notification. That is, the novelty is whether the information is new to the user, over time (indicating if the user knows the information now, and when, if ever, the user will learn the information in the future without being alerted to it).

Fidelity tradeoffs associated with the notification indicate the loss of value of the information within the notification that can result from different forms of specified allowed truncation and/or summarization, for example. Such truncation and/or summarization may be required for the notification to be conveyed to certain types of notification sinks 2336-2338 that may have bandwidth and/or other limitations preventing the sinks from receiving the full notification as originally generated. Fidelity in general refers to the nature and/or degree of completeness of the original content associated with a notification. For example, a long e-mail message may be truncated, or otherwise summarized to a maximum of 100 characters allowed by a cell phone, incurring a loss of fidelity. Likewise, an original message containing text and graphics content suffers a loss in fidelity when transmitted via a device that only has text capabilities. In addition, a device may only be able to depict a portion of the full resolution available from the source. Fidelity tradeoffs refer to a set of fidelity preferences of a source stated either in terms of orderings (e.g., rendering importance in order of graphics first, then sound) and/or costs functions that indicate how the total value of the content of the notification diminishes with changes in fidelity. For example, a fidelity tradeoff can describe how the full value associated with the transmission of a complete e-mail message changes with increasingly greater amounts of truncation. Content attributes, for example, can include a summary of the nature of the content, representing such information as whether the core message includes text, graphics, and audio components. The content itself is the actual graphics, text, and/or audio that make up the message content of the notification.

Figure 24:
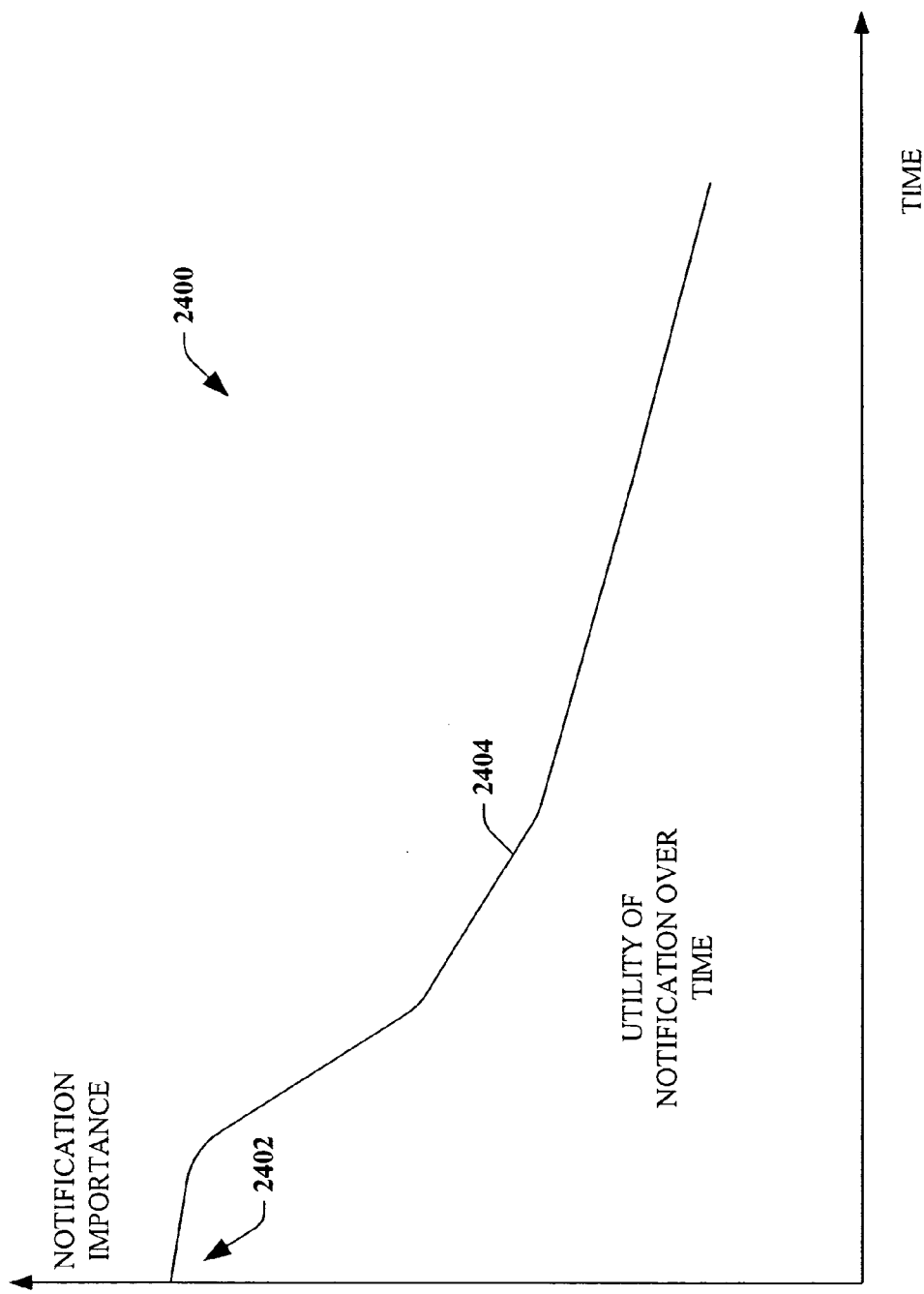
FIG. 24 is a graph depicting the utility of a notification mapped over time.

The importance of a notification refers to the value of the information contained in the notification to the user, assuming the information is relevant in a current context. For example, the importance can be expressed as a dollar value of the information's worth to the user. Time criticality indicates time-dependent change in the value of information contained in a notification—that is, how the value of the information changes over time. In most but not all cases, the value of the information of a notification decays with time. This is illustrated in the diagram of FIG. 24. A graph 2400 depicts the utility of a notification mapped over time. At the point 2402 within the graph, representing the initial time, the importance of the notification is indicated, while the curve 2404 indicates the decay of the utility over time.

Referring back to FIG. 23, default attributes and schema templates for different notification sources or source types may be made available in notification source profiles stored in the user notification preferences store, such as the store 2240 of FIG. 22. Such default templates can be directed to override values provided by notification sources or to provide attributes when they are missing from schema provided by the sources. Source summary information enables a source to post general summaries of the status of information and potential notifications available from a source. For example, source summary information from a messaging source may include information about the total number of unread messages that are at least some priority, the status of attempts by people to communicate with a user, and/or other summary information.

The notification sinks 2336-2338 can be substantially any device or application by which the user or other entity can be notified of information contained in notifications. The choice as to which sink or sinks are to be employed to convey a particular notification is determined by the notification engine 2324.

Notification sinks 2336-2338 may have one or more of the following parameters provided within a schema. These parameters may include a device class; modes of signaling (alerting); and, for the associated mode, fidelity/rendering capabilities, transmission reliability, actual cost of communication, and/or attentional cost of disruption, for example. For devices that are adapted for parameterized control of alerting attributes, the schema for the devices can additionally include a description of the alerting attributes and parameters for controlling the attributes, and functions by which other attributes (e.g., transmission reliability, cost of distribution) change with the different settings of the alerting attributes. The schema for notification sinks provides for the manner by which the notification devices communicate semantic information about their nature and capabilities with the notification execution engine 2324 and/or other components of the system. Default attributes and schema templates for different device types can be made available in device profiles stored in the user notification preferences store, such as the store 2240 of FIG. 22 as described in the previous section. Such default templates can be directed to override values provided by devices or to provide attributes when they are missing from schema provided by such devices.

Each of the schema parameters is now described in term. The class of the device refers to the type of the device such as a cell phone, a desktop computer, and a laptop computer, for example. The class can also be more general, such as a mobile or a stationery device. The modes of signaling refer to the manner in which a given device can alert the user about a notification. Devices may have one or more notification modes. For example, a cell phone may only vibrate, may only ring with some volume, and/or it can both vibrate and ring. Furthermore, a desktop display for an alerting system can be decomposed into several discrete modes (e.g., a small notification window in the upper right hand of the display vs. a small thumbnail at the top of the screen—with or without an audio herald). Beyond being limited to a set of predefined behaviors, a device can enable modes with alerting attributes that are functions of parameters, as part of a device definition. Such continuous alerting parameters for a mode represent such controls as the volume at which an alert is played at the desktop, rings on a cell phone, and the size of an alerting window, for example.

The transmission reliability for a mode of a notification sink 2336-2338 indicates the likelihood that the user will receive the communicated alert about a notification, which is conveyed to the user via the sink with that mode. As transmission reliability may be dependent on the device availability and context of the user, the transmission reliability of different modes of a device can be conditioned on such contextual attributes as the location and attention of a user. Transmission reliability for one or more unique contextual states, defined by the cross product of such attributes as unique locations and unique attentional states, defined as disjunctions created as abstractions of such attributes (e.g., for any location away from the home, and any time period after 8 am and before noon), can also be specified. For example, depending on where the user currently is, information transmitted to a cell phone may not always reach the user, particularly if the user is in a region with intermittent coverage, or where the user would not tend to have a cell phone in this location (e.g., family holiday). Contexts can also influence transmission reliability because of ambient noise and/or other masking or distracting properties of the context.

The actual cost of communication indicates the actual cost of communicating the information to the user when contained within a notification that is conveyed to the sink. For example, this cost can include the fees associated with a cell phone transmission. The cost of disruption includes the attentional costs associated with the disruption associated with the alert employed by the particular mode of a device, in a particular context. Attentional costs are typically sensitive to the specific focus of attention of the user. The fidelity/rendering capability is a description of the text, graphics, and audio/tactile capabilities of a device, also given a mode. For example, a cell phone's text limit may be 100 characters for any single message, and the phone may have no graphics capabilities.

Figure 25:
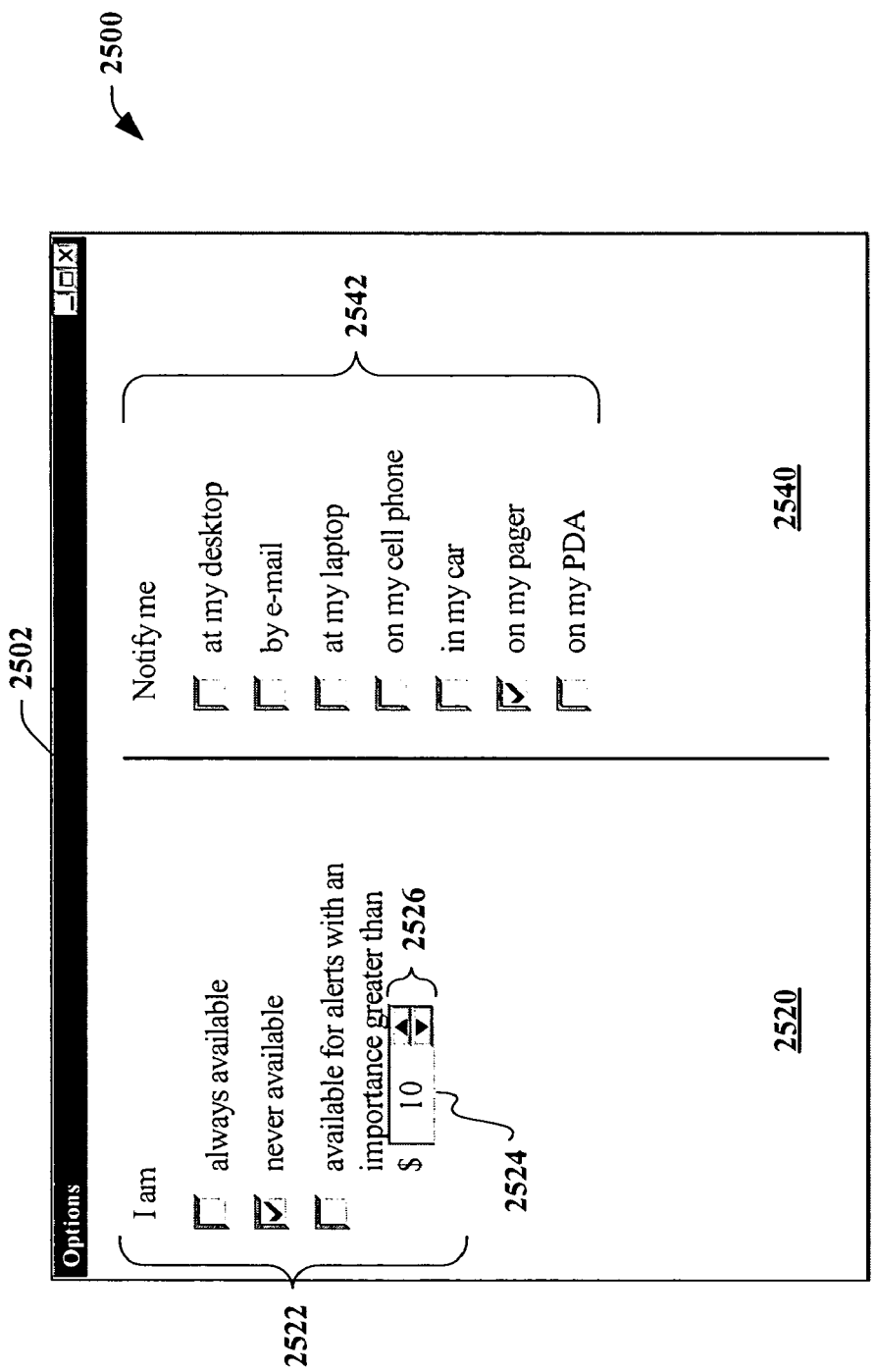
FIG. 25 is an illustration of an exemplary interface in accordance with an aspect of the present invention.

Turning now to FIG. 25, an exemplary interface 2500 illustrates context specifications selectable by a user that can be utilized by a context analyzer in determining a user's current context. The determination of user context by direct specification by the user, and/or a user-modifiable profile, is described. The context of the user can include the attentional focus of the user—that is, whether the user is currently amenable to receiving notification alerts—as well as the user's current location. The present invention is not so limited, however.

Direct specification of context by the user enables the user to indicate whether or not he or she is available to receive alerts, and where the user desires to receive them. A default profile (not shown) can be employed to indicate a default attentional state, and a default location wherein the user can receive the alerts. The default profile can be modified by the user as desired.

Referring to FIG. 25, the interface 2500 illustrates how direct specification of context can be implemented, according to an aspect of the present invention. A window 2502, for example, has an attentional focus section 2520 and a location section 2540. In the focus section 2520, the user can check one or more check boxes 2522, for example, indicating whether the user is always available to receive alerts; whether the user is never available to receive alerts; and, whether the user is only available to receive alerts that has an importance level greater than a predetermined threshold. It is to be appreciated that other availability selections can be provided. As depicted in FIG. 25, a threshold can be measured in dollars, but this is for exemplary purposes only, and the invention is not so limited. The user can increase the threshold in the box 2524 by directly entering a new value, or by increasing or decreasing the threshold via arrows 2526.

In the location section 2540, the user can check one or more of the check boxes 2542, to indicate where the user desires to have alerts conveyed. For example, the user can have alerts conveyed at the desktop, by e-mail, at a laptop, on a cell phone, in his or her car, on a pager, or on a personal digital assistant (PDA) device, and so forth. It is to be appreciated that these are examples only, however, and the invention itself is not so limited.

The window 2502, wherein there can be preset defaults for the checkboxes 2522 and the box 2524 of the section 2520 and the checkboxes 2542 of the section 2540, can be considered a default user profile. The profile is user modifiable in that the user can override the default selections with his or her own desired selections. Other types of profiles can also be utilized in accordance with the invention.

Figure 26:
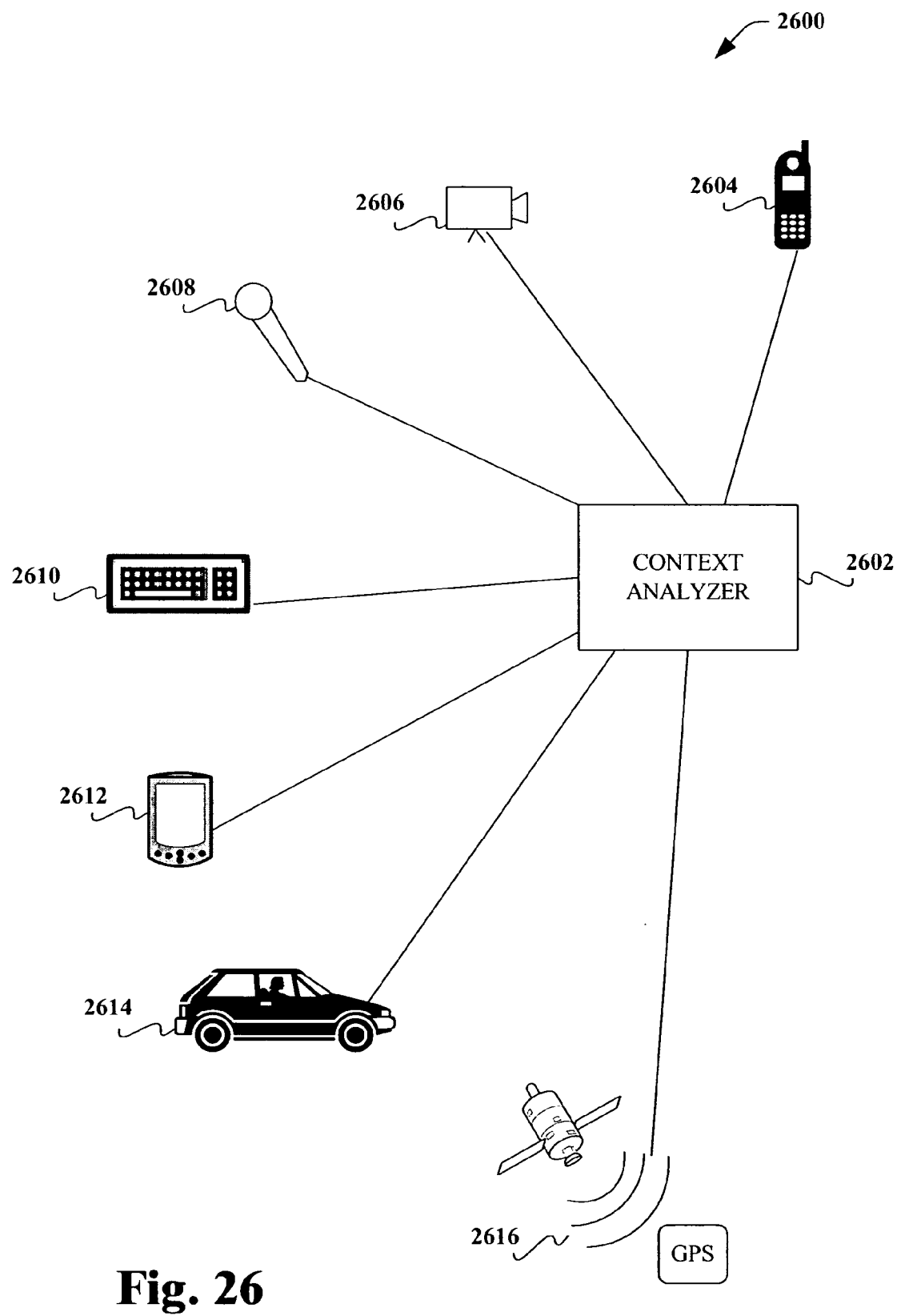
FIG. 26 illustrates methodologies for determining a user context by direct measurement in accordance with an aspect of the present invention.

Referring at this time to FIG. 26, a determination of user context by direct measurement, for example, using one or more sensors, is illustrated in accordance with the present invention. The context of the user can include the user's attentional focus, as well as his or her current location. The invention itself is not so limited, however. Direct measurement of context indicates that sensor(s) can be employed to detect whether the user is currently amenable to receiving alerts, and to detect where the user currently is. According to one aspect of the present invention, an inferential analysis in conjunction with direct measurement can be utilized to determine user context, as is described in a later section of the description.

Referring to FIG. 26, a system 2600 in which direct measurement of user context can be achieved is illustrated. The system 2600 includes a context analyzer 2602, and communicatively coupled thereto a number of sensors 2604-2616, namely, a cell phone 2604, a video camera 2606, a microphone 2608, a keyboard 2610, a PDA 2612, a vehicle 2614, and a GPS 2616, for example. The sensors 2604-2616 depicted in FIG. 26 are for exemplary purposes only, and do not represent a limitation or a restriction on the invention itself. The term sensor as used herein is a general and overly encompassing term, meaning any device or manner by which the context analyzer 2602 can determine what the user's current attentional focus is, and/or what the user's current location is.

For example, if the user has the cell phone 2604 on, this can indicate that the user can receive alerts on the cell phone 2604. However, if the user is currently talking on the cell phone 2604, this can indicate that the user has his or her attentional focus on something else (namely, the current phone call), such that the user should not presently be disturbed with a notification alert. A video camera 2606 can, for example, be in the user's office, to detect whether the user is in his or her office (viz., the user's location), and whether others are also in his or her office, suggesting a meeting with them, such that the user should not be disturbed (viz., the user's focus). Similarly, the microphone 2608 can also be in the user's office, to detect whether the user is talking to someone else, such that the user should not be disturbed, is typing on the keyboard (e.g., via the sounds emanating therefrom), such that the user should also not be presently disturbed. The keyboard 2610 can also be employed to determine if the user is currently typing thereon, such that, for example, if the user is typing very quickly, this may indicate that the user is focused on a computer-related activity, and should not be unduly disturbed (and, also can indicate that the user is in fact in his or her office).

If the PDA device 2612 is being accessed by the user, this can indicate that the user is able to receive alerts at the device 2612—that is, the location at which notifications should be conveyed is wherever the device 2612 is located. The device 2612 can also be utilized to determine the user's current attentional focus. The vehicle 2614 can be utilized to determine whether the user is currently in the vehicle—that is, if the vehicle is currently being operated by the user. Furthermore, the speed of the vehicle can be considered, for example, to determine what the user's focus is. If the speed is greater than a predetermined speed, for instance, then it may be determined that the user is focused on driving, and should not be bothered with notification alerts. GPS device 2616 can also be employed to ascertain the user's current location, as known within the art.

In the following section of the detailed description, a determination of user context according to user-modifiable rules is described. The context of the user can include the user's attentional focus, as well as his or her current location. The invention is not so limited, however. Determining context via rules indicates that a hierarchical set of if-then rules can be followed to determine the user's location and/or attentional focus.

Figure 27:
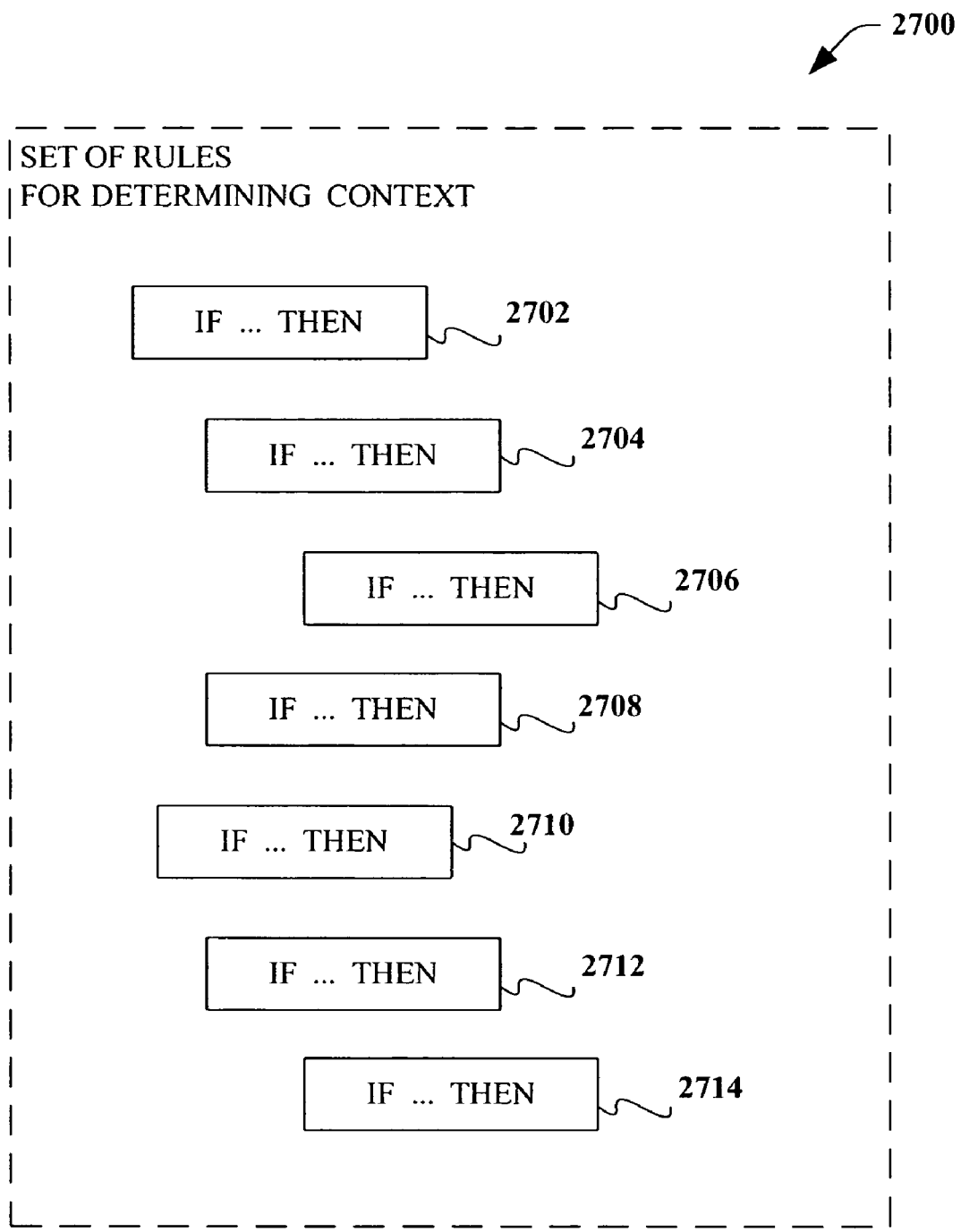
FIG. 27 is a block diagram illustrating an exemplary hierarchical ordered set of rules for determining context in accordance with an aspect of the present invention.

Referring to FIG. 27, a diagram illustrates an exemplary hierarchical ordered set of rules 2700. The set of rules 2700 depicts rules 2702, 2704, 2706, 2708, 2710, 2712 and 2714, for example. It is noted that other rules may be similarly configured. As illustrated in FIG. 27, rules 2704 and 2706 are subordinate to 2702, while rule 2706 is subordinate to rule 2704, and rule 2714 is subordinate to rule 2712. The rules are ordered in that rule 2702 is first tested; if found true, then rule 2704 is tested, and if rule 2704 is found true, then rule 2706 is tested, and so forth. If rule 2704 is found false, then rule 2708 is tested. If rule 2702 is found false, then rule 2710 is tested, which if found true, causes testing of rule 2712, which if found true causes testing of rule 2714. The rules are desirably user creatable and/or modifiable. Otherwise-type rules can also be included in the set of rules 2700 (e.g., where if an if-then rule is found false, then the otherwise rule is controlling).

Thus, a set of rules can be constructed by the user such that the user's context is determined. For example, with respect to location, the set of rules can be such that a first rule tests whether the current day is a weekday. If it is, then a second rule subordinate to the first rule tests whether the current time is between 9 a.m. and 5 p.m. If it is, then the second rule indicates that the user is located in his or her office, otherwise the user is at home. If the first rule is found to be false—that is, the current day is a weekend and not a weekday—then an otherwise rule may state that the user is at home. It is noted that this example is not meant to be a restrictive or limiting example on the invention itself, wherein one or more other rules may also be similarly configured.

In the following section of the description, a determination of user context by inferential analysis, such as by employing a statistical and/or Bayesian model, is described. It is noted that context determination via inferential analysis can rely in some aspects on other determinations, such as direct measurement via sensor(s), as has been described. Inferential analysis as used herein refers to using an inference process(es) on a number of input variables, to yield an output variable(s), namely, the current context of the user. The analysis can include in one aspect utilization of a statistical model and/or a Bayesian model.

Figure 28:
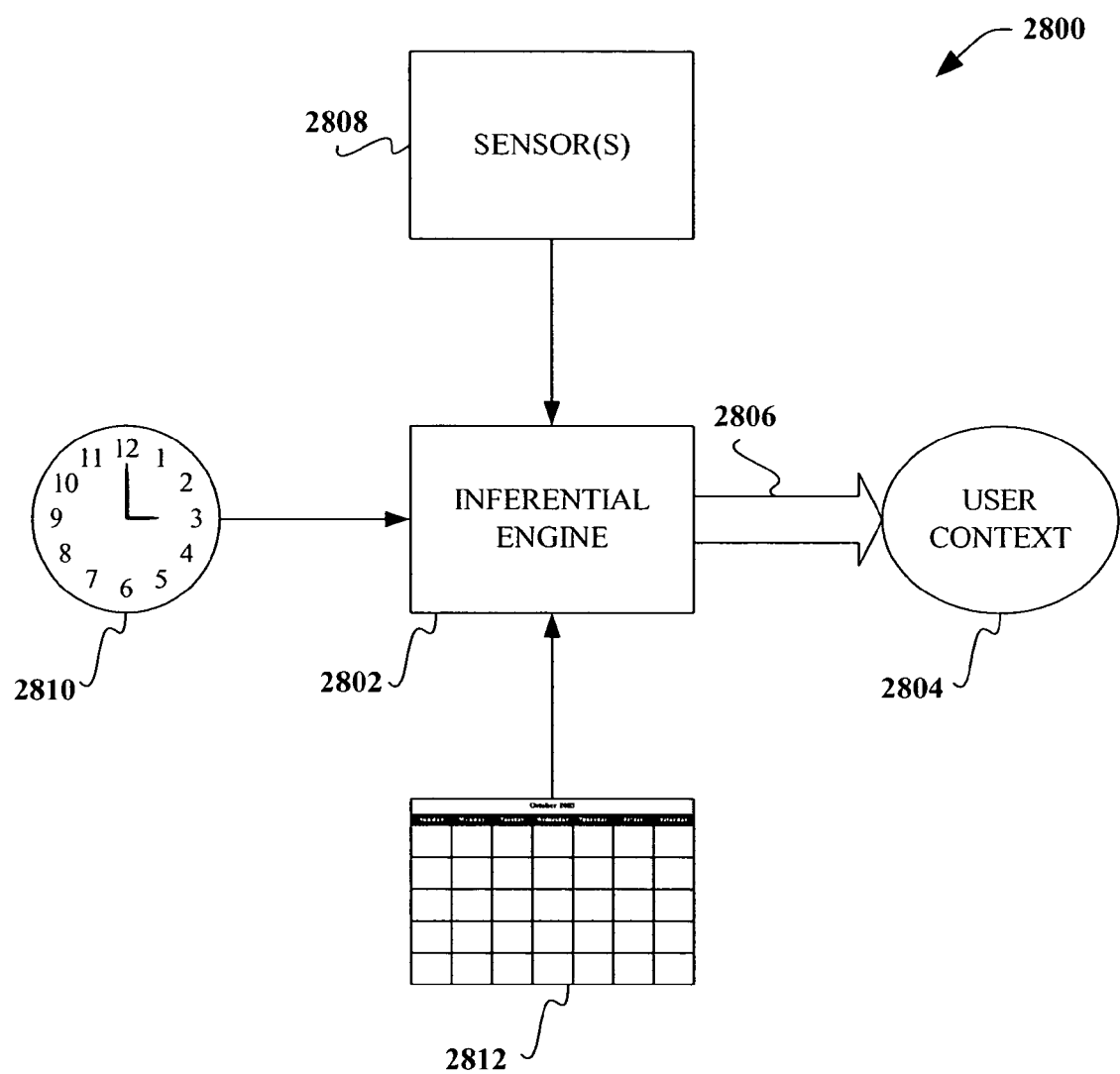
FIG. 28 is a schematic block diagram of a system illustrating inferential analysis being performed by an inferential engine to determine a user's context, according to an aspect of the present invention.

Referring to FIG. 28, a diagram of a system 2800 is illustrated in which inferential analysis is performed by an inferential engine 2802 to determine a user's context 2804, according to an aspect of the present invention. The engine 2802 is in one aspect a computer program executed by a processor of a computer from a computer-readable medium thereof, such as a memory. The user context 3804 can be considered the output variable of the engine 2802.

The engine 2802 can process one or more input variables to make a context decision. Such input variables can include one or more sensor(s) 2808, such as the sensor(s) that have been described in conjunction with a direct measurement approach for context determination in a previous section of the description, as well as the current time and day, as represented by a clock 2810, and a calendar 2812, as may be accessed in a user's scheduling or personal-information manager (PIM) computer program, and/or on the user's PDA device, for example. Other input variables can also be considered besides those illustrated in FIG. 28. The variables of FIG. 28 are not meant to be a limitation or a restriction on the invention itself.

Figure 30:
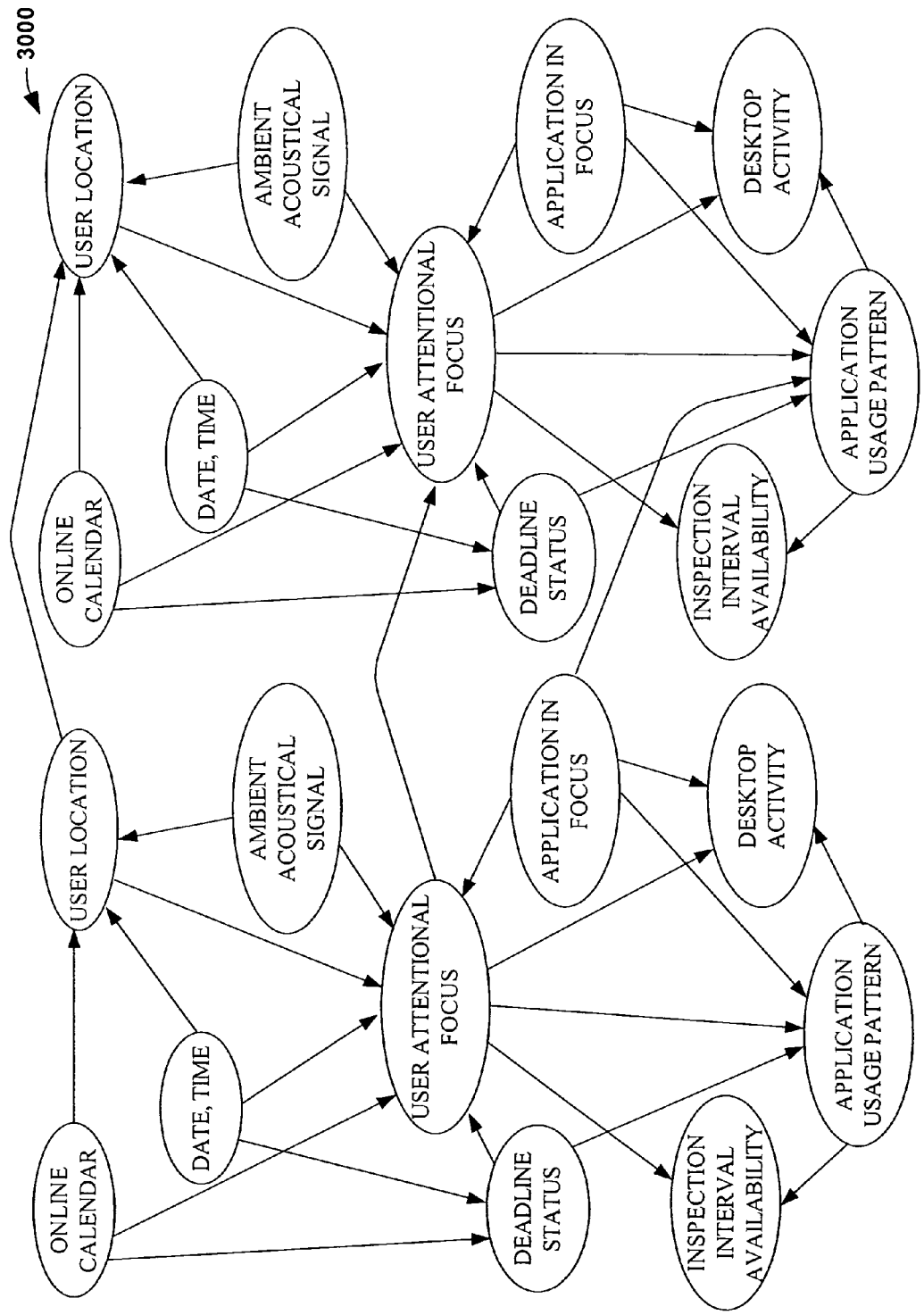
FIG. 30 illustrates a Bayesian model of a user's attentional focus among context variables at different periods of time in accordance with an aspect of the present invention.

Referring now to FIGS. 29 and 30, an exemplary inferential model, such as provided by a statistical and/or Bayesian model that can be executed by the inferential engine described above is illustrated in accordance with the present invention. In general, a computer system can be somewhat uncertain about details of a user's state. Thus, probabilistic models can be constructed that can make inferences about a user's attention or other state under uncertainty. Bayesian models can infer a probability distribution over a user's focus of attention. Such states of attention can be formulated as a set of prototypical situations or more abstract representations of a set of distinct classes of cognitive challenges being addressed by a user. Alternatively, models can be formulated that make inferences about a continuous measure of attentional focus, and/or models that directly infer a probability distribution over the cost of interruption for different types of notifications.

Bayesian networks may be employed that can infer the probability of alternate activity contexts or states based on a set of observations about a user's activity and location. As an example, FIG. 29 displays a Bayesian network 2900 for inferring a user's focus of attention for a single time period. States of a variable, Focus of Attention 2920, refer to desktop and non-desktop contexts. Exemplary attentional contexts considered in the model include situation awareness, catching up, nonspecific background tasks, focused content generation or review, light content generation or review, browsing documents, meeting in office, meeting out of office, listening to presentation, private time, family time, personal focus, casual conversation and travel, for example. The Bayesian network 2900 indicates that a user's current attention and location are influenced by the user's scheduled appointments 2930, the time of day 2940, and the proximity of deadlines 2950. The probability distribution over a user's attention is also in influenced by summaries of the status of ambient acoustical signals 2960 monitored in a user's office, for example. Segments of the ambient acoustical signal 2960 over time provide clues/inputs about the presence of activity and conversation. Status and configuration of software applications and the ongoing stream of user activity generated by a user interacting with a computer also provide sources of evidence about a user's attention.

As portrayed in the network 2900, a software application currently at top-level focus 2970 in an operating system or other environment influences the nature of the user's focus and task, and the status of a user's attention and the application at focus together influence computer-centric activities. Such activity includes the stream of user activity built from sequences of mouse and keyboard actions and higher-level patterns of application usage over broader time horizons. Such patterns include e-mail-centric and Word-processor centric, and referring to prototypical classes of activity involving the way multiple applications are interleaved.

FIG. 30 illustrates a Bayesian model 3000 of a user's attentional focus among context variables at different periods of time. A set of Markov temporal dependencies is illustrated by the model 3000, wherein past states of context variables are considered in present determinations of the user's state. In real-time, such Bayesian models 3000 consider information provided by an online calendar, for example, and a stream of observations about room acoustics and user activity as reported by an event sensing system (not shown), and continues to provide inferential results about the probability distribution of a user's attention.

Figure 31:
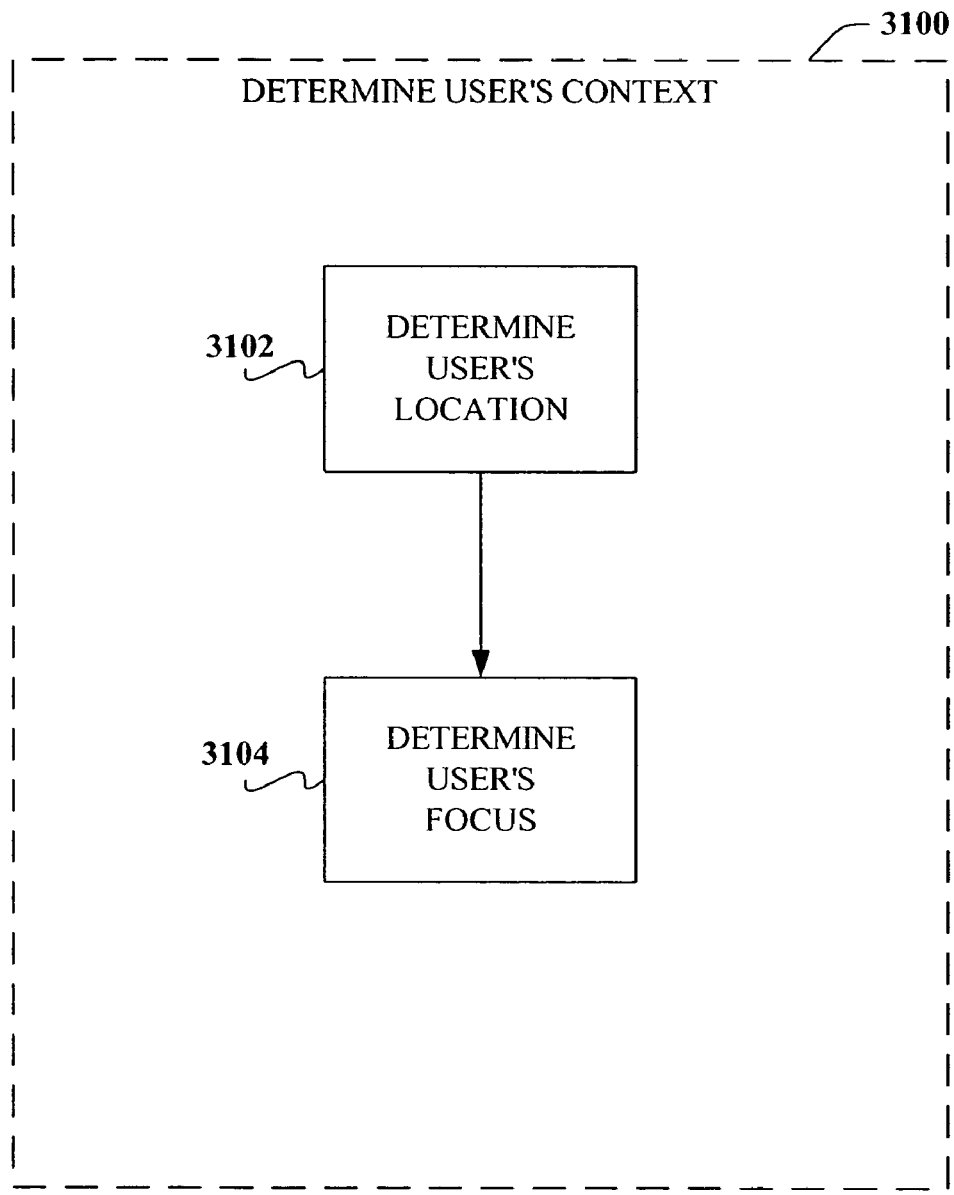
FIG. 31 is a flowchart diagram illustrating how a user's context is determined in accordance with an aspect of the present invention.
Figure 32:
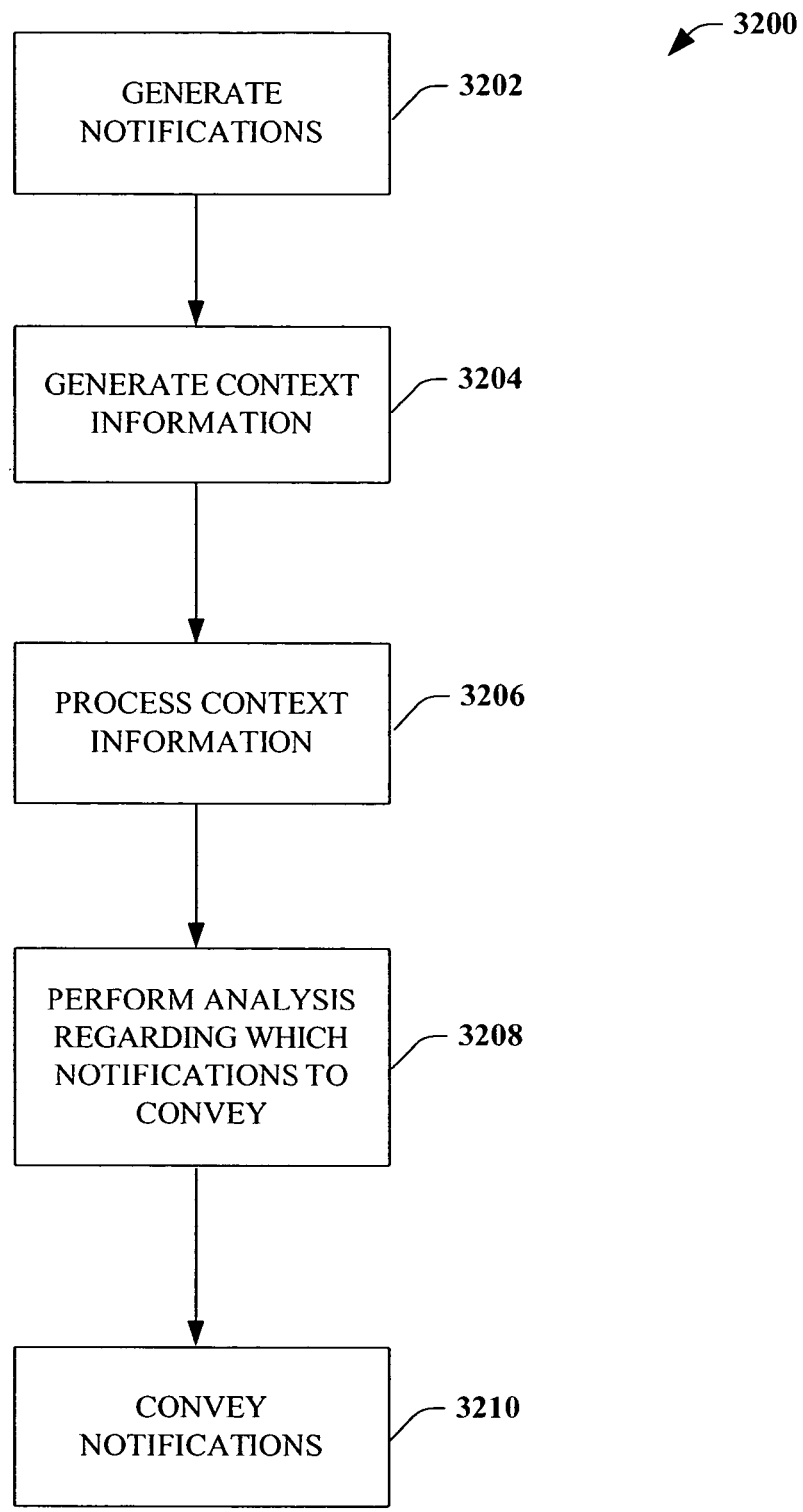
FIG. 32 is a flowchart diagram illustrating a notification conveyance process in accordance with an aspect of the present invention.

FIGS. 31 and 32 illustrate methodologies for providing portions of a notification architecture such as a context analyzer and a notification engine in accordance the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 31, a flowchart diagram 3100 illustrates determining a user's context in accordance with the present invention. The process includes determining the user's location in 3102, and the user's focus in 3104. These acts can be accomplished by one or more of the approaches described previously. For example, a profile can be employed; a user can specify his or her context; direct measurement of context can be utilized; a set of rules can be followed; an inferential analysis, such as via a Bayesian or a statistical model, can also be performed. It is to be appreciated that other analysis can be employed to determine a user's context. For example, there can be an integrated video camera source that notes if someone is front of the computer and whether or not he or she is looking at the computer. It is noted, however, that the system can operate with or without a camera. For all of the sources, the system can operate with substantially any input source available, not requiring any particular source to inference about context. Furthermore, in other aspects, there can be integrated accelerometers, microphones, and proximity detectors on small PDA's that give a sense of a user's location and attention.

Referring now to FIG. 32, a flowchart diagram 3200 illustrates a decision process for a notification engine in accordance with an aspect of the present invention. At 3202, one or more notification sources generate notifications, which are received by a notification engine. At 3204, a context analyzer generates/determines context information regarding the user, which in 3206 is received by the notification engine. That is, according to one aspect of the present invention, at 3204, the context analyzer accesses a user contextual information profile that indicates the user's current attentional status and location, and/or assesses real-time information regarding the user's current attentional status and location from one or more contextual information sources, as has been described in the previous sections of the description. At 3208, the notification engine determines which of the notifications to convey to which of the notification sinks, based in part on the context information received from the context analyzer. The notification engine also makes determinations based on information regarding notification parameters of the user as stored by the context analyzer. That is, according to one aspect, in 3208, the engine performs a decision-theoretic analysis as to whether a user should be alerted for a given notification, and how the user should be notified. As will be described in more detail below, decision-theoretic and/or heuristic analysis, determinations and policies may be employed at 3208. Notification parameters regarding the user can be utilized to personalize the analysis by filling in missing values or by overwriting parameters provided in the schema of sources or sinks. Notification preferences can also provide policies (e.g., heuristic) that are employed in lieu of the decision-theoretic analysis. Based on this determination, the notification engine conveys the notifications to the distributor at 3210.

Data-Driven Application Installation

According to another aspect of the present invention, installation of information agent applications can be accomplished by updating pre-defined tables. Conventional notification systems as well as other applications typically involve a proliferation of database objects when they are installed. Every application conventionally has had to store procedures as well as a large number of tables and databases during an installation process. The present invention, however, takes a different approach. First, when a system or platform such as information agent system 100 is installed, a base set of tables can be created. Accordingly, application installation merely involves inserting data into the pre-existing tables. This approach eliminates the proliferation of database objects as the number of installed applications increase and enables extensibility (discussed infra).

To accomplish the foregoing, events, preferences, and procedures can all be stored as data. This enables a system to take advantage of the ever-increasing processing power of database engines and queries to execute a multitude of applications such as information agent applications 300 (FIG. 3). As was described above, preferences can be defined by end-users and then abstracted to high-level data fields in tables and databases. Events can be captured or retrieved and then stored in a database. Conventional stored procedures such as query evaluation procedures can also be represented as data by creating procedures and rolling the text into one or more database tables. Thereafter, when the procedure is to be executed, the string of text representing the procedure can be pulled out of a database table and evaluated dynamically in the database. This approach dramatically reduces the number of stored procedures that are needed to be created by an application and makes application installation merely a DML (Data Manipulation Language) data driven operation.

Composability and Extensibility

This section describes how information agent applications are composed at the time of initial creation and how they can later be extended. Information agent applications (IA applications) are designed to enable an end-user to interact via an event-condition-action (ECA) model with some underlying system or application domain. More particularly, information agent applications are designed to enable users to be able to specify preferences that control how other application capabilities are applied, especially for problem domains dealing with information routing, filtering, and processing wherein sensitivity to user context is important. On this basis, composability and extensibility of information agent applications should be understood to be targeted at the ability of a user to effectively create preferences (new ECA instantiations) rather than being directed at composing or extending the underlying system or application domain.

It is not a goal of information agent application composability and extensibility to create a new application, component, or system model (although this is possible and should be considered within the scope of the present invention). Rather, the goal is to enable dynamic extensions to the layer or component of a system that allows a user to specify preference logic through an ECA model (e.g., decision logic component 330). Specifically, it is a goal to allow new conditions and actions (the CA part of ECA) to be made available to end-users subsequent to the time when a given application was installed. Furthermore, it should also be appreciated that events (the E part of ECA) can also be dynamically extended in a similar manner.

According to one aspect of the subject invention, information agent applications do not have their own user interface to define preferences, but instead utilize either an operating system interface or an application specific user interface for creating preferences. In this context, information agent application composability and extensibility are designed to add new conditions and actions in such a manner that the existing user interfaces can thereafter allow users to create new preferences with the new conditions and actions. In this regard, IA applications can support reflection on such new conditions and actions such that the signature of such new functionality can be appropriately displayed along with an extension-provided description, to provide end-users context as to how and when to appropriately use new conditions and actions.

Multiplicity exists within various contexts and at various times for information agent applications. In particular, while IA applications could be self-sufficient and free-standing, many IA applications will actually interact with and leverage capabilities provided by other IA applications. Specifically, the condition and action functions defined by one application can also be used by other applications. IA agents can also interact with another in several other ways. For example, a preference evaluation in one IA application can trigger an action that creates an event that is submitted to another IA application.

The distinction between composibility and extensibility is important for understanding how collections of information agent applications interact and evolve. Composability is the concept that is used when a new information agent application is created that builds upon capabilities that exist and that are provided by other information agent applications at the time when the application is initially created. Extensibility refers to the concept and process whereby an already existing information agent application is extended with new capabilities that were produced after the application was created or installed. Furthermore, since a common set of mechanisms are used to support both composability and extensibility, it is important to understand the subtle differences in how such common mechanisims are used to achieve the somewhat different purposes of composability and extensibility. The concept of IA application composability is also applicable to the process by which a single IA application is constructed from a set of individual pieces. This aspect of composability addresses the software engineering goal of developing an IA application in a modular fashion. The concept of extensibility that is being introduced into the IA application system is consistent with the traditional concept of extensibility. That is to say, new capabilities are added subsequent to the original definition of an IA application, which enhances the capabilities of the application.

To a large extent, the measure of an IA application is determined by the capabilities that are presented to users. Therefore, the degree to which an IA application is extensible can be determined by the extent to which new conditions and actions are made available to users defining new preferences within the context of an existing application. IA application extensibility is primarily aimed at enabling new conditions and actions to be added to an application subsequent to the time at which the application is installed, without further intervention by the author(s) of the original application. To understand how this is done, it is important to emphasize the evolutionary chain by which the definition of an action or condition function eventually becomes accessible to end-users of an information agent application.

Figure 33:
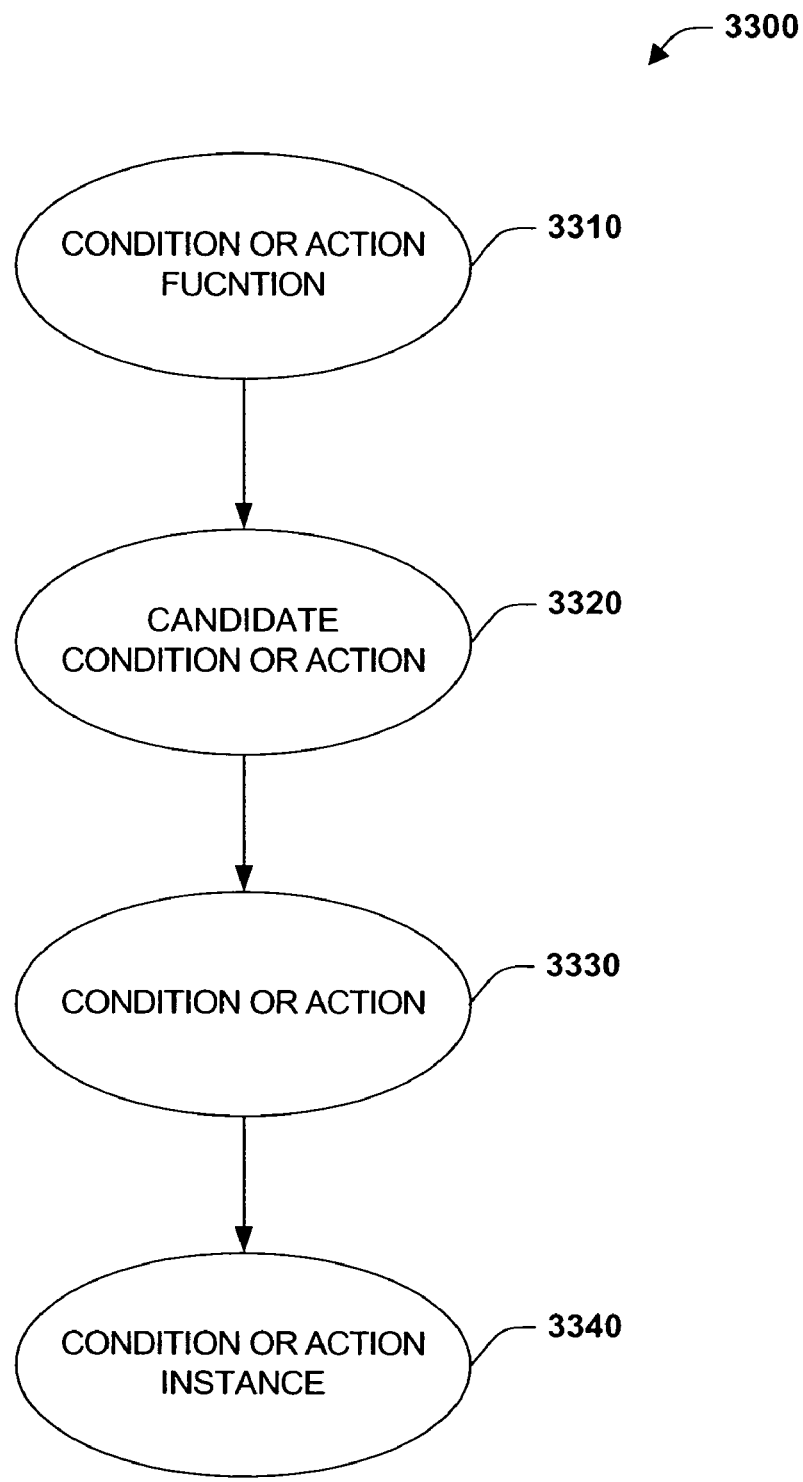
FIG. 33 is an illustration of an action/condition evolutionary chain in accordance with an aspect of the present invention.

Turning to FIG. 33, a condition/action evolutionary chain 3300 is depicted in accordance with an aspect of the present invention. Conditions and actions begin as condition or action functions at 3310. This function designation can be used when referring to the formal signature of the definition of a SQL callable function/stored procedure, for example. Between the time when a new condition or action function is defined and when the function is bound into an existing application by a declaration of a corresponding condition or action, the function is consider to be a candidate function. The developer of a candidate function specifies the bindings that will allow a targeted application-to-be-extended to create a condition or action from that function referred to as candidate conditions or actions at 3320. At this stage, conditions or actions are candidates for use by the existing application-to-be-extended such that the application can use the conditions or actions but is not required to accept them. Acceptance logic in the application to be extended determines whether such binding will be accepted or not, for example based on who has signed the proposed extension/binding. Once an application binds of its preference classes to a condition or logic function candidate conditions or actions simply become conditions or actions at 3330. Finally, when an end-user utilizes a condition or action within the context of a newly defined preference, that action or condition is said to be instantiated as is depicted in the chain at 3340.

Figure 34:
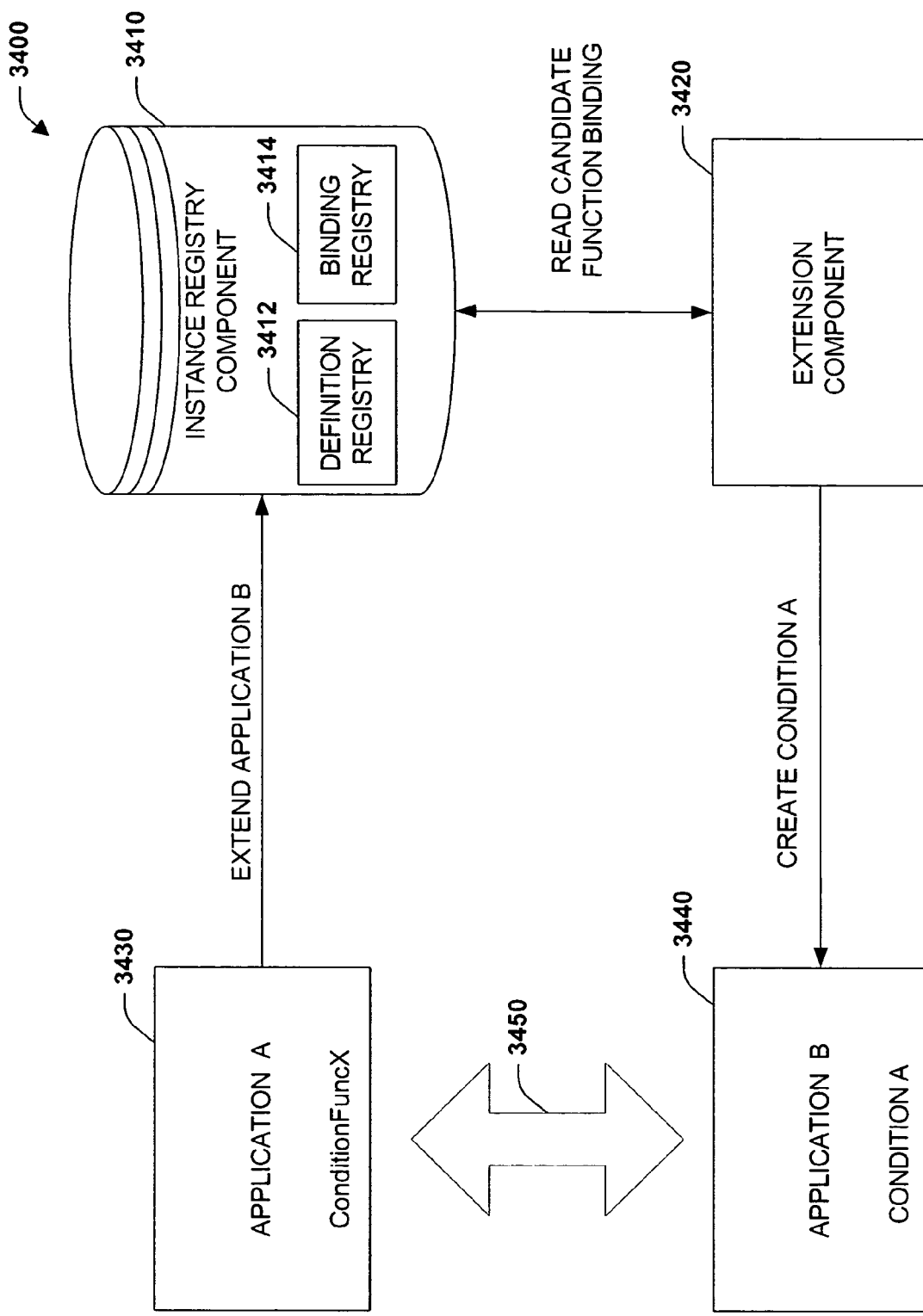
FIG. 34 is block diagram of a system for application interaction in accordance with an aspect of the present invention.

FIG. 34 illustrates a system 3400 for application interaction in accordance with an aspect of the present invention. System 3400 comprises an instance registry component 3410, definition registry 3412, binding registry 3414, application A 3420, application B 3430, binding 3425, and extension component 3440. In one implementation of extensibility, the unit of deployment is an application or an extension. Instances are extended by adding applications or application data files (ADFs). ADFs can be created by developers for use when a single application is being deployed. An ADF generally define central logic of the application and can include schemas for, inter alia, events, conditions, and actions such as notifications. Applications can be extended by adding extensions or extension data files (EDFs). EDFs can be created by anyone and are used any time after an instance and application have been created (including with initial installation of an application).

For applications to share functionality they need to be aware of each other. According to an aspect of the subject invention, this can be accomplished by utilizing an instance registry 3410 that consists of a definition registry 3412 and a binding registry 3414 to store information about functions and how functions are bound to applications. Instance registry 3410 provides a shared location for applications to store data. Instance registry 3410 includes a definition registry 3412 and binding registry 3414.

Definition registry 3412 stores information relating to application functions. In accordance with an aspect of the present invention, application functions used by applications (e.g., IA applications) can be registered or stored in the definition registry 3412. Registering functions in the definition registry 3412 causes the functions to be public to all applications running on a system. Accordingly, functions used by applications are either entirely private meaning that they are not registered in the definition registry or public meaning they are registered in the definition registry and accessible to all other applications. It should be noted that this is just one manner of implementing a definition registry. Another implementation mechanism could be to store an indicator that signals whether a function is public or private. Some exemplary information that can be incorporated into the definition registry includes the following:

| Column | Description |
|---|---|
| SourceApplication | The GUID for the application implementing the function |
| FunctionID | A GUID for the function being registered |
| FynctionType | Can be ConditionFunction, ActionFunction or AccessorFunction |
| FunctionVersion | The Function version is composed of four integer fields separated by periods. <Major>.<Minor>.<Build>.<Revision> |
| FunctionDescription | Textual description of the services performed by the Function that can be used as a help text by the consuming application. The description should not reference the Function name as it will probably be exposed to the user as a Condition, Action or Accessor. |
| ParameterName(s) | The formal name of the parameters |
| ParameterDataType | The parameter data type |
| ParameterDescription | Textual description of the parameter and the role it plays with the Function. The description should not reference the Function name as it will probably be exposed to the user as a Condition, Action or Accessor. |
| Optional | Whether the parameter is optional |

Binding registry 3414 can store all bindings, conditions, actions, and accessors to functions from a plurality of applications. This can be true regardless of whether those functions derive from an initial definition or later extension to the application. Furthermore, it should be noted that according to an aspect of the present invention a public function is not usable without binding metadata. Binding metadata is information that specifies how a public function is bound to an applications data event data. Registering a public function in the binding registry 3414 binds a function to an application. This is a one-to-many-relationship, wherein one function can be bound to many different applications.

Bindings registered in binding registry 3414 can have several statuses. For example, a binding could be a candidate binding. Candidate bindings are created by a definer of a function and are being made available to other applications. A binding could also have the status of a bound function indicating that the bindings are specific to a given application that represents how that specific application binds to a given condition or action function. Further yet, a binding could have the status of "not accepted". These are candidate functions that were targeted at a specific application but were not accepted by the targeted application's acceptance logic. Acceptance logic can be declared in an ADF and can include components for, among other things, insuring that an EDF source is authentic (e.g. using digital signature), authorized (e.g., from a list of trusted sources), and certified (EDF has been signed by a trusted source). Further information that can be housed in binding registry 3414 includes but is not limited to:

| Column | Description |
| --- | --- |
| ExtensionID | A GUID for this particular binding |
| FunctionID | The GUID representing the Function being bound to. |
| TargetApplication | The GUID representing the application that is being extended. This field is Null for public candidate functions not targeted at a specific application. |
| TargetApplicationVersion | The Function version is composed of four integer fields separated by periods. <Major>.<Minor>.<Build>.<Revision> |
| SourceApplication | The GUID representing the application that is offering a candidate function binding. |
| SourceApplicationVersion | The Function version is composed of four integer fields separated by periods. <Major>.<Minor>.<Build>.<Revision> |
| Binding Status | Indicates: {Candidate, Bound, or NotAccepted} Binding |
| BindingType | Can be Condition, Action or Accessor |
| BindingName | A string that represents the binding. This name will be used as the Condition, Action or Accessor name during internalization into the consuming application. |
| ParameterName(s) | Name of a parameter for the Function being bound to |
| ParameterValue(s) | Constant, FieldReference or other Function that returns a data type that corresponds to the ParameterDataType defined in the Definition Regsitry. |
| ConflictResolution | Developer assigned Int value or Function that aggregates multiple action priorities |

Extension component 3420 creates conditions and actions based on candidate functions. Extension component 3420 is can be called by an installation script at installation time to bind candidate functions to applications. If a new candidate function entry is made in the binding registry 3414 several things can happened depending on the action or lack thereof taken on the part of a target application. For example, if the target application is not installed then the entry can be ignored. If the target application is installed but configured not to accept extensions then again the entry can be ignored. However if the target application is installed and accepts the candidate function then, a new condition, action, or accessor binding is created for the application and bound to the applications utilizing extension component 3420. Accordingly, in system 3400 application A 3430 contains a local function "ConditionFuncx" which it would like to make available to application B 3440. The function can be made available to application B 3440 by adding an extension data file (EDF). Thereafter the function is stored in instance registry 3410 in a manner that makes it available to application B 3440. For instance, ConditionFuncX can be registered in definition registry 3412 and a candidate function can be stored in binding registry 3414. Extension component 3420 can then read the candidate function from binding registry 3414 can create Condition A by binding it to application B 3440. Accordingly, a binding 3450 is created binding Condition A to Application A's conditionFuncX.

Once bindings or dependencies have been established it should be noted that they can be broken in numerous ways. For instance, a function implemented by an application may become unavailable (i.e., broken dependency) if the application is uninstalled. Another example of a way dependencies can be broken would be if a new application is installed with a new condition, action, or accessor, which is bound to a function that is no longer available. Furthermore dependencies can be broken if an application is reconfigured to no longer accept all or particular extensions. Thus, existing preferences might have dependencies on conditions actions, or accessors that are no longer available. Broken dependencies can be compensated for in numerous ways. According to an aspect of the subject invention, a unavailable state can be defined. For instance, before an application is allowed, if at all, to break dependences all other applications can be notified so that they can place dependant preferences in a "NotAvailable" state. Thereafter, whenever an application is installed the system or application can check to see if dependencies have been reestablished such that the unavailable state can be changed to available and the preferences can be utilized.

Preferences can be created between information agent applications. Preference instantiation represents the method by which interaction between IA applications can be achieved. According to an aspect of the present invention, at least two mechanisms can be provided that enable users to create preferences that access capabilities in more than one IA application. One mechanism is EDF bindings. Application developers can create EDF bindings to enable preference classes in one application to reference conditions and actions defined in other applications. This enables end-users to instantiate preferences that reference conditions and actions from multiple applications. Event submission actions can also take advantage of capabilities provided by a multitude of applications. An event submission action function can be implicitly created when an event class is defined by an application. Thereafter, these event submission action functions can be bound to actions via EDFs, used by other applications, thereby enriching the potential capabilities of newly created user preferences.

Additional mechanisms or components may be needed for purposes of enabling applications to directly instantiate preferences as specified by an application developer, as opposed to an end-user. One mechanism or component could correspond to preference templates. Preference templates can be defined within the context of a preference class and include a set of conditions and classes. The syntax of a preference class can be extended with a new tag for purposes of defining the templates. Subsequently, this tag can be used by EDFs for purposes of extending applications with new templates. Preference instantiation actions can also be employed. When a new preference template is created, an action function can be implicitly created to instantiate a preference from a specified template. The parameters to that action function represent constants that are needed to instantiate a preference from the template's fixed set of condition actions.

Developers are also able to instantiate preferences both within and across applications without explicit intervention by an end-user. Several mechanisms can be employed to accomplish this functionality. For example, a new ADF tag could be added to a preference class to allow preferences to be instantiated within an ADF directly at application definition time. Alternatively, a new EDF tag could be added to the preference class. This would allow preferences to be instantiated both during and after an application is defined. In addition, preference instantiation could be accomplished through scripts (e.g., SQL scripts) outside the schema definition, for example through the use of system APIs.

With the aforementioned capabilities, application (e.g., IA application) interaction can occur as one application sends events, evaluates conditions/actions, or instantiates preferences in other applications. Such interactions can be accomplished directly by developers or though end-user defined preferences.

To further understanding of various aspects of application composability and extensibility several examples are provided hereinafter. ShellApp is an operating system information agent application. Office is also an information agent application.

Example 1

Composition

Composition can be defined when a new application is authored to bind to an existing known function. In this example, ShellApp is installed first and Office is installed thereafter. When Office was authored the developer knew about and designed the Office application to leverage FuncX condition function of the ShellApp. When Office is installed it registers a binding in the binding registry that binds FuncX condition function (old function) to a condition in the Office application (new application). The Office application installation script then calls the extension component that reads the binding registry. The extension component can then detect that there is a condition defined already ("built in") and therefore skips to the next step where it re-evaluates the instance wide NotAvailable state. The Office application is said to be extended by ShellApp.

Example 2

Extension

Extension can be defined as when an old application is extended with a new function. In this example, like the above, ShellApp is installed and then Office is installed. When Office was authored the developer created an action function FuncY that can be used in the ShellApp. When Office is installed it registers an action function in the definition registry and a binding in the binding registry that binds the Office application FuncY (new function) to an action in the ShellApp (old application). The Office application script calls the extension component to detect that there is a new binding that has no corresponding action in the ShellApp and therefore internalized the action by creating it in the ShellApp. It then re-evaluates the instance wide NotAvailable state. ShellApp is said to have been extended with the Office application.

Example 3

Patch Extension

Patching can occur when both a function and application have already been installed on a system. Accordingly, assume that both ShellApp and Office have been installed on a system, and then an office service pack is being installed. After the release of the Office application developers realize that there is an action function in Office that ShellApp could use. Service pack, inter alia, contains an EDF that defines a binding that binds a new Office application condition to the condition function in the Office application. When the service pack is in installed it can register the binding in the binding registry and call the extension component. The extension component can detect that there are new bindings that have no corresponding action or condition in the target applications and thereafter create them in the ShellApp and Office application. Then extension component could re-evaluate the instance wide Notavailable state. ShellApp can then said to have been extended by the Office application, while Office can be said to have been extended by ShellApp.

Example 4

Uninstalling

Assume that a previously installed Office application has been uninstalled, and during the process it removes all its registrations from the definition and binding registry. ShellApp could now have actions that depend on functions implemented by Office that are now removed. Accordingly, an unavailable or NotAvailable state can be declared for all actions with broken dependencies. An end-user could then get receive a cue about missing dependencies. An end-user could then chose to keep the unavailable preferences or actions (e.g., should Office ever come back) or simply delete them.

Example 4

Reinstallation

Assume that the previously uninstalled application of Office is now reinstalled, and during installation it re-registers its action function and binding to ShellApp. The Office installation scrip then can call the extension component to create an action in the ShellApp. The extension component could, however, simple detected if the condition, action or accessor already exists in the target application (e.g., application was previously installed) and skip the creation step. The Notavailable state of functions can then be reevaluated to ensure that all functions that can be active are placed in an enabled state.

Personalized Folders

The abovementioned and described system facilitates the construction of information applications, which automate the handling of decisions and actions for a given set of events. Accordingly, applications can be built which enable end-users to personalize responses to events including but not limited to desktop notifications and email arrivals. One such application is a personalized folders application hereinafter described. The subject invention enables such functionality as personalized event handling by utilizing, among other things, a schematized data store and schematized logic.

Figure 35:
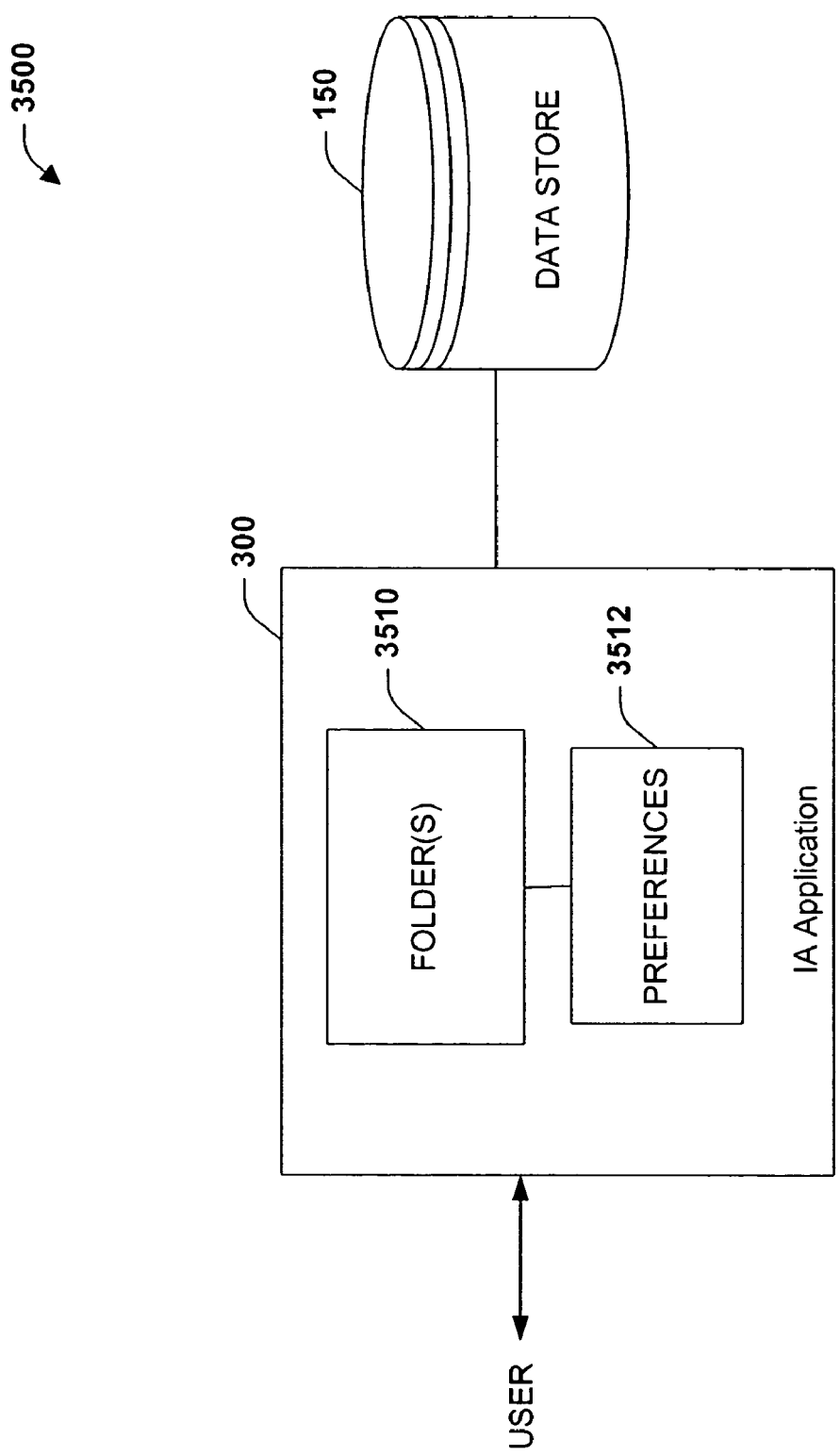
FIG. 35 is a block diagram of a personalized system in accordance with an aspect of the present invention.

Turning to FIG. 35, personalized system 3500 is depicted in accordance with an aspect of the present invention. System 35000 comprises data store 3550 and an information agent application 300 containing personalized folder(s) 3510 and preferences 3512. Personalized folder(s) 3510 refer to folders or data containers that can include or exclude items based upon conditional expressions that can be intuitively specified by end-users. In one instance folder(s) 3510 can be arranged in a hierarchical manner and implemented by a component of an operating system. However, it should be noted the use of the term folder or data container is not meant to in a limiting fashion. Folder(s) 3510 can extend to any collection of links, pointers, or data defined by a set of relationships. Information agent preferences 3512 represent the ability for a non-technical end-user to combine schematized logic and schematized data (e.g., via data store 150) to provide rich personalized applications and environments. In contrast, conventional preferences merely utilize simple conditions with intuitive names to which string constants are provided. Preferences 3512 can be specified by end-users for example using logic that is familiar to them such as: On event IF conditions THEN actions or in more application specific terms: On folder event IF conditions THEN include/exclude actions. Furthermore, it should be noted that preferences 3512 can be developed by inferential analysis, such as by employing a statistical and/or Bayesian models to learn user preferences based on user actions. Inferential analysis as used herein refers to using an inference process(es) on a number of input variables, to yield an output variable(s), namely, user preferences or inputs to a preference development tool. The analysis can include, in one aspect, utilization of a statistical model and/or a Bayesian model, but is not limited thereto. In addition to conditions and actions, preferences contain triggers that initiate evaluation of the preference. According to one aspect of the subject invention, such triggers can include explicit user direction, scheduled by time, and/or automatically upon adding a document, deleting a document, and/or modifying a document in a folder. Further yet, it should be appreciated that preferences 3512 can be grouped to achieve result sets that would be too complicated to easily create via a single expression (e.g., include/exclude specific items from folders, combine the effects of multiple queries). Still further yet, it should be noted that both individual and groups preferences 3512 can be manifested as a physical entities such that a user can drag, drop, cut, and paste preferences between folders 3510. Folders 3510 can contain copies of data or simply pointers to data stored in a storage device (a/k/a virtual folders). The stored data can include but is not limited to word processing documents, spreadsheets, pictures, and music. Still further yet, personalized folders 3510 can have associated preferences 3512 that relate to items in a plurality of different domains. In order to support such functionality, predefined constants can be introduced. More specifically, predefined constants from one item domain (e.g., MyGrandparent) can be used as arguments to conditions from other domains (e.g., Photosfrom (MyGrandparent). The combination of predefined conditions and constants provides a simple, intuitive way for end-users to relate various item domains. Of course, user-defined constants can also be provided to the conditions of a personalized folder. Simple conditions can be inferred from the schema for an item domain. For example, the conditions EmailIsFrom( ) or SubjectContains( ) can be inferred from an email schema. However, a schema developer could certainly explicitly specify both a richer and more minimal set of useful conditions. Further, it should also be noted that new conditions can be added to an application 300 (extensibility) and subsequently utilized by end-users defining new preferences. As new schemas are installed, new capabilities for personalizing folders become possible.

Folders 3510 can be classified as active or derived according to an aspect of the subject invention. Active folders take action on behalf of a user when something interesting happens in a folder (e.g., events—file document added, deleted, or modified). For example, pictures can be downloaded from a digital camera to an active folder called MyPictures. Simultaneously or within a short time thereafter, the active folder could consult with a calendar application to determine what the user was doing when the pictures were taken and then create a new folder with an appropriate title (e.g. fishing trip) and move the pictures to the new folder. In an email context, an email application could determine when a message contains an expense report and if it is less than a certain value it could move the report to an approved expense report folder. In yet another exemplary use of active folders, music could be downloaded to an active folder, which then determines the artistic genre (e.g., Jazz, Classical, Rap, Rock . . . ) and moves the music to an appropriate folder.

Derived folders use preferences to decide whether to include or exclude particular files from a folder. In addition it should be noted that derived folders can be virtual folders which provide mappings or pointers to files. Virtual folders act as real folders for housing data yet the folder does not have an actual physical existence. One example of the use of a derived folder includes a situation where user defines a folder to include all Jazz music listened to by the user at least three times in the last two weeks. Derived folders can also be defined by preferences to include all files of a particular type but with certain exceptions. For instance, a folder can be defined to include all tracks by Jazz musician Miles Davis, but exclude particular song tracks (e.g., Human Nature and New Rumba). Furthermore, it should be noted that preferences could be defined such that a user could drag and drop files into folders and the folder would ascertain whether the dropped file is of the type defined. If the file is of an allowed type it can be added to the folder, if it is not the file could be rejected (e.g., not copied to the folder) or alternatively the user could be prompted as to whether an exception should be created for the particular file.

Furthermore it should be noted that certain folders can exhibit characteristics of both active folders and derived folders. Accordingly, some folders can have preferences associated with them that specify which items are contained in a folder as well as preferences that specify what actions to take when certain events occur on those items.

Applications can be processed using the execution engine of system 100. As previously disclosed, preferences can be stored as data and executed in the form of a data query. Data store 150 can store data in one or more tables, which can then be queried utilizing preference information. Conventionally, executing queries against a database of tables would be computationally infeasible, as the queries would have to be continuously executed in relatively short intervals to ensure that data in the folders is kept current. This would be especially impractical on lightweight systems like personal computers where the processor could not process efficiently execute a multitude of programs while constantly running queries to update folder data. The present invention, however, overcomes this problem by executing queries on the occurrence of events such as when data is added, deleted, or modified. Accordingly, a processor is not burdened with continuously executing queries and the folder data is kept current.

Workflow-Like Activities Based on Active Folders

Personalization (e.g., ECA rules) is distinct from workflows or task schedules. Workflows or task schedules are a multi-step piece of work that can be represented via items in folders. Personalization is the concept of enabling an end-user to specify preferences that are applied at system/application intercept points for purposes of automating the handling of end-user meaningful events (e.g., email arrival) or system/application behavior (e.g., controlling desktop interrupts based on user context). Personalization is concerned with enabling an end-user to express a preference whose logic is localized to a given intercept point (e.g., event, point in a flow . . . ). Any cascaded evaluation of multiple preferences due to actions of a single preference are incidental, not planned. Accordingly, personalization is not a diminutive form of workflow, rather workflow and personalization are different things altogether. An incidental cascading of preferences for handling an event is different than a planned chaining of tasks/rules in a workflow. Furthermore, personalization can be applied to email, phone calls, desktop interrupts, and many other types of end-user events independently of whether a workflow or task schedule is involved or not. A personalized workflow is based on the premise that personalization is an independent, but complementary concept to workflows.

Personalization can be applied to workflows or task schedules, whenever end-user decisions are relevant. There are various opportunities for personalization of workflows in personalization of a task, personalization of workflow initiation, personalization of a workflow task, and personalization of workflow scheduling. An example of personalizing a task could be where a user specifies decision logic to automate the handling of certain task such as automatically approving orders of a certain dollar amount by a person's direct report. Workflow initiation deals with deciding whether to open/initiate a workflow based upon an event of interest (e.g., phone call, email arrival . . . ). A planned personalization could potentially be turned into a workflow task by wrapping it with appropriate capabilities to interact with a schedule to be tracked and so forth. In other words, a personalization could be used as a planned task within a workflow wherein user preferences would completely determine the resolution of the task. Finally, personalization can be involved in workflow scheduling. When choices exist regarding the next steps in a workflow, personalization can be used to allow a user to specify preferences for such decisions.

A practical example of a personalized workflow including many of the above categories could be the processing of an expense report. In this example an email arrives in an inbox, the type of email is detected (e.g., subject line, flagged as expense report . . . ), the email data is scanned, and if an invoice amount is less then a certain dollar amount the report is moved to an approved folder. Thereafter, an email can be sent back to the sender indicating the reports approved status. Subsequently, a journal can be created for monthly review by a user and the total amount approved can be tallied.

While all of the above categories of personalization of a workflow enhance the value of the workflow, the applicability of such benefits is not exclusive to workflow. Those benefits can be applied to many other domains including but not limited to communications handling, routing, or personalization, wherein such domains may not be participating in a workflow.

Chronicle Folders

Chronicles according to an aspect of the subject invention represent history and context information relevant to a user or users of a system. Notification systems often include the concept of historical data that can be used as part of evaluating whether or not to take an action based on a previous action. For instance, a user may wish to set up a preference which says "notify me when shares of MSFT hit a new high for the day." In this case the system must be able to maintain the highest price point of MSFT shares during the day and update this information when a new high is reached.

According to an aspect of the subject invention chronicles are stored in a data store and freely accessible to users via a user interface (e.g., supplied by the operating system). Thus, an end-user has control over this historical data; she can back it up the way other files are backed up, she can synchronize it with other computers in her home or office, she can share it through normal file sharing mechanisms, and can set access permissions and other security settings to control who exactly can access this context information. For instance, a user can allow everyone in their workgroup to see the historical information about MSFT share prices, but may wish to restrict context information such as whether they are at their desk or in a meeting.

Furthermore, the system of the present invention can expose certain common behaviors as "built-in" chronicle creation/maintenance logic including the ability to create an "audit" chronicle, where every action taken on behalf of a user is saved in a chronicle; a "count" chronicle, where the system keeps count of how many of a particular kind of event or action it has seen; and a "high/low watermark" chronicle that can keep track of the highest and lowest values seen historically over a certain time period.

Further, the present system can make it possible for these chronicles to be updated by applications, which know nothing about information agent applications. Many notification platforms make it possible for context information to be updated during normal processing of user rules (herein called also referred to as preferences), but because the present invention utilizes schematized data stored in a data store and as part of rule or preference processing, the system can use context information created by any application. For instance, a user can download and run an application written by NASDAQ which streams real-time stock quotes to a users computer. The NASDAQ application might create a file for each of the symbols the user is interested in and save relevant information inside these files. Because the information agent application of the present invention, according to one aspect, is built to utilized this type of externalized context information, the information agent system can make use of these files as chronicles during user rule or preference processing.

Chronicles can also be used in conjunction with active folders. Because the personalized folder system includes the ability to watch particular folders, folder items that are created, modified, or moved into such folders can be treated as context updates to a particular chronicle or set of chronicles. In this way, it is possible for a user to maintain chronicles without any programmer-written code running on their behalf. Rather, end-users can simply use the existing file manipulation mechanisms of the operating system to keep their context information up to date.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

In view of the exemplary systems described supra, a methodology that may be implemented in accordance with the present invention will be better appreciated with reference to the flow charts of FIGS. 36-41. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Figure 36:
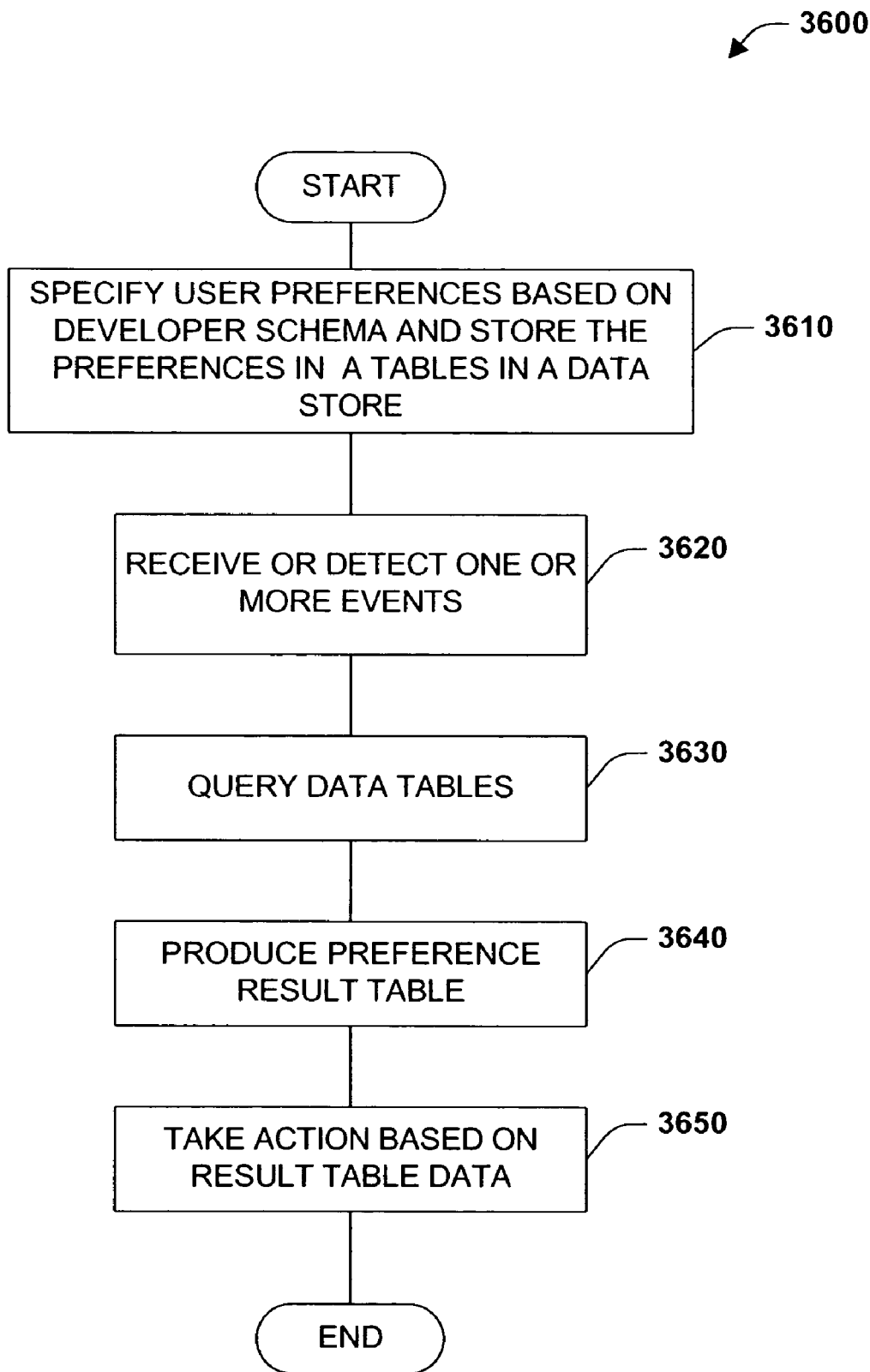
FIG. 36 is a flow chart diagram of a methodology for employing preferences is in accordance with an aspect of the subject invention.

Turning to FIG. 36, a methodology 3600 for employing preferences is illustrated in accordance with an aspect of the subject invention. At 3610, preferences are specified by an end-user based on a developer schema (e.g., XML schema) and stored in tables in a data store, for example. Then, at 3620, one or more events can be received or detected. Preferences can then be executed or evaluated utilizing query language (e.g., SQL) to query the data tables, at 3630. At 3640, a results table can be produced or populated with valid conditionally valid preferences. Finally, at 3650, respective actions can be executed based on the results of the result table.

Figure 37:
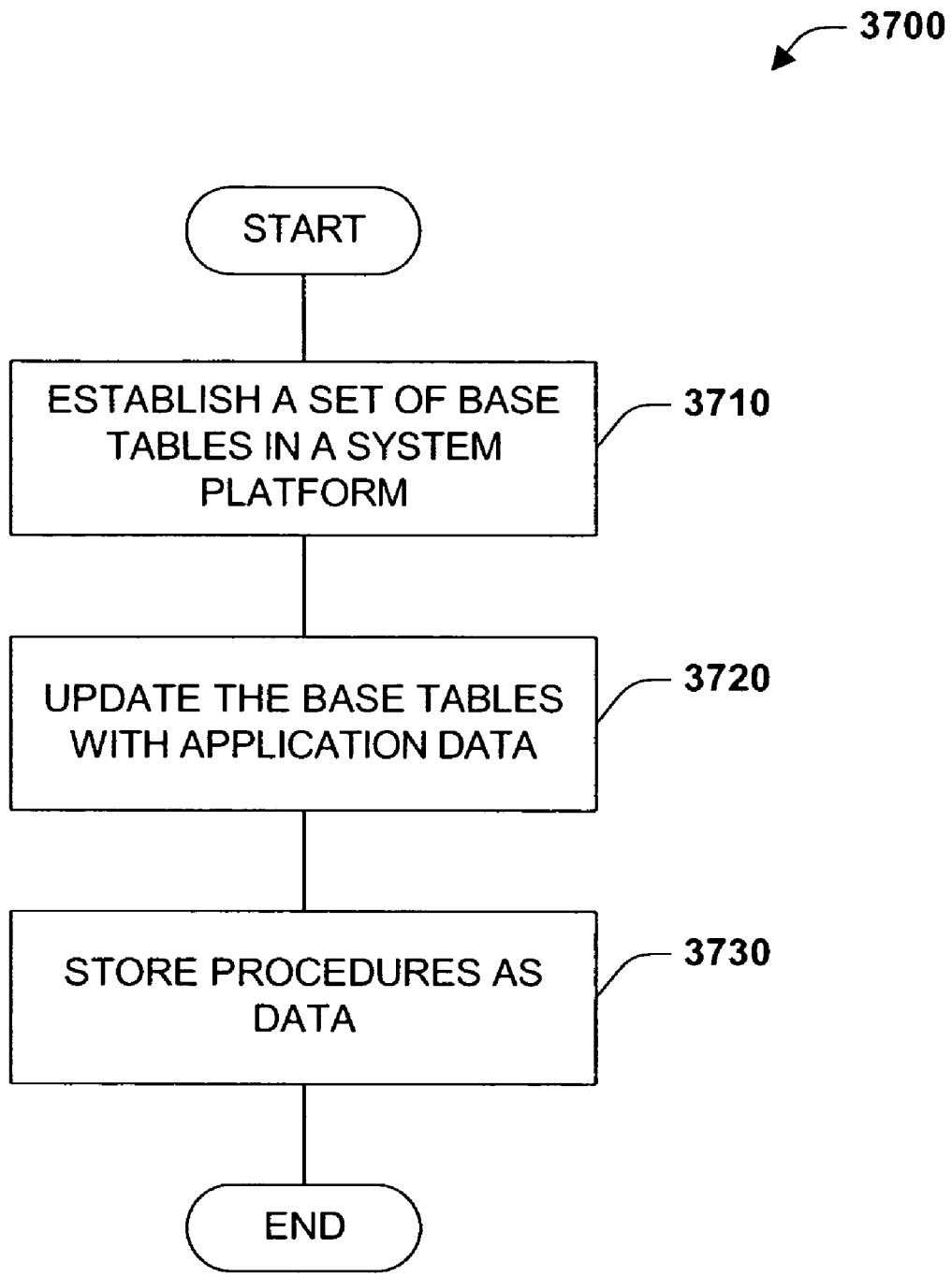
FIG. 37 is a flow chart diagram of a methodology for installing an application in accordance with an aspect of the subject invention.

Turning to FIG. 37, a methodology 3700 for installing applications is illustrated in accordance with an aspect of the present invention. At 3710, base tables are set-up in the data store associated with the system or platform that will be executing the installed application (e.g., information agent system data store 150). The base tables are subsequently updated with application data at 3720, rather than creating new tables and databases strictly for the installed application. At 3730, application procedures are stored as data, for instance, in a based-table designated for application procedures. To execute, an application procedure strings of text are removed from a database and executed according to one aspect in real-time.

Figure 38:
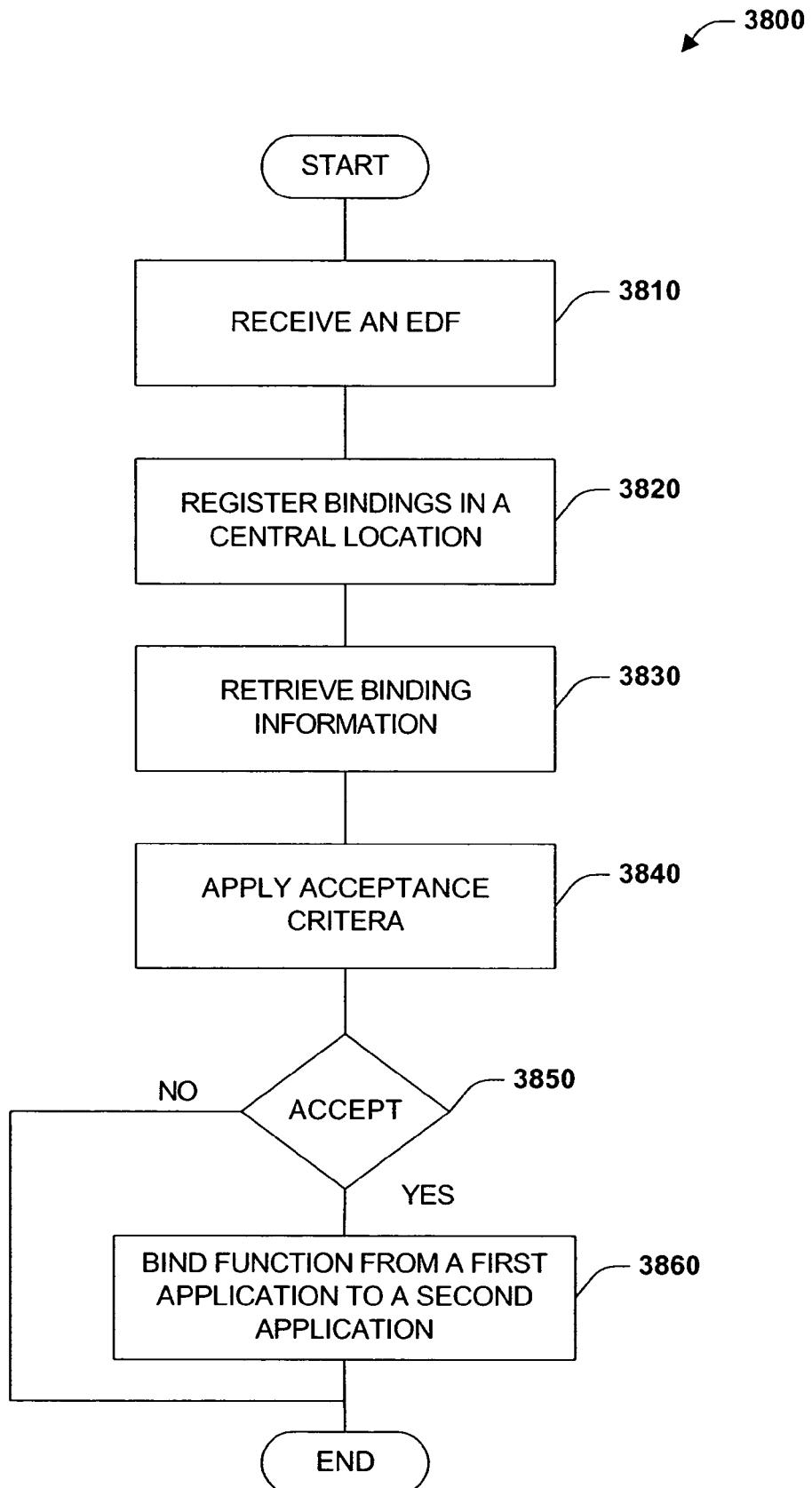
FIG. 38 is a flow chart diagram of a methodology for extending applications according to an aspect of the present invention.

FIG. 38 depicts a methodology 3800 for extending applications according to an aspect of the present invention. At 3810, an EDF is received from a developer. EDFs contain information relating enabling a preference classes in one application to reference conditions, actions, and events defined in other applications. Thereafter, at 3820 the function bindings are registered in a central location such as an instance registry. At 3830, binding information is retrieved or received by an extension component. Subsequently, acceptance logic can be applied to the binding at 3840. When an EDF is installed the bindings are made available, however, they are not automatically applied to an application in accordance with one aspect of the subject invention. Rather, acceptance logic is applied to determine if the EDF is to be accepted. Acceptance logic inquire into, inter alia, a bindings authenticity, authorization and/or certification by a trusted source in order to determine whether it will be accepted. At 3850, a determination is made by an application as to whether it will accept the binding. If "no," then the process will simply terminate without a binding. If "yes," then at 3860, the candidate function binding is bound from a first application to a second application.

Figure 39:
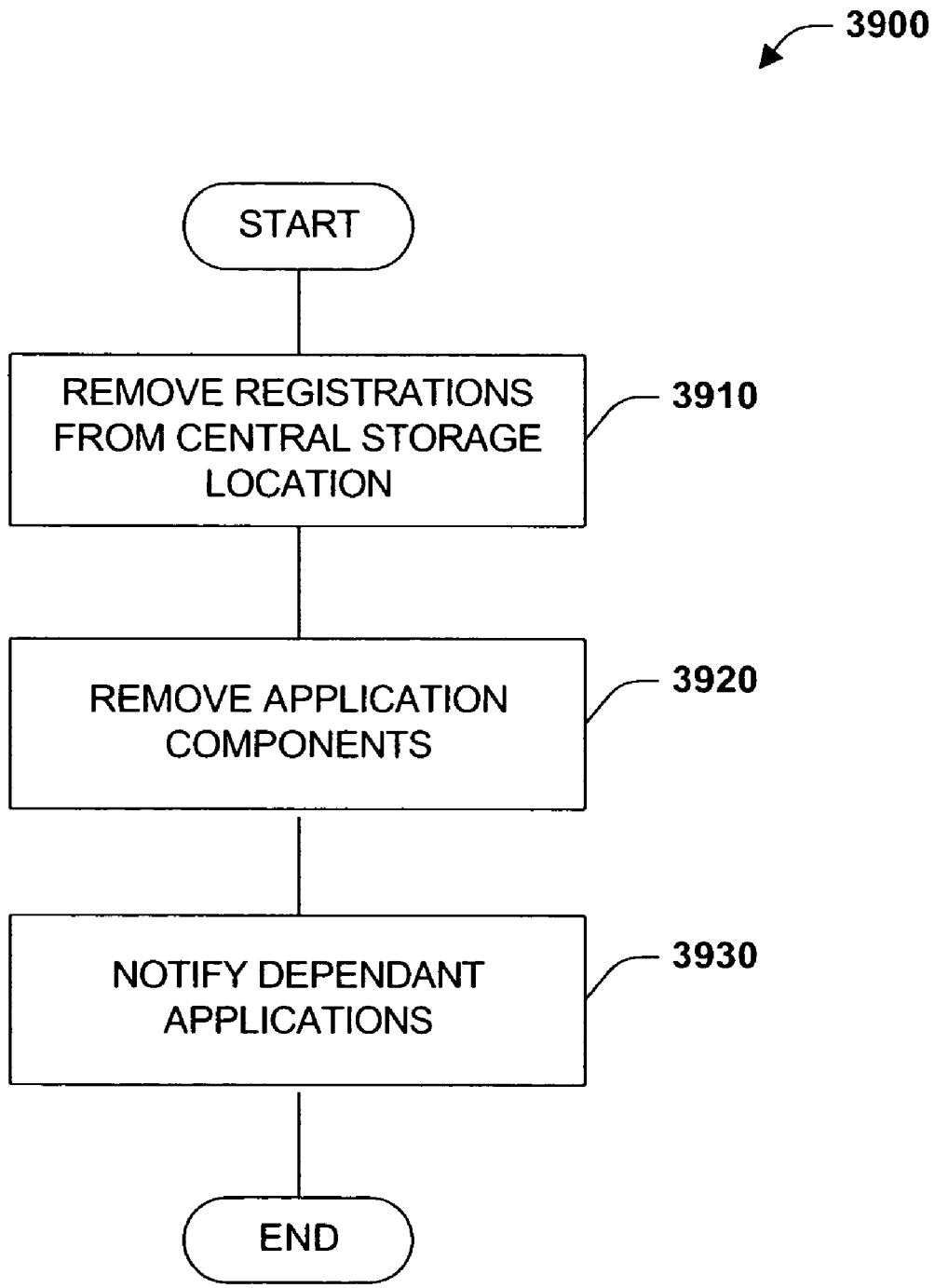
FIG. 39 is a flow chart diagram of uninstalling an application in accordance with an aspect of the present invention.

FIG. 39 is a flow chart depiction of a methodology 3900 for uninstalling applications in accordance with an aspect of the present invention. At 3910, the application being uninstalled removes all its registrations from a central store location. The central storage location could be an instance registry with definition and binding registries. Application components can then be removed, at 3920. Dependant applications can then be notified of the uninstalled application (e.g., by an extension component). Furthermore, and as noted above, the blocks of methodology 3900 can be in any order. Accordingly, another aspect of the invention includes dependant applications being notified prior to any uninstalling or removal processes.

Figure 40:
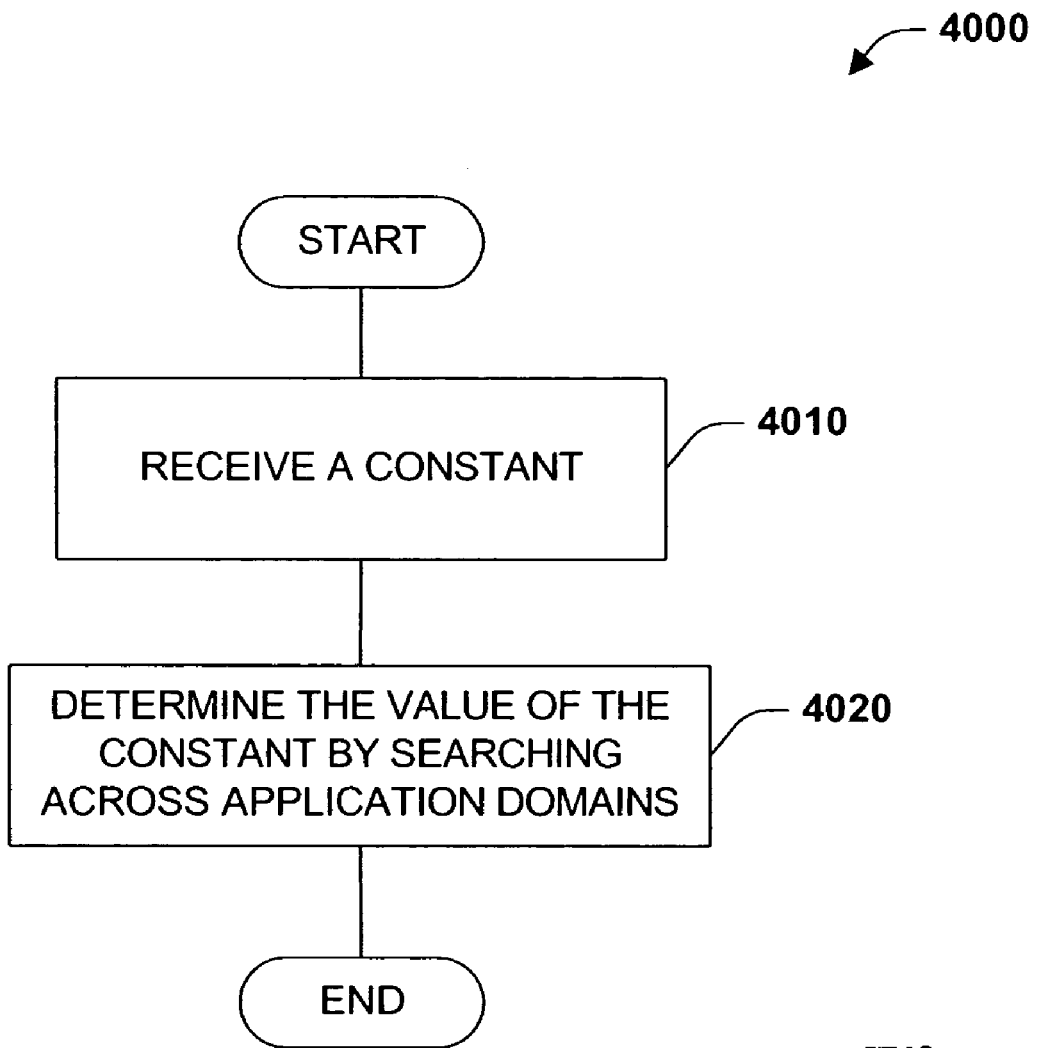
FIG. 40 is a flow chart illustration of a method of extending programmatic constants across applications in accordance with an aspect of the present invention.

FIG. 40 is a flow chart illustration of a method of extending programmatic constants across applications in accordance with an aspect of the present invention. At 4010, a constant is received. At 4020, the value of the constant is determined by searching across application domains. For example, if the constant MyManager, received then the methodology could search through an email application and determine the value of MyManager.

Figure 41:
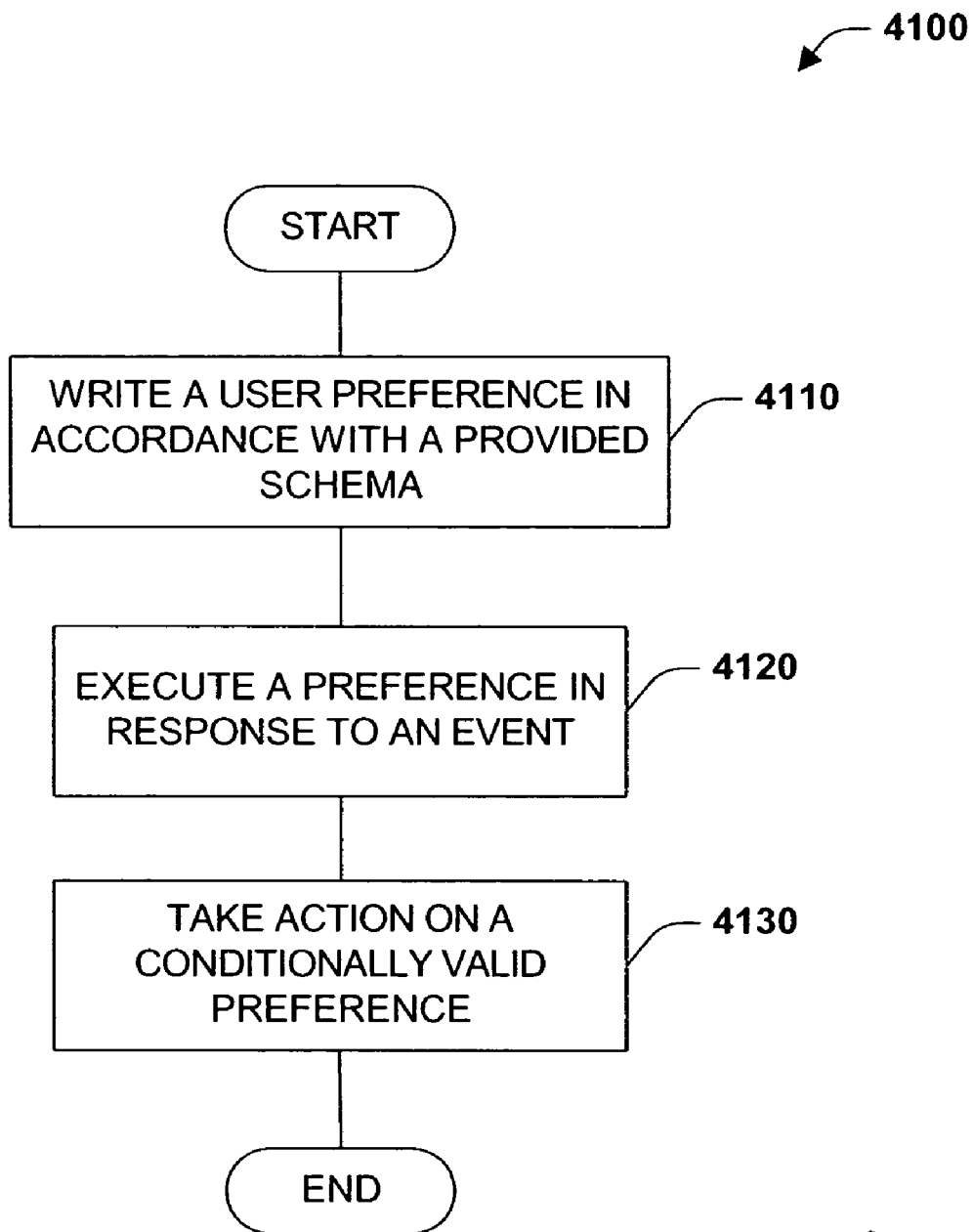
FIG. 41 is a flow chart diagram depicting a methodology for personalizing computer functionality in accordance with an aspect of the present invention.

FIG. 41 is depicts a methodology 4100 for personalizing computer functionality in accordance with an aspect of the present invention. At 4110 an end-user writes preferences in accordance with a provided schema. The preferences can be in any form but according to one aspect of the invention they comprise a plurality of IF-THEN statements separated by Boolean operators. The schema can be provided by an application developer to constrain and thereby simplify end-user programming. At 4120, the preference is executed on the occurrence of an event. An event can be anything that happens including but not limited to changes in folder data or a change in a stock price. Execution or evaluation of a preference can be done utilizing by querying data in a data store component. At 4120, an action is taken based on a conditionally valid preference.

Figure 42:
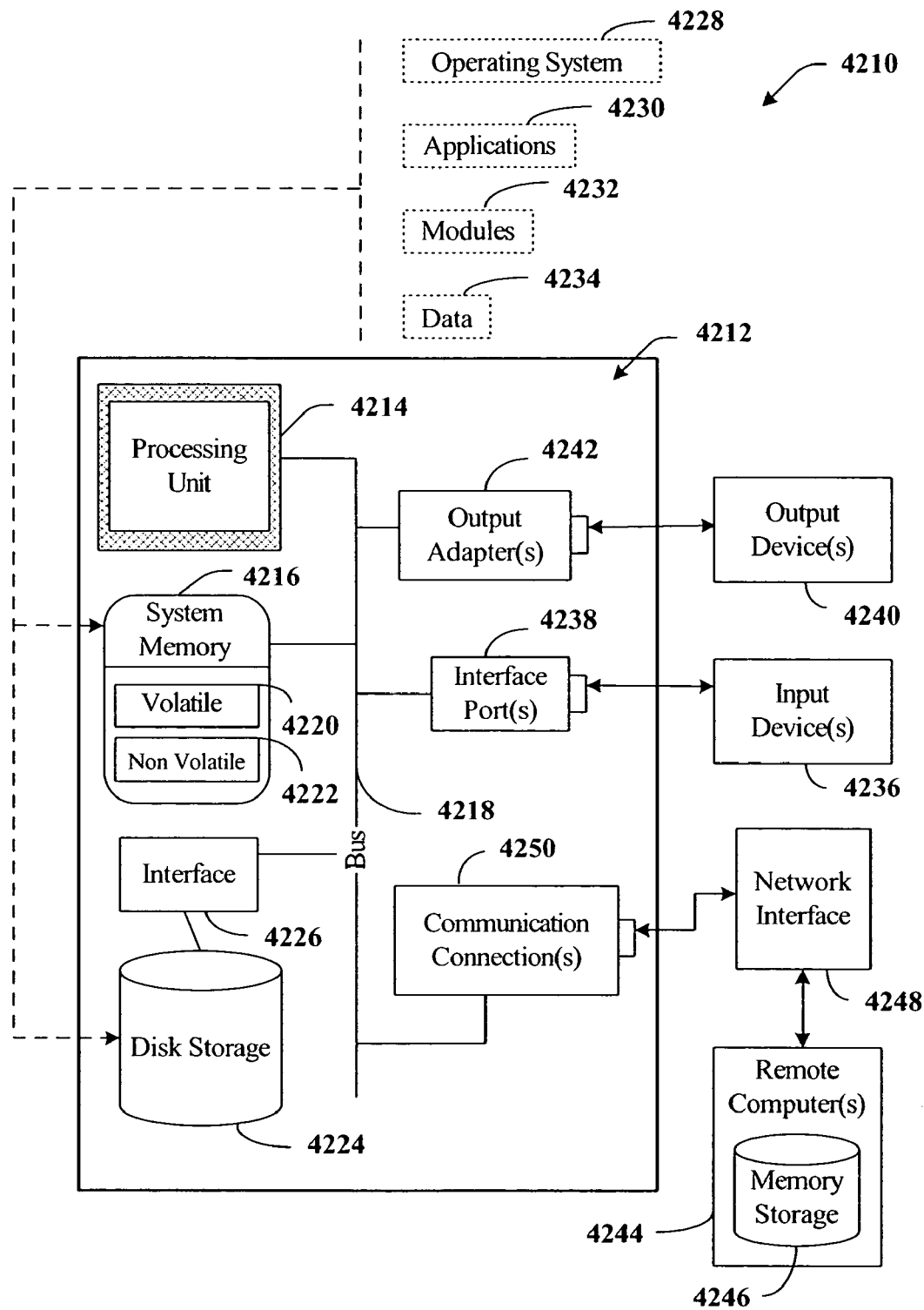
FIG. 42 is a schematic block diagram illustrating a suitable operating environment in accordance with an aspect of the present invention.
Figure 43:
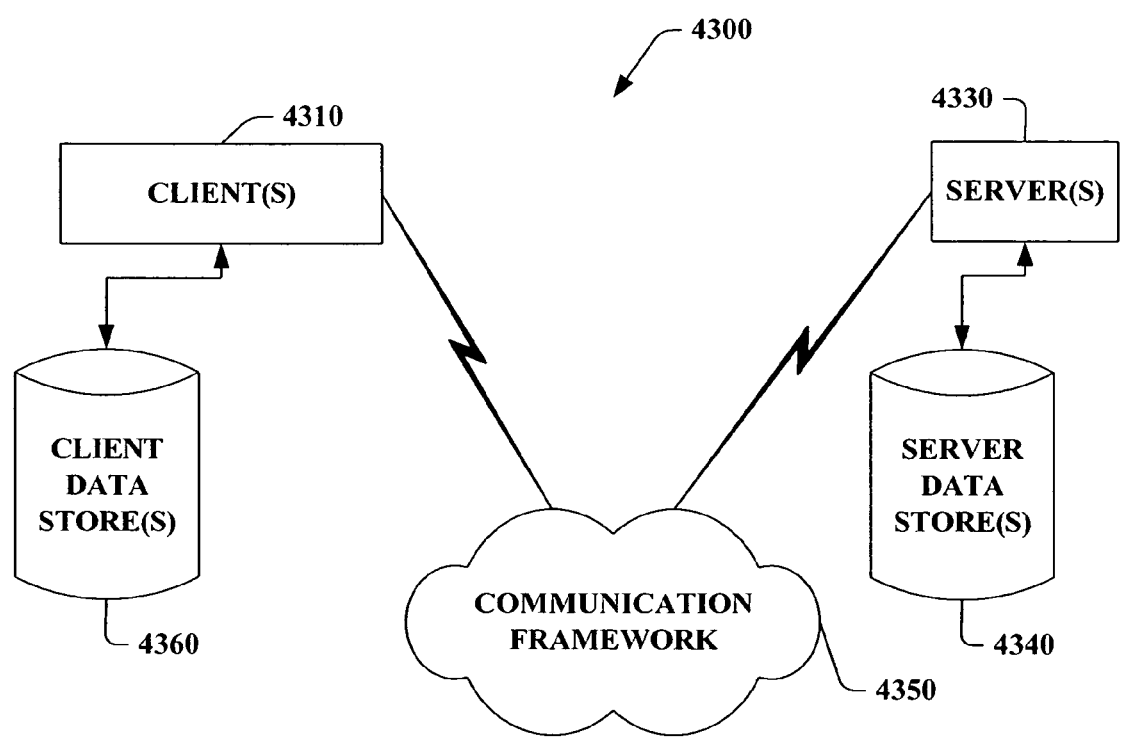
FIG. 43 is a schematic block diagram of a sample-computing environment with which the present invention can interact.

In order to provide a context for the various aspects of the invention, FIGS. 42 and 43 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practices on stand alone computers. In a distributed computing environment, program modules may be locate in both local and remote memory storage devices.

With reference to FIG. 42, an exemplary environment 4210 for implementing various aspects of the invention includes a computer 4212. The computer 4212 includes a processing unit 4214, a system memory 4216, and a system bus 4218. The system bus 4218 couples system components including, but not limited to, the system memory 4216 to the processing unit 4214. The processing unit 4214 can be any of various available processors. Dual microprocessors and other multi-processor architectures also can be employed as the processing unit 4214.

The system bus 4218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 4216 includes volatile memory 4220 and nonvolatile memory 4222. The basic input/output system (BIOS), containing the basic routines to transfer information between elements within the computer 4212, such as during start-up, is stored in nonvolatile memory 4222. By way of illustration, and not limitation, nonvolatile memory 4222 can include read only memory (ROM), programmable ROM (PROM), electrically programmable ROM (EPROM), electrically erasable ROM (EEPROM), or flash memory. Volatile memory 4220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 4212 also includes removable/non-removable, volatile/non-volatile computer storage media. FIG. 42 illustrates, for example a disk storage 4224. Disk storage 4124 includes, but is not limited to, devices like a magnetic disk drive, floppy disk drive, tape drive, Jaz drive, Zip drive, LS-100 drive, flash memory card, or memory stick. In addition, disk storage 4224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 4224 to the system bus 4218, a removable or non-removable interface is typically used such as interface 4226.

It is to be appreciated that FIG. 42 describes software that acts as an intermediary between users and the basic computer resources described in suitable operating environment 4210. Such software includes an operating system 4228. Operating system 4228, which can be stored on disk storage 4224, acts to control and allocate resources of the computer system 4212. System applications 4230 take advantage of the management of resources by operating system 4228 through program modules 4232 and program data 4234 stored either in system memory 4216 or on disk storage 4224. It is to be appreciated that the present invention can be implemented with various operating systems or combinations of operating systems.

A user enters commands or information into the computer 4212 through input device(s) 4236. Input devices 4236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 4214 through the system bus 4218 via interface port(s) 4238. Interface port(s) 4238 include, for example, a serial port, a parallel port, a game port, and a universal serial bus (USB). Output device(s) 4240 use some of the same type of ports as input device(s) 4236. Thus, for example, a USB port may be used to provide input to computer 4212, and to output information from computer 4212 to an output device 4240. Output adapter 4242 is provided to illustrate that there are some output devices 4240 like monitors, speakers, and printers, among other output devices 4240, that require special adapters. The output adapters 4242 include, by way of illustration and not limitation, video and sound cards that provide a means of connection between the output device 4240 and the system bus 4218. It should be noted that other devices and/or systems of devices provide both input and output capabilities such as remote computer(s) 4244.

Computer 4212 can operate in a networked environment using logical connections to one or more remote computers, such as remote computer(s) 4244. The remote computer(s) 4244 can be a personal computer, a server, a router, a network PC, a workstation, a microprocessor based appliance, a peer device or other common network node and the like, and typically includes many or all of the elements described relative to computer 4212. For purposes of brevity, only a memory storage device 4246 is illustrated with remote computer(s) 4244. Remote computer(s) 4244 is logically connected to computer 4212 through a network interface 4248 and then physically connected via communication connection 4250. Network interface 4248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 4250 refers to the hardware/software employed to connect the network interface 4248 to the bus 4218. While communication connection 4250 is shown for illustrative clarity inside computer 4212, it can also be external to computer 4212. The hardware/software necessary for connection to the network interface 4248 includes, for exemplary purposes only, internal and external technologies such as, modems including regular telephone grade modems, cable modems and DSL modems, ISDN adapters, and Ethernet cards.

FIG. 43 is a schematic block diagram of a sample-computing environment 4300 with which the present invention can interact. The system 4300 includes one or more client(s) 4310. The client(s) 4310 can be hardware and/or software (e.g., threads, processes, computing devices). The system 4300 also includes one or more server(s) 4330. The server(s) 4330 can also be hardware and/or software (e.g., threads, processes, computing devices). The servers 4330 can house threads to perform transformations by employing the present invention, for example. One possible communication between a client 4310 and a server 4330 may be in the form of a data packet adapted to be transmitted between two or more computer processes. The system 4300 includes a communication framework 4350 that can be employed to facilitate communications between the client(s) 4310 and the server(s) 4330. The client(s) 4310 are operably connected to one or more client data store(s) 4360 that can be employed to store information local to the client(s) 4310. Similarly, the server(s) 4330 are operably connected to one or more server data store(s) 4340 that can be employed to store information local to the servers 4330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

APPENDIX

```
<EventClasses>
    <EventClass>
        <EventClassName>EMailEvents</EventClassName>
        <Schema>
            <Field>
                <FieldName>Sender</FieldName>
                <FieldType>nvachar(255)</FieldType>
```

-continued

```
                <FieldTypeMods>NOT NULL</FieldTypeMods>
            </Field>
            <Field>
                <FieldName>Receiver</FieldName>
                <FieldType>nvachar(255)</FieldType>
                <FieldTypeMods>NOT NULL</FieldTypeMods>
            </Field>
            <Field>
                <FieldName>Priority</FieldName>
                <FieldType>int</FieldType>
                <FieldTypeMods>NOT NULL</FieldTypeMods>
            </Field>
                <Field>
                <FieldName>Subject</FieldName>
                <FieldType>nvachar(255)</FieldType>
                <FieldTypeMods>NOT NULL</FieldTypeMods>
            </Field>
            <Field>
                <FieldName>MessageText</FieldName>
                <FieldType>nvachar(255)</FieldType>
                <FieldTypeMods>NOT NULL</FieldTypeMods>
            </Field>
        <Schema>
    </EventClass>
    <EventClass>
    <EventClassName>StockEvents</EventClassName>
        <Schema>
            <Field>
                <FieldName>Symbol</FieldName>
                <FieldType>nvachar(10)</FieldType>
                <FieldTypeMods>NOT NULL</FieldTypeMods>
            </Field>
            <Field>
                <FieldName>Price</FieldName>
                <FieldType>float</FieldType>
                <FieldTypeMods>NOT NULL</FieldTypeMods>
            </Field>
            <Field>
                <FieldName>Time</FieldName>
                <FieldType>Datetime</FieldType>
                <FieldTypeMods>NOT NULL</FieldTypeMods>
            </Field>
        <Schema>
    </EventClass>
</EventClasses>
<PreferenceClasses>
    <PreferenceClass>
        <PreferenceClassName>EmailPreference1</PreferenceClassName>
        <EventClassName>EmailEvents</EventClassName>
        <ConditionClasses>
            <ConditionClass>
                <Name>MailFrom</Name> <!-- Condtion Class id = 1 -->
                Mail is From @Sender
            </CondtionClass>
            <ConditionClass>
                <Name>MailContains</Name> <!-- Condtion Class id = 2 -->
                Mail Contains @KeyWord
            </CondtionClass>
        </CondtionClasses>
        <ActionClasses>
            <ActionClass>
                <Name>PopToast</Name>
                Pop A Toast
            </ActionClass>
        </ActionClasses>
    </PreferenceClass>
    <PreferenceClass>
        <PreferenceClassName>EmailPreference2</PreferenceClassName>
        <EventClassName>EmailEvents</EventClassName>
        <ConditionClasses>
            <ConditionClass>
            <Name>MailPriority</Name> <!-- Condtion Class id = 3 -->
            Priority > @Priority
            </CondtionClass>
            <ConditionClass>
                <Name>MailFrom</Name> <!-- Condtion Class id = 4 -->
                Mail is From @Sender
            </CondtionClass>
        </CondtionClasses>
```

```
        <ActionClasses>
            <ActionClass>
                <Name>MoveToFolder</Name>
                MoveToFolder (@TargetFolder) <
            </ActionClass>
        </ActionClasses>
    </PreferenceClass>
    <PreferenceClass>
        <PreferenceClassName>StockPreference</PreferenceClassName>
        <EventClassName>StockEvents</EventClassName>
        <ConditionClasses>
            <ConditionClass>
                <Name>StockSymbol</Name> <!-- Condtion Class id = 5 -->
                Symbol = @Ticker
            </CondtionClass>
            <ConditionClass>
                <Name>TargetPrice</Name> <!-- Condtion Class id = 6 -->
                Price > @TargetPrice
            </CondtionClass>
        </CondtionClasses>
        <ActionClasses>
            <ActionClass>
            <Name>SendCellPhoneMsg</Name>
            Send a message to cell phone of @subscriberId
            </ActionClass>
        </ActionClasses>
    </PreferenceClass>
</PreferenceClasses>
```

The invention claimed is:

1. A preference execution system comprising:

a memory;

a data store component for storing schematized data and end-user specified preferences, wherein queries are evaluated and stored as data in the data store component, and constructed upon demand;

a compiler to compile information agent applications including end-user specified preferences and store the compiled information agent applications in the data store;

an execution engine to retrieve preferences stored in the data store upon the occurrence of one or more events and to utilize the preferences and at least one stored procedure to query tables within the data store and produce a results table, wherein the results table stores preferences whose conditions have been satisfied such that specified actions are triggered based on the stored preferences; and a context analyzer that stores and analyzes information regarding variables and parameters of a user that influence notification decision-making, the parameters comprise a user's typical locations and attentional focus, devices users tend to have access to in different locations, a user's preference as to being disturbed by notifications of different types in different settings, default parameters as to how the user wishes to be notified in different situations, and cost of disruption associated with being notified by different modes in different settings, the parameters are stored as a user profile that can be edited by the user or users can specify in real-time their state; and a constant accessor that provides navigation to data across different domains to enable a user to write cross-domain preferences.

2. The system of claim 1, further comprising an action component for taking one or more actions specified by a conditionally valid preference.

3. The system of claim 2, the action component comprising a notification component that transforms and formats notification data generated by the execution engine based on a user preference for one or more user communication devices.

4. The system of claim 1, wherein the communication devices include a mobile phone, a pager, a PDA, and a computer.

5. The system of claim 1, further comprising an event component to extract event data from an event source and store the data in the data store.

6. The system of claim 5, wherein the event source is a subscription service.

7. The system of claim 1, wherein the context analyzer produces context data indicative of an end-users context at a given time and stores the context data in the data store.

8. The system of claim 1, further comprising one or more APIs to interact with applications.

9. The system of claim 1, wherein the compiler can compile and the execution engine can execute both heavyweight applications and lightweight preference applications.

10. The system of claim 1, the execution engine evaluates preferences by executing queries on data stored in the data store.

11. The system of claim 1, wherein end-user preferences are based on a developer specified schema.

12. The system of claim 11, wherein information regarding end-user preferences and the developer schema are stored in one or more tables in the data store.

13. The system of claim 1, further comprising a personalized folder to define preferences and to define conditions and actions that control the content of folders upon the happening of an event.

14. The system of claim 13, wherein the personalized folder is defined and controlled by end-user specified logic which defines conditions and actions that control the content of the folder.

15. A method for employing preferences comprising:

specifying user preferences regarding an information agent application based on a developer schema;

storing the preferences and schematized data in one or more tables in a data store;

querying the tables in the data store upon occurrence of an event and retrieving preferences stored in the data store;

producing a results table, wherein the results table stores preferences whose conditions have been satisfied such that specified actions are triggered;

executing actions based on the results table;

utilizing a context analyzer that stores and analyzes information regarding variables and parameters of a user that influence notification decision-making, the parameters comprise a user's typical locations and attentional focus, activities per time of day and day of week, devices users tend to have access to in different locations, a user's preference as to being disturbed by notifications of different types in different settings, and cost of disruption associated with being notified by different modes in different settings; and storing the parameters as a user profile that can be edited by the user or allowing users to specify in real-time their state;

utilizing a one-at-a-time declarative programming model, wherein user preferences are specified using one or more On-event-If-Then statements and Boolean operators to specify conditions and actions, schema; and providing a constant accessor that allows preferences and conditions to be written that are capable of navigating and retrieving information from various domains.

16. A computer readable medium having instructions stored thereon computer executable instructions for executing the method of claim 15.

\* \* \* \* \*